(12) United States Patent
Everest

(10) Patent No.: US 8,402,076 B2
(45) Date of Patent: Mar. 19, 2013

(54) EXPLOITATION OF TOPOLOGICAL CATEGORIZATION OF CHAOTIC AND FRACTAL FUNCTIONS, INCLUDING FIELD LINE CALCULATIONS

(75) Inventor: Michael T. Everest, Sunnyvale, CA (US)

(73) Assignee: Michael T. Everest, Sunnyvale, CA (US)

( * ) Notice: Subject to any disclaimer, the term of this patent is extended or adjusted under 35 U.S.C. 154(b) by 358 days.

(21) Appl. No.: 12/877,908

(22) Filed: Sep. 8, 2010

(65) Prior Publication Data

US 2011/0082894 A1    Apr. 7, 2011

Related U.S. Application Data

(62) Division of application No. 11/336,187, filed on Jan. 19, 2006, now Pat. No. 7,805,481.

(51) Int. Cl.
G06F 7/00 (2006.01)
G06F 7/38 (2006.01)

(52) U.S. Cl. .................. 708/511; 708/200; 708/446

(58) Field of Classification Search .......... 708/200, 708/446, 511, 605
See application file for complete search history.

(56) References Cited

U.S. PATENT DOCUMENTS

| | | | |
|---|---|---|---|
| 4,959,802 A * | 9/1990 | Slaughter et al. ............... 701/1 | |
| 6,574,650 B1 | 6/2003 | Aoki | |
| 6,792,162 B1 * | 9/2004 | Edgar ............... 382/275 | |
| 6,915,321 B2 | 7/2005 | Walster et al. | |
| 7,805,481 B1 | 9/2010 | Everest | |
| 2002/0183960 A1 | 12/2002 | Chiou et al. | |
| 2002/0184283 A1 | 12/2002 | Steele, Jr. | |
| 2003/0131034 A1 | 7/2003 | Walster et al. | |
| 2006/0139349 A1 | 6/2006 | Reshetov et al. | |
| 2007/0040848 A1 | 2/2007 | Hutchinson et al. | |
| 2007/0053595 A1 | 3/2007 | Eswara | |
| 2011/0004648 A1 | 1/2011 | Everest | |
| 2011/0082895 A1 | 4/2011 | Everest | |

OTHER PUBLICATIONS

Higham, N., "Accuracy and Stability of Numerical Algorithms" 1996, Society for Industrial and Applied Mathematics (SIAM), Philadelphia. ISBN 0-89871-355-2, pp. 78-79.

Pekovic, M. et al., "Complex Interval Arithmetic and Its Applications" 1995, Wiley-VCH, Berlin; Weinheim; New York; Chichester; Brisbane, Singapore, Toronto; ISBN 3-527-40134-2 Springer-Verlag Berlin, Heidelberg, and New York. pp. 15-32.

Pekovic, M. et al., "Complex Interval Arithmetic and Its Applications" 1995, Wiley-VCH, Berlin; Weinheim; New York; Chichester; Brisbane, Singapore, Toronto; ISBN 3-527-40134-2 Springer-Verlag Berlin, Heidelberg, and New York, pp. 52-56.

Pekovic, M. et al., "Complex Interval Arithmetic and Its Applications" 1995, Wiley-VCH, Berlin; Weinheim; New York; Chichester; Brisbane, Singapore, Toronto; ISBN 3-527-40134-2 Springer-Verlag Berlin, Heidelberg, and New York. pp. 70-88.

Kuipers, J., "Quaternions and Rotation Sequences" 1999, Princeton University Press, Princeton, New Jersey, ISBN 0-691-05872-5, p. 107.

Peitgen, H. et al., "The Beauty of Fractals" 1986, Springer-Verlag ISBN 3-540-15851-0 Springer-Verlag Berlin, Heidelberg, New York, and Tokyo, ISBN 0-387-15851-0 Springer-Verlag Berlin, Heidelberg, New York, and Tokyo, pp. 16, 66-68.

(Continued)

Primary Examiner — Chuong D Ngo
(74) Attorney, Agent, or Firm — Hickman Palermo Truong Becker Bingham Wong LLP

(57) ABSTRACT

A topological categorization method, based on inclusive intervals, provides a general method of analyzing escape topologies for discrete dynamic systems, in complex and higher dimensions, including the calculation of both potential for complex and hypercomplex and field lines for complex iterations.

4 Claims, 17 Drawing Sheets

OTHER PUBLICATIONS

Peitgen, H. et al., "The Science of Fractal Images" 1988, Springer-Verlag ISBN 3-540-96608-0 Springer-Verlag Berlin, Heidelberg, and New York, and ISBN 0-387-96608-0 Springer-Verlag Berlin, Heidelberg, and New York, pp. 197, 287-293.

U.S. Appl. No. 11/757,858, filed Jun. 4, 2007, Notice of Allowance, mailed Sep. 19, 2011.

U.S. Appl. No. 12/877,922, filed Sep. 8, 2010, Office Action, mailed Oct. 22, 2012.

U.S. Appl. No. 12/877,895, filed Sep. 8, 2010, Office Action, mailed Oct. 18, 2012.

U.S. Appl. No. 12/877,949, filed Sep. 8, 2010, Notice of Allowance, mailed Dec. 13, 2012.

* cited by examiner

Prior Art

FIG.2

| | Operator | Special Form | Number System | Branchcut |
|---|---|---|---|---|
| Non Intrinsic Operators: | | | | |
| 050 | inclusive metacomplex scalar | | Metacomplex | |
| 052 | inclusive rigid body rotation | stable point multiplication for | Hypercomplex | |
| 054 | inclusive invert operator | unitized metacomplex form | Metacomplex | |
| 056 | unit power operator | | Metacomplex | |
| 058 | zero power operator | | Metacomplex | |
| Direct Intrinsic Operators: | | | | |
| 060 | optimal inclusive additive operator | | Metacomplex | |
| 062 | inclusive metacomplex shape converter | | Metacomplex | |
| Unitizing Range Operators: | | | | |
| 064 | inclusive metacomplex range | unitized metacomplex form | Metacomplex | |
| Multiplication Operators: | | | | |
| | all should use: (stable point multiplication, form and unitized metacomplex form) | | | |
| 066 | stable inclusive complex multiplication | stable Krier real root form | Complex | |
| 068 | stable inclusive quaternion multiplication | stable Krier real root form | Quaternion | |
| 070 | cubic inclusive quaternion multiplication | | Quaternion | |
| Contractive Power Operators: (all:unitized metacomplex form) | | | | |
| 072 | inclusive complex contraction power | unitized contraction power form | Complex | Yes |
| 074 | inclusive hypercomplex contraction power | unitized contraction power form | Hypercomplex | Yes |
| 076 | stable inclusive complex square root | radius square root form | Complex | Yes |
| 078 | stable inclusive hypercomplex square root | radius square root form | Hypercomplex | Yes |
| Non-Linear Unitizing Expansion Power Operators: | | | | |
| | (all:unitized metacomplex form, robust expansion nonlinear search form, expansion search limit forms) | | | |
| 080 | inclusive robust complex expansion power | | Complex | maybe |
| 082 | inclusive hypercomplex expansion power | | Hypercomplex | maybe |
| Stable Explicit Power >1 Operators: (all:unitized metacomplex form) | | | | |
| 084 | stable inclusive complex square power | optimal inclusive squaring form | Complex | |
| 086 | stable inclusive hypercomplex square power | optimal inclusive squaring form | HyperComplex | |
| 088 | stable inclusive metacomplex three halves power | three halves power form | Complex | Yes |

EXPLOITATION OF TOPOLOGICAL CATEGORIZATION OF CHAOTIC AND FRACTAL FUNCTIONS, INCLUDING FIELD LINE CALCULATIONS

CROSS-REFERENCE TO RELATED APPLICATIONS

This is a divisional application of application Ser. No. 11/336,187, filed on Jan. 19, 2006, now U.S. Pat. No. 7,805,481.

See patent application for "COMPLEX AND HYPER-COMPLEX INCLUSIVE INTERVAL EXPRESSION EVALUATIONS WITH STABLE NUMERIC EVALUATIONS AND PRECISION EFFICACY TESTING". The embodiments of that application are included as background in this application, too.

FEDERALLY SPONSORED RESEARCH

Not applicable.

BACKGROUND OF INVENTION

This invention was conceived as way of adding field lines to the Mandelbrot and Julia set images. The underlying invention also serves as a general method of categorizing escape regions of complex and hypercomplex chaotic functions and fractals.

1. Field of Invention

This invention generally relates to the chaotic functions and Julia set fractals which are generated from numerically iterating simple complex arithmetic functions.

2. Prior Art

Prior Art for Interval Processing
Overview

Prior art does not provide complete system for optimal interval with stable numerical algorithms.

*Accuracy and Stability of Numerical Algorithms*, 1996

*Accuracy and Stability of Numerical Algorithms*, by Nicholas J. Higham, Copyright 1996, Society for Industrial and Applied Mathematics (SIAM), Philadelphia. ISBN 0-89871-355-2

The book describes numerical error analysis. Its analysis of rounding error for complex numbers was important to understanding a similar analysis for quaternions.

*C++ Toolbox for Verified Computing*, 1995

*C++ Toolbox for Verified Computing*, by Ulrich Kulisch, Rolf Hammer, Matthias Hocks, Dietmar Ratz, Copyright 1995, Springer-Verlag, Berlin, Heidelberg. ISBN 3-540-59110-9 Springer-Verlag Berlin, Heidelberg, and New York.

The book describes the use of interval processing in mathematical proofs for parametric spaces. The scope is general, but it does not provide a description of optimal complex intervals.

*Complex Interval Arithmetic and Its Applications*, 1995

*Complex Interval Arithmetic and Its Applications*, by Miodrag S. Pekovic and Ljiljana D. Petkovic, Copyright 1998, WILEY-VCH, Berlin; Weinheim; New York; Chichester; Brisbane; Singapore; Toronto; ISBN 3-527-40134-2 Springer-Verlag Berlin, Heidelberg, and New York.
Overview This book emphasizes the use of optimal complex arithmetic on discs and many applications, and discusses the not so optimal. Techniques for optimal arithmetic and integer powers for complex numbers are described. This book discusses additional optimal disc forms which are not improved upon in this patent application, such as logarithmic, exponential, and some other transcendental functions.

Optimal Multiplication Problems
Overview

The book provides several references to a N. Krier, a German who describes in doctoral paper, apparently in German, and a method of performing optimal complex disc multiplications.

The Krier formula given in this book (I don't know about the original Krier work), does not appear to produce the correct answers—see page 23. See also page 82 for additional discussion of the Krier results that are useful. (See my own invention which agrees with results for page 82). The authors note several shortcomings in the use of the formulas, and thus discourage use of this powerful tool.

Optimal Multiplication Computation Problem

First, at the bottom of page 23, it is noted that "the presented minimal arithmetic requires a great deal of computation, including the calculation of the zero of third degree polynomial." No solution to this problem is provided.

Inclusion Isotonicity Property Problem

The authors immediately continue with a second problem at the very bottom of page 23, "Besides, a very important inclusion isotonicity property is not generally valid for multiplication (and, consequently, for division (1.15))". No solution to this problem is provided, but an example of the problem is indicated on page 24.

Real Powers

The book develops algorithms for finding optimal disc enclosures for positive integer powers. Optimal discs for real powers, $1/k$, where k is an integer are presented. The authors fail to create a comprehensive real power interval operator for all real powers. Also, on page 82, notes that squaring a disc interval is equivalent to Krier's multiplication when squaring. The author does not work out equations to provide an explicit formula for squaring.

*Quaternions and Rotation Sequences*, 1999

*Quaternions and Rotation Sequences*, by Jack B. Kuipers, Copyright 1999, by Princeton University Press, Princeton, N.J., ISBN 0-691-05872-5.

This book provides background on the arithmetic of quaternions, but no interval analysis or details on numeric processing. Quaternions are important example of hypercomplex numbers of the 4th dimension; however, but there is no discussion of hypercomplex numbers of other dimensions.

Prior Art for this Application
Books on Chaotic Functions
*The Beauty of Fractals*, 1986

*The Beauty of Fractals*, by Heinz-Otto Peitgen and Peter H. Richter, Copyright 1986 by Springer-Verlag ISBN 3-540-15851-0 Springer-Verlag Berlin, Heidelberg, New York, and Tokyo, ISBN 0-387-15851-0 Springer-Verlag Berlin, Heidelberg, New York, and Tokyo.

This early book describes the fundamentals of discrete dynamic systems, with emphasis on Mandelbrot-like iterations. This book emphasizes visualization as a method of investigating and exploring topological properties.

Pixel Categorization Problem

For processing an entire pixel, is that although the visual field has an infinite number of parameter points per pixel, only a finite number of parameter points are actually processed. The book fails to provide an absolute method of proving an entire pixel to be part of a topological category, such as escaping the Mandelbrot. A particularly sharp "spike" of the Mandelbrot boundary could be missed by the computer graphic pointwise generation.

Potential

For many functions similar to the Mandelbrot exterior, it is possible to assign a "potential" to represent the speed at which the absolute value of pointwise iteration escapes to infinity.

Potential Commonality Problem

For the purposes of visualization, one can color code a point based on the number of iterations to achieve a particular absolute cutoff distance; this is apparently done in the book to great effect. (On page 163 a more formal method is presented, based on absolute value divided by 2 to the power "n", where n is the number of iterations to achieve it. This method forms the basis for many visualizations in later literature, but the author notes the sensitivity of small changes in the algorithm to affect the aesthetics). A general approach to iterated functions is not broached.

Field Line Generation

On page 68, for the referenced formula called (5.11), the text says that the formula was used to calculate FIG. 16 of the same book. FIG. 16 of the book appears to be an artistic line drawing of potential and field lines. Its unclear if the formula was used for field lines or just potential lines. In any case, the formula cannot be directly applied as a solution to field lines.

Field Line Problem

Although the book describes the computer visualization of potential fields of discrete dynamic systems, its visualization of field lines is largely left to artistic renderings. See FIG. 16. on page 16. Field lines which are shown in the outermost area of the Mandelbrot are computer generated, but use a scheme of "Binary Expansion", which is, apparently, only an approximation, which works when not too close to topological boundaries. See page 66. Note dramatic image on page 74.

With half of the complex value missing, namely the field line value, there is no way to use all the advanced techniques of computer graphics for texture mapping and surface modeling. Therefore, although this book is famous for its wondrous beauty of chaos, there is an inherent limitation to all renderings.

*The Science of Fractal Images,* 1988

*The Science of Fractal Images,* by Heinz-Otto Peitgen and Dietmar Saupe (Editors), Copyright 1988 by Springer-Verlag ISBN 3-540-96608-0 Springer-Verlag Berlin, Heidelberg, and New York, and ISBN 0-387-96608-0 Springer-Verlag Berlin, Heidelberg, and New York.

Topological Categorization Proofs: Koebe ¼ Theorem

The book succeeds in finding a direct method of proving entire areas to be external, or escaped, for the Mandelbrot, with analysis dependent upon the Koebe ¼ Theorem. The method is discussed in detail in Appendix D on page 287. This landmark contribution allows areas of visualization to be quickly categorized as external. Elaborate mathematical proofs are described to assure the reader that the method is correct. This method uses a calculation of the magnitude of the derivative to find a bounds between the minimum and maximum distance between an external point and the boundary of a Mandelbrot-like iteration. Only the minimum value is utilized, as it provides a disc around the point where all points are guaranteed to be external (e.g. escaped). Thus, large areas of points are all guaranteed as escaped, by a single iteration. On page 292, images show the dramatic reduction in pointwise iterations in order to categorize areas exterior to the Mandelbrot.

Koebe Categorization solves Pixel Categorization Aliasing Problem.

This approach, when applicable, can be used to solve the Pixel Categorization Aliasing Problem of the earlier book, *The Beauty of Fractals*. When used with standard interval analysis, guaranteed categorizations are available.

Koebe Distance Applicability Problem

Although the Mandelbrot and some Julia sets are suitable for distance estimates. Other functions may not have such simple methods. Thus the method for bounding topological distances may be difficult to apply in specific circumstances.

Field Line Generation:

On page 197, in a figure called 4.17, a drawing is given for field lines. I could not find a reference to its generation. However, this zoomed-out view of the Mandelbrot field lines is typical; field lines deep inside the tangles of the Mandelbrot are not shown. This book also shows the use of binary decomposition to construct field lines (but as always, only for zoomed-out images).

*Chaos and Fractals, The Mathematics Behind the Computer Graphics* 1989

*Chaos and Fractals, The Mathematics Behind the Computer Graphics*, by Robert L. Devaney and Linda Keen, Copyright 1989 by the American Mathematical Society, ISBN 0-8218-0137-6.

This book is mentioned because of its artistic rendering of external field lines.

*Computers, Pattern, Chaos, and Beauty,* 1990

*Computers, Pattern, Chaos, and Beauty*, by Clifford A. Pickover, Copyright 1990 and 2001 by Dover Publications, Inc., Mineola, New York, ISBN 0-486-41709-3, The book describes is a more general book on the subject, but offers some interesting, and very simple, modifications to the escape algorithms for discrete dynamic systems.

Topological Categorization Proofs

Controlled Step Escape Modification

Earlier works on discrete dynamic systems were beholding to early termination of infinite iterations. These earlier models also required some way of ascertaining an escape distance which would guarantee correct categorization without an infinite number of iterations. The book's modifications allow the escape process to terminate at an exact iteration stage and still produce visually exciting results that take on the appearance of "organisms". See chapter 8. Most previous "escape" algorithms rely on testing the absolute value of a complex iterated point. Here, the test does something different, although still based loosely on real and imaginary parts of the absolute value function. This method is very effective and is described section 8.2, entitled "A Computer Program 'Bug'". This approach produces new results and offers a lot more bang for the "buck" because "escape" testing is greatly simplified.

*Chaos and Fractals: new frontiers of science,* 1992

*Chaos and Fractals*, by Heinz-Otto Peitgen and Dietmar Saupe, and Hartman Jürgens, Copyright 1992 by Springer-Verlag, New York Inc., New York, ISBN 3-540-97903-4 Springer-Verlag Berlin, Heidelberg, and New York, and ISBN 0-387-97903-4 Springer-Verlag Berlin, Heidelberg, and New York.

This huge book, 984 pages, takes a broad look at chaos theory.

Field Lines

Chapter 13 provides extensive discussion of binary expansion, as was described in the book *The Beauty of Fractals*, above. Although extensive, it fails to address the problem of the method's approximation effect which breaks down as one delves deeper at higher magnifications near the boundary of the Mandelbrot.

Hypercomplex Systems

Page 837 describes the use of higher dimensional processing for Julia sets, but is easily applicable to the 191 Mandelbrot. Color plates 15 and 16 show color renderings of a Julia set in three dimensions.

*Hypercomplex Iterations, Distance Estimation and Higher Dimensional Fractals,* 2002

*Hypercomplex Iterations, Distance Estimation and Higher Dimensional Fractals,* by Yumei Dang, Louis H. Kauffman, and Dan Sandin, Copyright 2002 by World Scientific Publishing Co. Pte. Ltd., Singapore, ISBN 981-02-3296-9

The book describes, in great detail, the application of a distance to boundaries for Mandelbrot and Julia sets. The method here is an extension of that found in the book *The Science of Fractal Images*, above. Higher dimensional iterations are emphasized.

Hypercomplex Systems and Topological Proofs

The book presents additional theory and some practical aspects of using distance estimation in higher dimensions. Although the additional theory is useful, but application of these techniques are limited to a small variety of Julia sets and Mandelbrot-like iterations.

Books on Complex Analysis

*Visual Complex Analysis,* 1997

*Visual Complex Analysis,* by Tristin Needham, Copyright 1997, by Clarendon Press, Oxford, ISBN 981-02-3296-9.

This book was used to research winding numbers, which are simply a way of understanding the number of times a complex path wraps around complex origin.

OBJECTS AND ADVANTAGES

Accordingly, several objects and advantages of the invention are:

Inclusive Intervals Solution:

Pixel Categorization Problem, Koebe Applicability Problem:

The prior art has shown that the pixel categorization problem is solved, in some instances, by using results based on the Koebe ¼ theorem. The new approach to solving the pixel categorization problem does not require iteration of the first derivative until the point escapes far beyond the topological escape. The inclusive interval processing of the new approach is mathematically simpler, needing no 1st derivative calculations, and the iteration only needs to be carried out until the entire inclusive interval escapes—not to a far distant escape. This new approach requires the overhead of interval processing, but the end result works on a wide class of iterations. There are no other constants to compute or mathematical proofs.

Metacomplex Dominant Commonality:

One of the goals of mathematics is to frame solutions which apply generic problems, thereby avoiding the complexity of analyzing individual cases. The difficulty with escape technologies is that the definition of the result is based on a infinite number of iterations. Under what formal conditions, can iteration be terminated and still achieve the same precise result? What adjustments must be made when the iteration is terminated at say 9, instead of 8 iterations? The term commonality, as a new term, applies to the problem determining a definition of the infinite iteration which works whatever the iteration level, provided certain escape conditions are met.

The concept of a metacomplex dominant form, a new term, is used to dramatically simplify calculations for finding mathematical parameters for controlling and computing commonality. Thus, a for a wide variety of escape technologies, solutions are possible.

Precise Field Lines: Field Line Problem

Field lines are understood to exist for many escape technologies, and the prior art's solutions are simple approximations which appear to evaporate for detailed analysis. The new approach is as precise as the traditional iteration of potential lines. After topological boundaries are established, precise field line values are computed. This allows techniques such as texture mapping to be implemented. Surface modeling based on both potential and field lines is also possible.

Conclusion

By utilizing inclusive intervals for iteration steps within a discrete dynamic system, topological categorization can be generalized to a wide variety of systems. And, for complex iterations, field lines are now available for new rendering and analysis capabilities.

Further, objects and advantages will become apparent from a consideration of the ensuing description and drawings.

SUMMARY

In accordance with this invention, an topological categorization method based on inclusive intervals provides a general method of analyzing "escape" topologies for discrete dynamic systems in complex and higher dimensions, including the calculation of both potential and field lines for complex codomains. A number of subsystems are described.

Escape Distance Solver Embodiment—FIG. 5

This embodiment is used to automatically derive key escape distances, for polynomial, some rational functions, and many other functions. This embodiment can be used with the new technologies herein, or with iterations of the prior art, as in FIG. 11A of POINT ITERATION EMBODIMENT.

Interval Escape Categorization-Embodiment—FIG. 6

This technology is a foundation technology for categorizing groups of points in the parameter space; it can be used as a more general method than that of the Koebe ¼ Theorem, described in the prior art. For this technology to work well, high quality complex and hypercomplex interval processing is required; the interval technology is part of another patent application, but is included for "best mode".

Iteration Correlator Embodiment—FIG. 10

Correlation of all iteration levels to single values, such as potential or field line values is now possible for a wide variety of functions, not just the original forms based on Mandelbrot and Julia sets. The correlation functions for field lines appear to be completely new art.

Self Winding Resolver Embodiment—FIG. 8

The basis for efficient calculations for winding counts and field line requires a self winding; that is, the counting of winding counts by jumping across iteration levels.

DRAWINGS

Figures

From Prior Patent Application

FIG. 2 shows a list of optimal inclusive disc interval operators.

From this Patent Application

Figure 5:
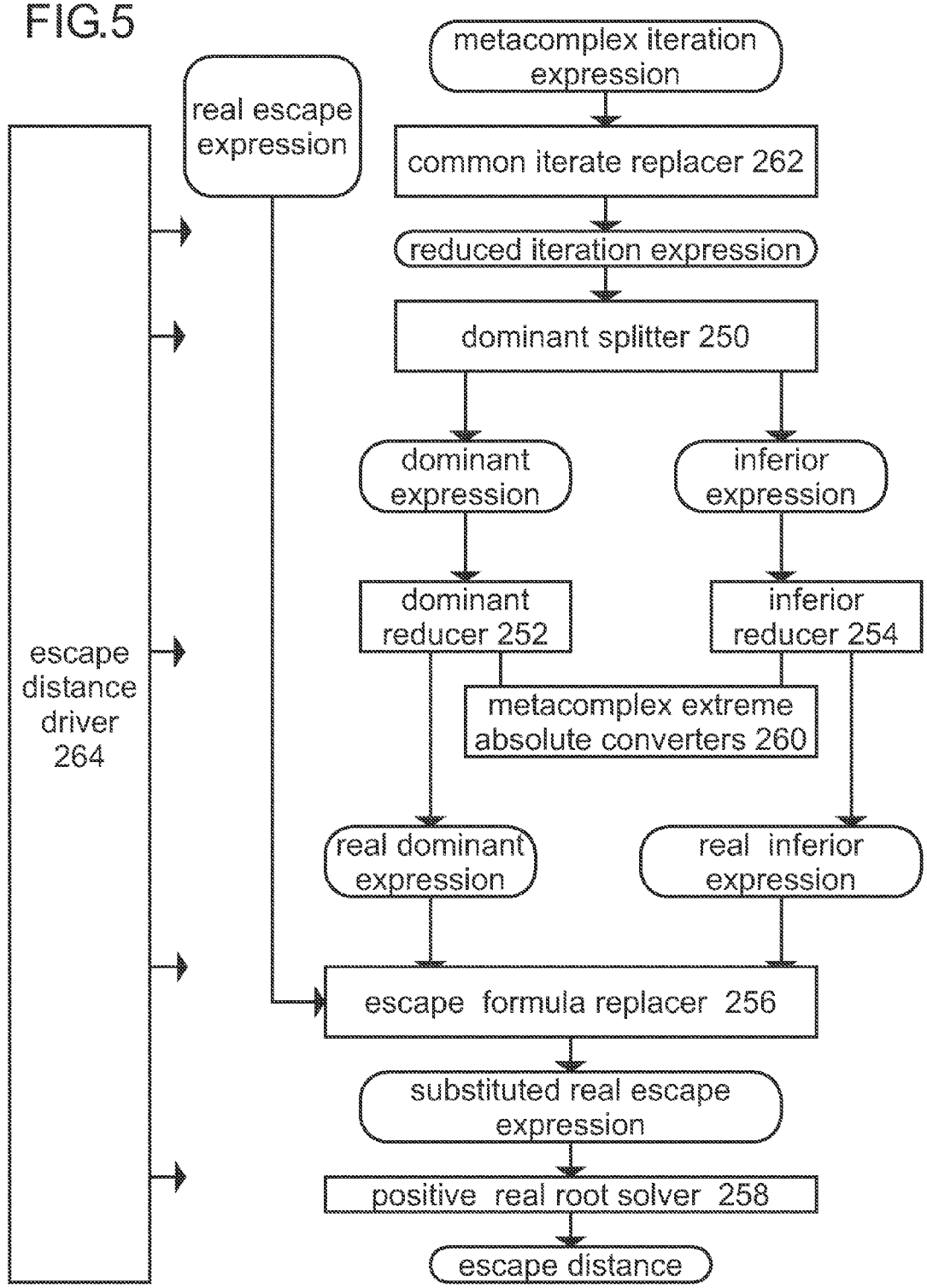
Figure 6:
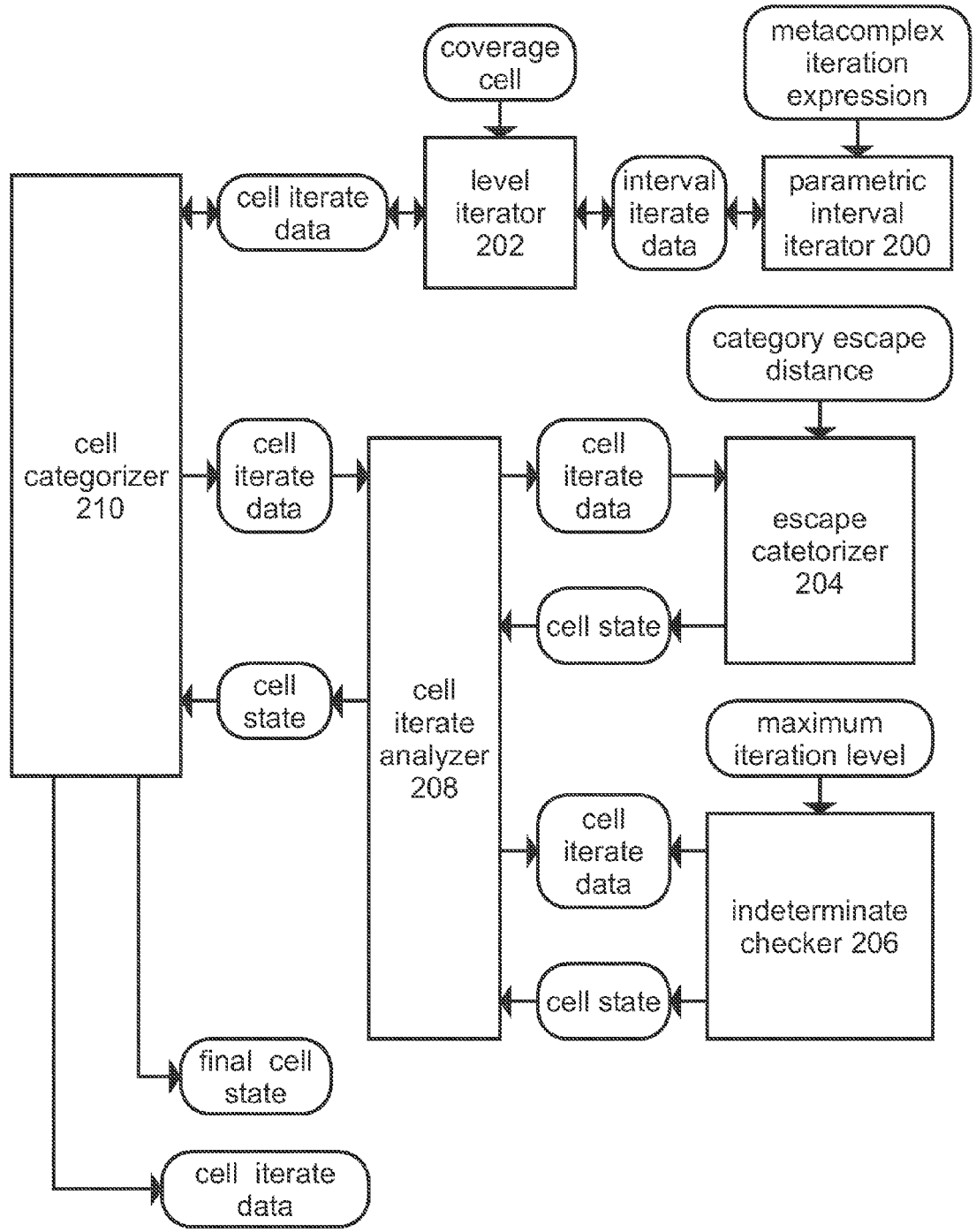
Figure 7:
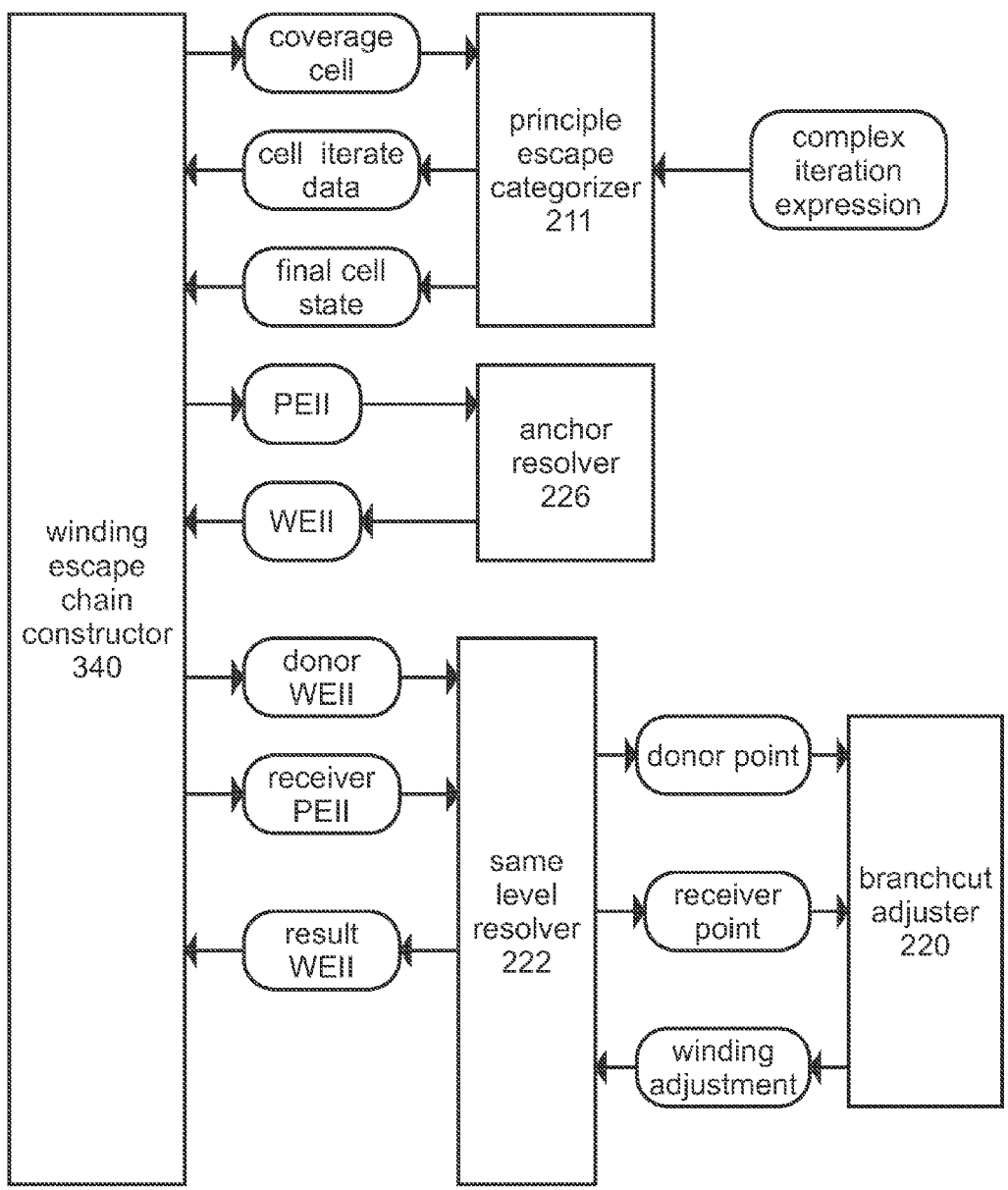
Figure 8:
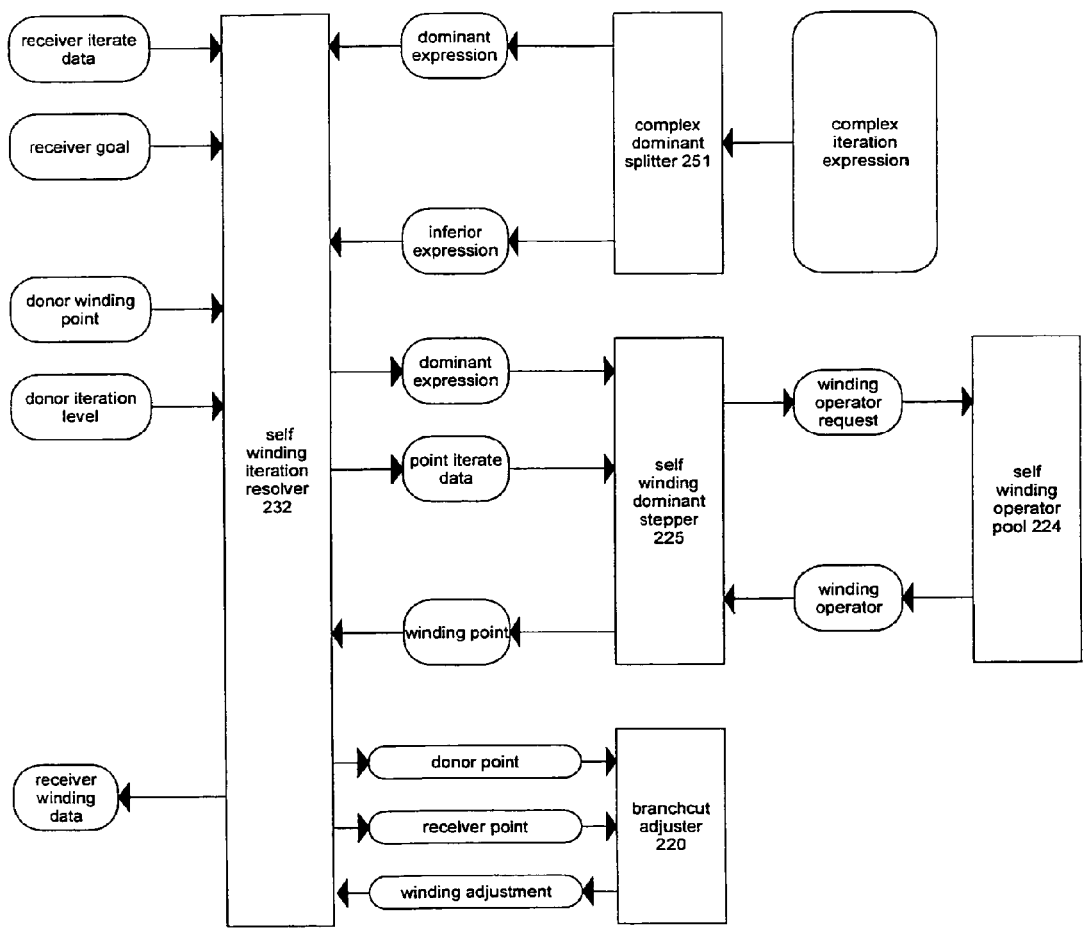
Figure 9:
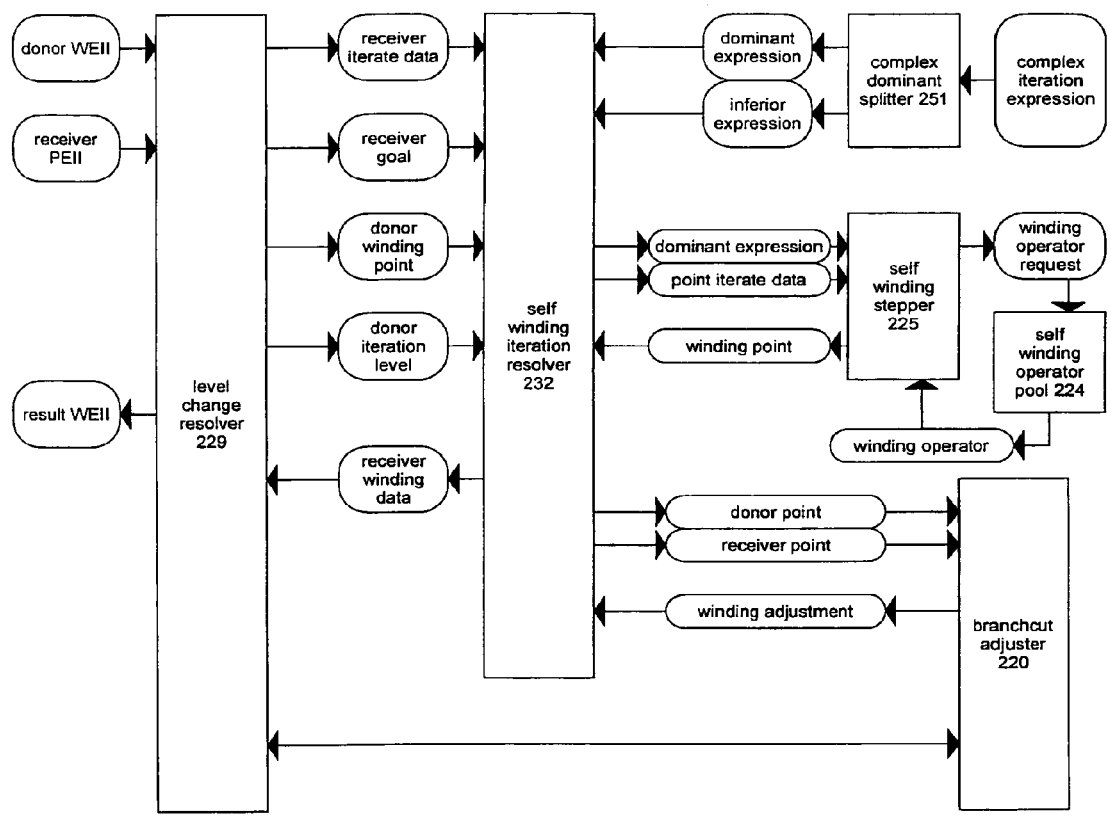
Figure 10:
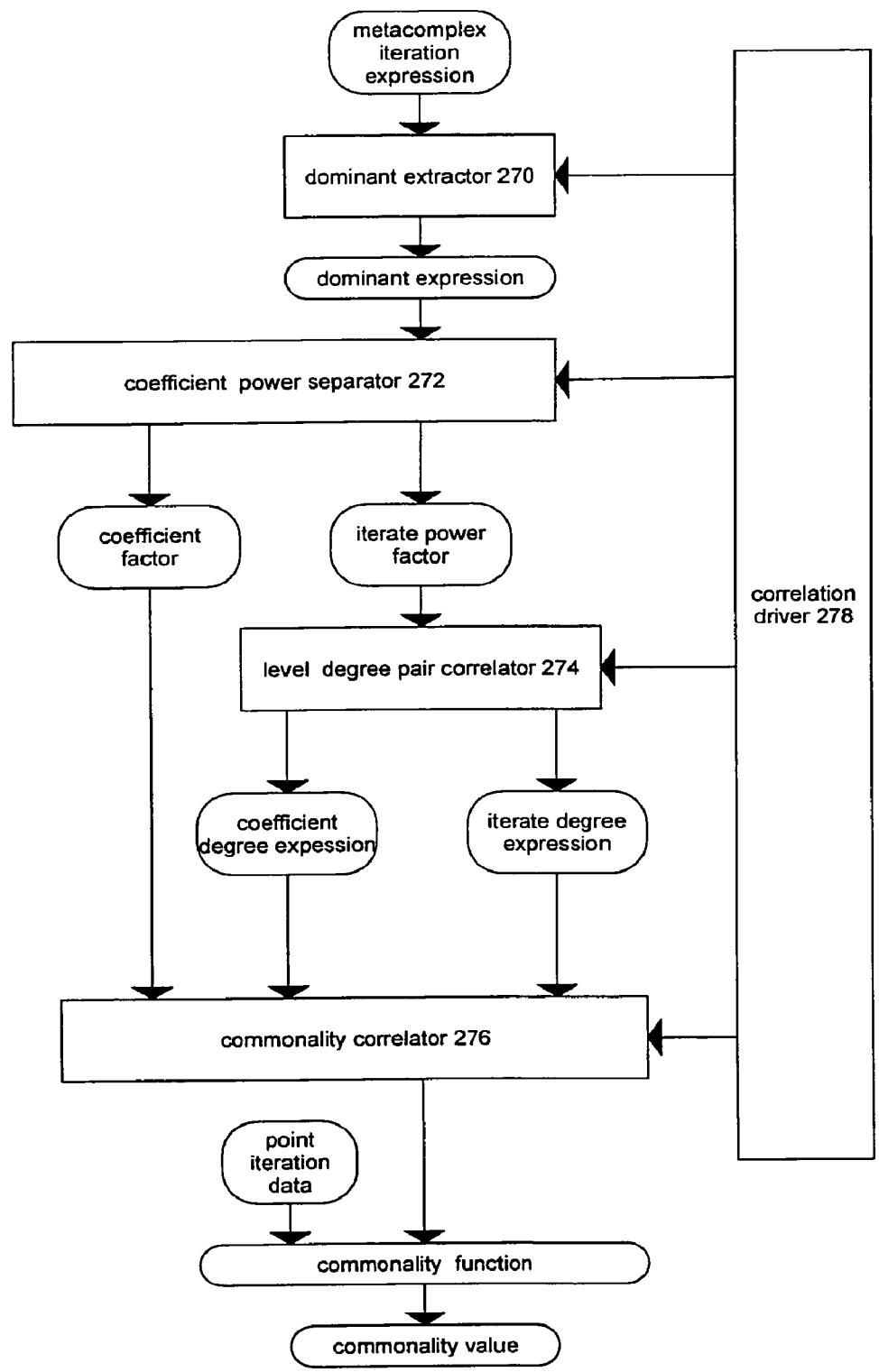
Figure 11A:
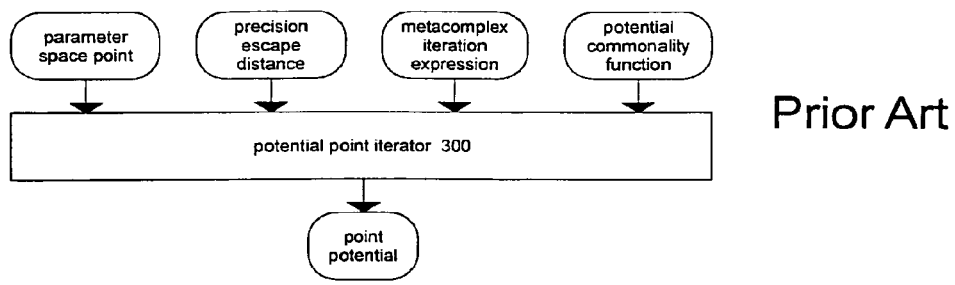
Figure 11B:
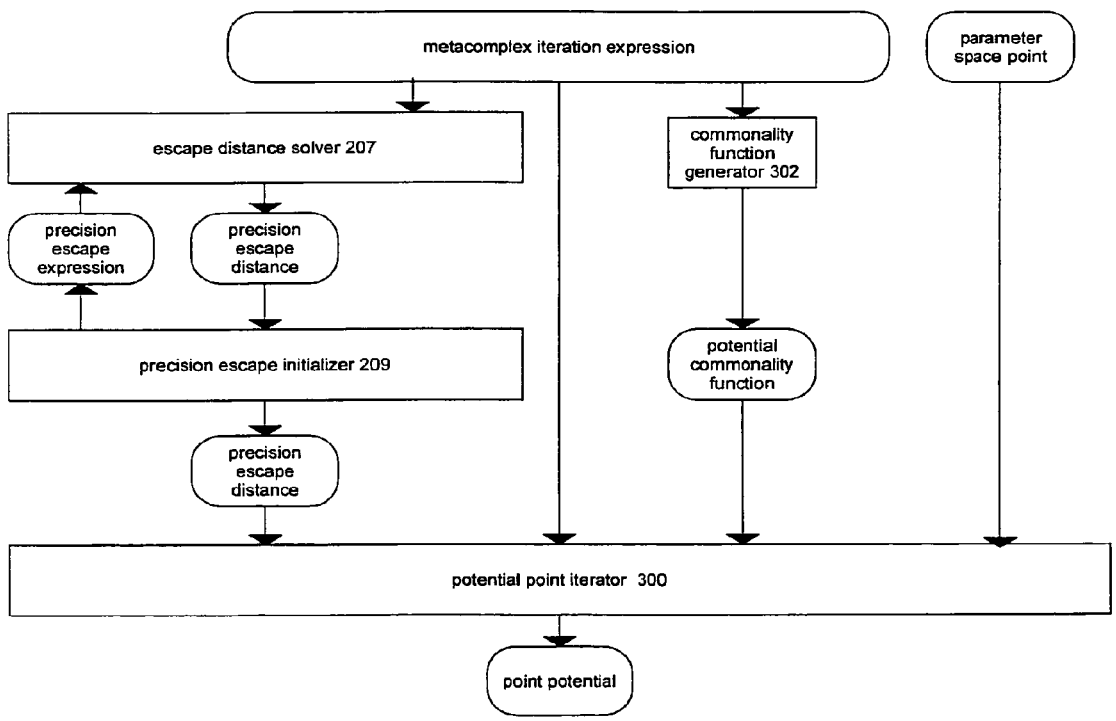
Figure 12A:
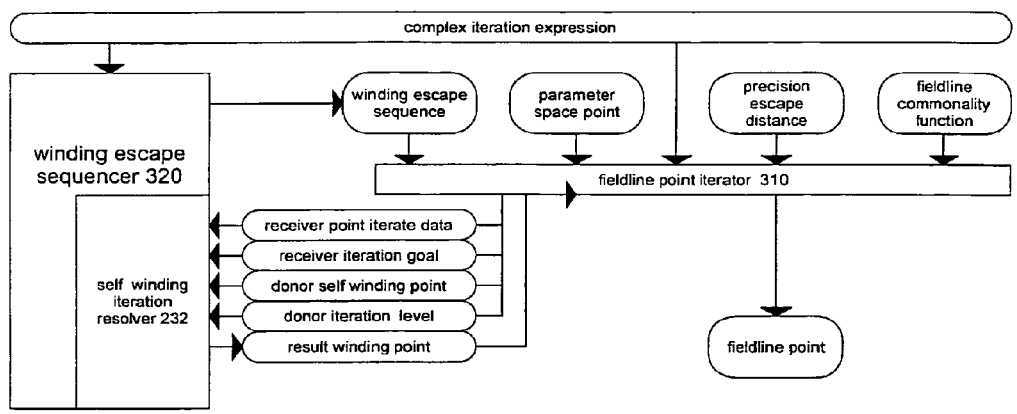
Figure 12B:
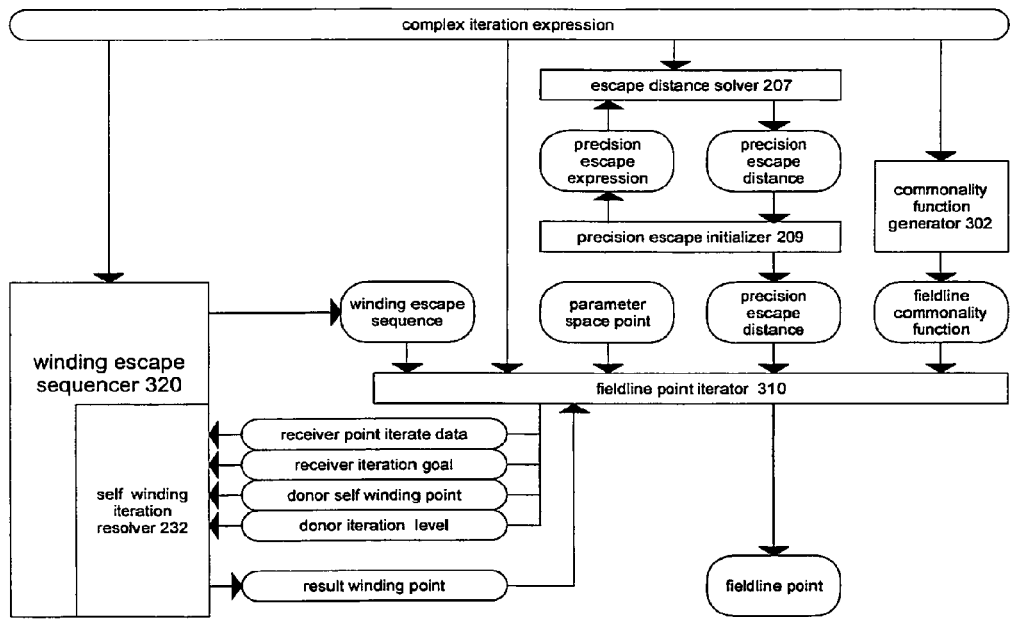
Figure 13A:
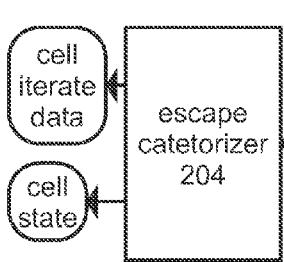
Figure 13B:
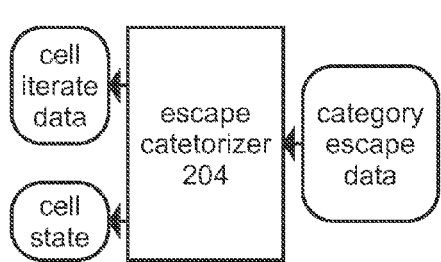
Figure 13C:
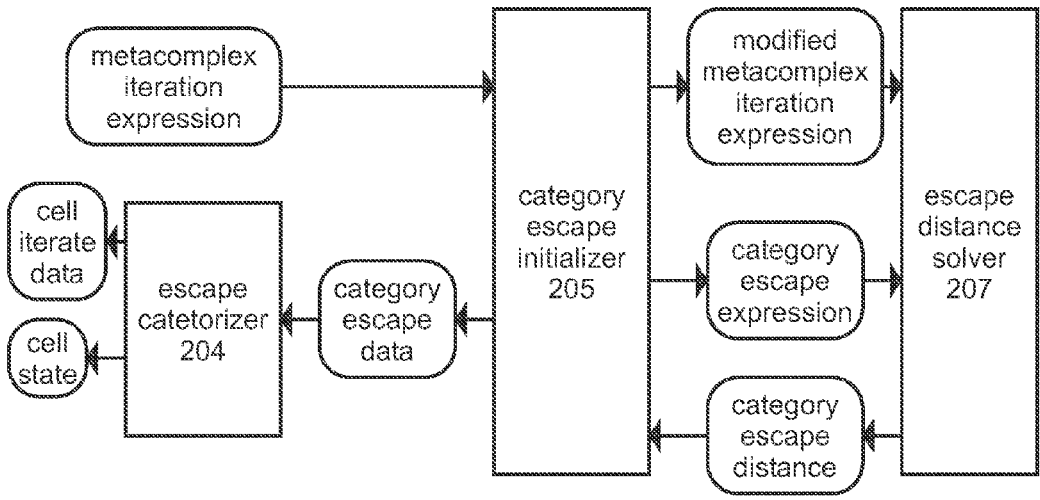
Figure 13D:
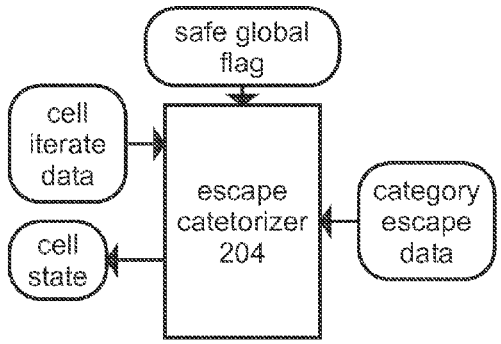
Figure 13E:
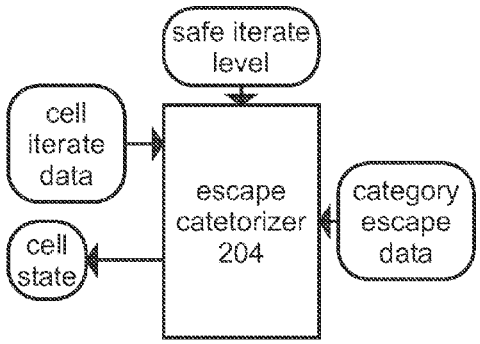
Figure 14:
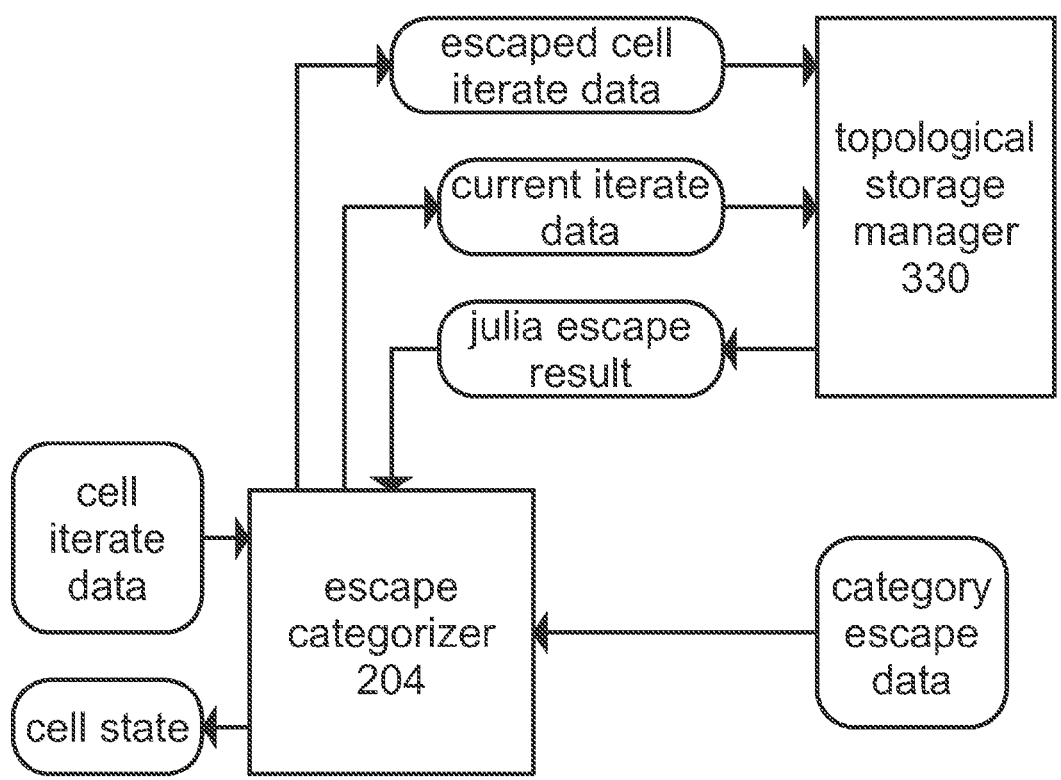
Figure 15:
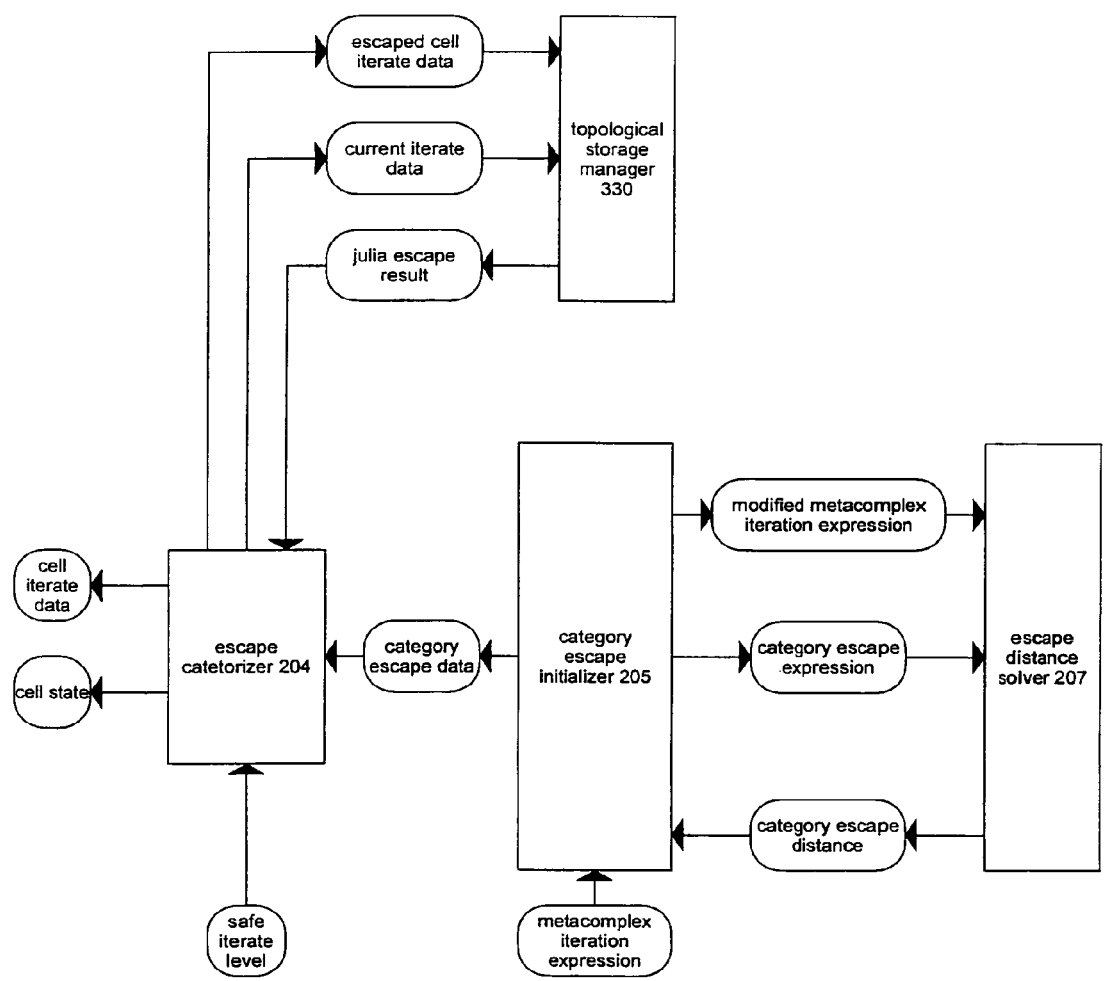
Figure 16A:
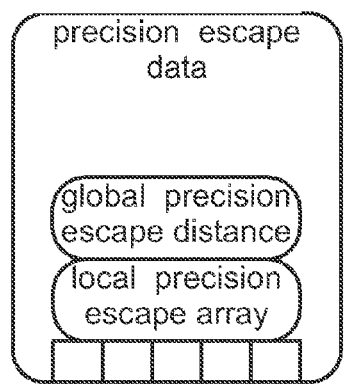

FIG. 5 block diagram for generic calculation of escape distances of discrete dynamic system FIG. 6 block diagram of an interval escape categorization to establish interval and principle escape sequences FIG. 7 block diagram for finding winding counts on independent iteration levels FIG. 8 block diagram for iteration, forward and reverse, of a winding point FIG. 9 block diagram for resolving winding escape sequences, FIG. 10 block diagram for creation of a function for correlating values terminating at different iteration levels, FIG. 11A block diagram of traditional method for iterating the potential within a discrete dynamic system, FIG. 11B block diagram for using automatic distance values and correlation functions FIG. 12A block diagram of system for creating winding escape chains and iterating field lines, FIG. 12B block diagram of automated system for creating winding escape chains FIGS. 13A-E block diagrams of enhancements for categorizing intervals FIG. 14 block diagram for Julia set enhancement for checking intervals for escaping FIG. 15 block diagram incorporating a combination of optimizations for checking intervals for escaping FIG. 16A a diagram of enhanced data structure for storing distances at which high precision iterations are completed.

Figure 16B:
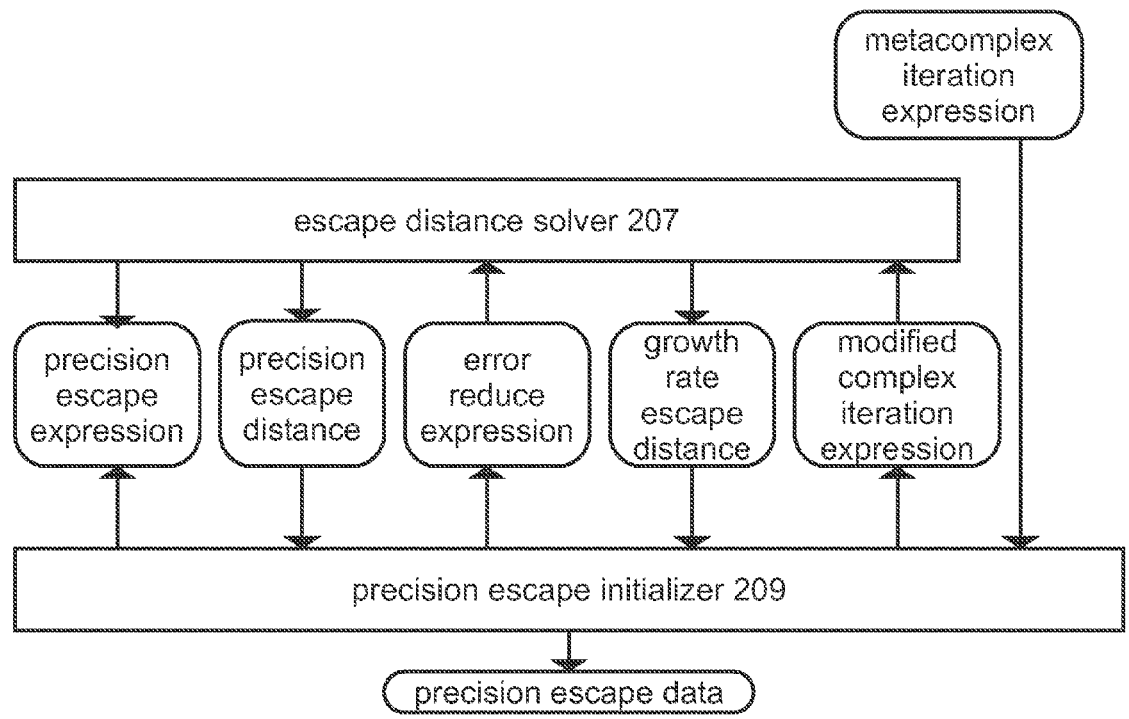
Figure 17:
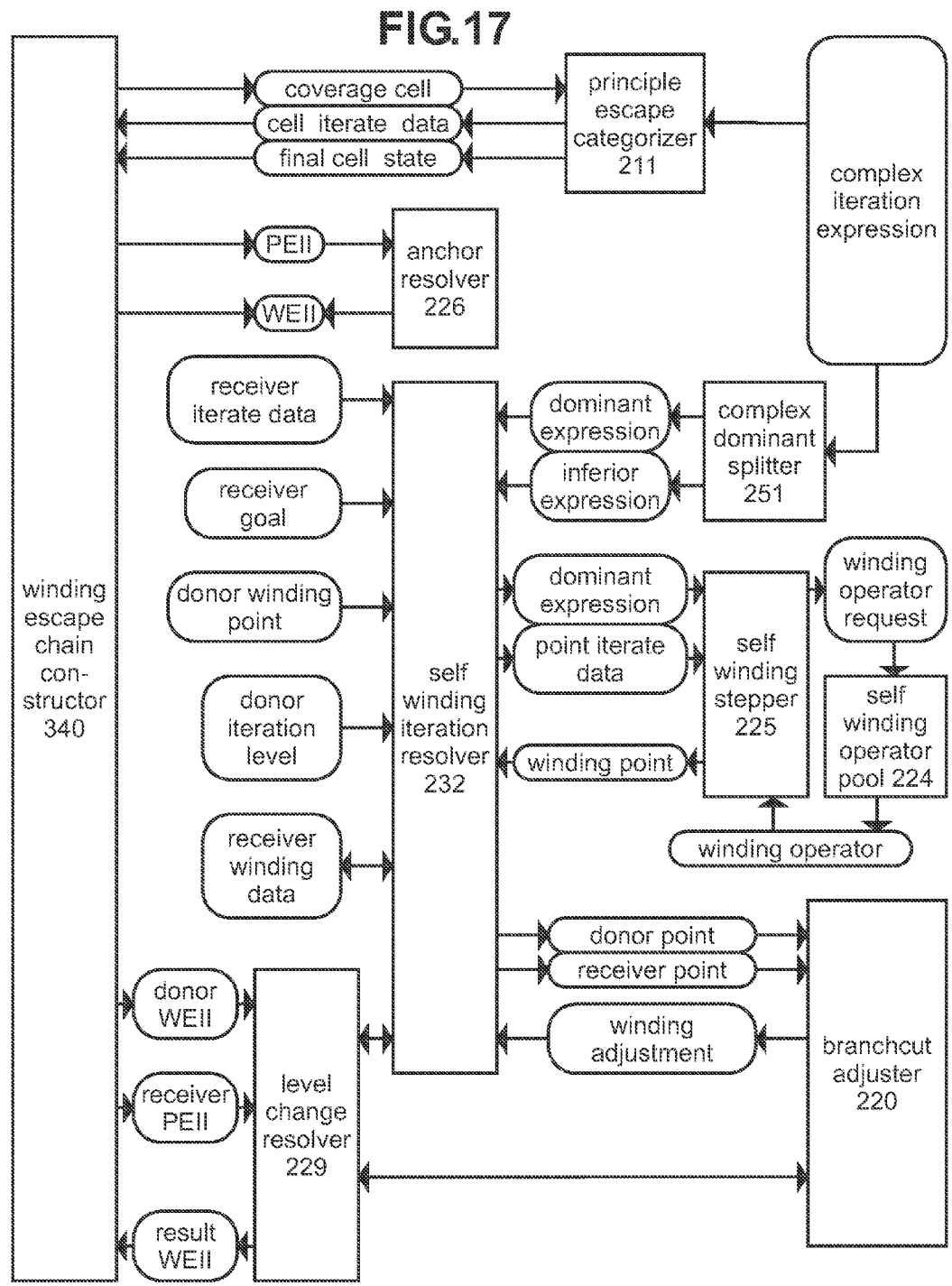

FIG. 16B A diagram for automatic calculation of termination distance for point iterations FIG. 17 A diagram for creation of winding escape chains

REFERENCE NUMERALS

From Prior Patent Application 050 inclusive metacomplex scalar
052 inclusive rigid body rotation
054 inclusive invert operator
056 unit power operator
058 zero power operator
060 optimal inclusive additive operator
062 inclusive metacomplex shape converter
064 inclusive metacomplex range
066 stable inclusive complex multiplication
068 stable inclusive quaternion multiplication
070 cubic inclusive quaternion multiplication
072 inclusive complex contraction power
074 inclusive hypercomplex contraction power
076 stable inclusive complex sqrt power
078 stable inclusive hypercomplex sqrt power
080 inclusive robust complex expansion power
082 inclusive hypercomplex expansion power
084 stable inclusive complex square power
086 stable inclusive hypercomplex square power
088 stable inclusive metacomplex three halves power
100 interval expression sequencer
102 interval evaluator
104 interval operator pool
110 dual evaluator
112 dual operator pool
114 dual tester
116 precision iterator From this Patent Application 200 parametric interval iterator
202 level iterator
204 escape categorizer
205 category escape initializer
206 indeterminate checker
207 escape distance solver
208 cell iterate analyzer
209 precision escape initializer
210 cell categorizer
211 principle escape categorizer
220 branchcut adjuster
222 same level resolver
224 self winding operator pool
225 self winding dominant stepper
226 anchor resolver
229 level change resolver
232 self winding iteration resolver
250 dominant splitter
251 complex dominant splitter
252 dominant reducer
254 inferior reducer
256 escape formula replacer
258 positive real root solver
260 metacomplex extreme absolute converters
262 common iterate replacer
264 escape distance driver
270 dominant extractor
272 coefficient power separator
274 level degree pair correlator
276 commonality correlator
278 correlation driver
300 potential point iterator
302 commonality function generator
310 field line point iterator
320 winding escape sequencer
330 topological storage manager
340 winding escape chain constructor

DETAILED DESCRIPTION

From Prior Patent Application on Interval Processing

Figure 1:
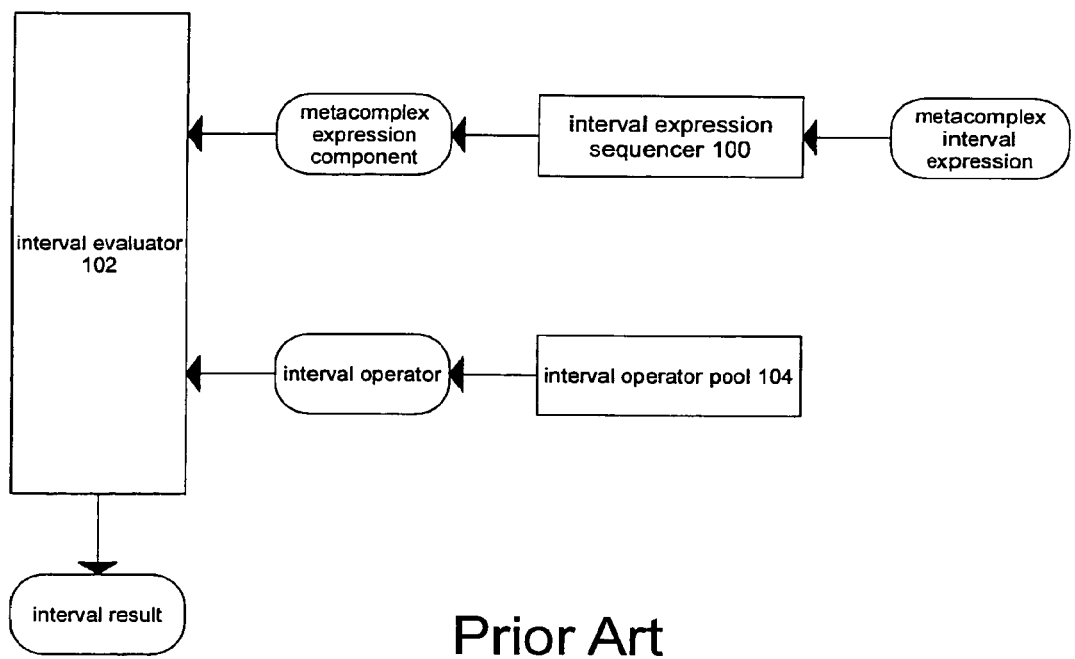
FIG. 1 shows the basic components for evaluating an interval expression, as in the prior art.

Interval Expression
Evaluator Embodiment—see FIG. 1
Description: Interval Expression
Evaluator Embodiment, FIG. 1

FIG. 1 shows the traditional and prior art arrangement of three components to implement an INTERVAL EXPRESSION EVALUATOR EMBODIMENT. Although, this arrangement of three components is well known, the novelty lays in the enhancement of the technology of the interval operators within the interval operator pool (104). This description is not a new invention. The improved interval operators, described later, are new.

Interval Expression Sequencer (100)

An interval expression sequencer (100) defines metacomplex interval expression as a mathematical mapping on a point collection as an evaluation sequence of metacomplex expression components consisting of interval operands and interval operators. Interval operands may be input or postimage intervals representing the ongoing results of interval processing. In order to handle multivalued mapping operators, such as square root operators, the interval expression sequencer (100) must also include, where needed, branchcut criteria.

Interval Operands

Each interval operator takes one or more interval operands as parameters acting on a bounded set of points, usually within the complex (of 1 imaginary axis) and hypercomplex number systems (having 2 or more imaginary axes). The term metacomplex is used to simultaneously refer to both the complex and hypercomplex number systems.

Herein, interval operands are usually called a disc or metadisc: a metadisc is the collection of points within a circle or a higher dimensional circle such as a sphere. In some cases one of the operands may be constant or range of values. A metadisc is ideal, but some other forms are used, such as a metasquare: a metasquare is a square, cube, or a higher dimensional square, called a hypercube. Metasquares often occur as a shape interval. A shape interval often occurs when subdividing a parameter space into smaller portions; other space-filling shapes such as hexagons may occur.

A metasquare specifies each of its boundary sides. In all cases, it is useful to consider all values defining an operand as exact values. That is a center location is an exact value, whether floating point or otherwise. Similarly, the radius is A complex, hypercomplex or metacomplex adjective often precedes a disc interval to indicate the type of underlying number system.

Disc Interval, Metacomplex Disc Interval, Etc.

A metadisc is usually represented by a center location and a radius; such intervals are called disc intervals.

Postimage Intervals, Preimage Interval

A postimage interval is simply an interval generated when an interval operator acts on interval operands to produce a resulting interval. A preimage interval is another name for an interval operand.

Shape Intervals

Even within a system operating on disc intervals, other shapes may occur. These arise as a result of subdividing a parameter space. These shape intervals must be converted into a standard interval such as a disc interval.

Constant Interval Expressions: Implicit and Explicit

When the metacomplex interval expression contains no variables, it is called a constant interval expression. This form can be an implicit interval expression or an explicit interval expression.

When an interval expression is exact, such $2+1/(3+2I)^2$, then the interval expression is implicit and represents the mapping of a single point to a single point. As the evaluation proceeds, each mathematical mapping will likely generate some numeric error, which is processed as an inclusive interval; thus there is an implicit interval process.

An explicit inclusive interval expression means includes one or more interval operands as part of its original input values. Suppose we let OptimalComplex[2+I, 1/10] define a center location and radius of a disc interval in the complex plane. Then there is an explicit interval in the interval expression, OptimalComplex[2+I, 1/10]+1/(3+2 I)/2.

Branchcut Criteria, Nearest Branchcut Position

In order to evaluate an interval expression which incorporates non-integer real powers, whether positive or negative, an interval operator, such as a square root operator, must know which of several roots is the correct root, in order to determine the postimage interval. It is sufficient to determine the branchcut for the center of an interval, the center location. One simple method is to specify a nearest branchcut position for all branchcuts of the center location of a disc interval under consideration. For example, if the nearest branchcut location is specified as 1, on the real axis, in the complex plane, and a square root is taken, then the branchcut chosen is that which lies in the half plane where the real values are greater than 0. Thus, a general solution for complex and hypercomplex systems is to choose the nearest branchcut.

In the complex plane, the closest branchcut can be defined as the one whose argument angle is nearest, whether rotating clockwise or counterclockwise around the origin. For example, note that −0.9 Pi radians is closer to Pi radians (via clockwise rotation) than it is to −0.5 Pi radians (counterclockwise rotation).

Intrinsic Expression Mode

An intrinsic expression mode is mode of the interval expression sequencer (100) where at least some operand is an actual metacomplex interval (not merely a single point value) and an intrinsic interval operator is indicated. An intrinsic interval operation is any interval operator which distorts the shape of the metacomplex interval. For example, power functions, and multiply or add of two metacomplex intervals. For example, if the original interval is the shape of a disc, and is raised to an integer power, then the true shape of the resulting image cannot be described as a disc. Of course, it is typical that the result is an inclusive disc which is large enough to fully enclose whatever intrinsic interval defines the postimage interval. However, if the entire expression consists of scalars times metacomplex intervals, then the resulting postimage intervals are not distorted.

Interval Operator Pool (104)

The interval operator pool (104) is a collection of implementations of interval operators. An interval operator maps interval operands into a postimage interval. Each interval operator has a mathematical mapping operation and a postimage warranty.

Mathematical Operators

For our purposes, the mathematical operator is a arithmetic operator or a real power operators. Other operators are available: see *Complex Interval Arithmetic and Its Application*.

Postimage Warranty, Inclusive Warranty

A postimage warranty (my term) is a logic property of an interval operator. An inclusive warranty is that images of all preimage points are included in the postimage interval. This follows naturally from one of the main goals of interval analysis which is to find the worst possible error intervals.

Dual Operator Pool (112)

A dual operator pool (112) is an extended form of the interval operator pool (104) which performs two types of rounding, and therefore two interval results; one of the interval results is the a pure inclusive result. For details on this mode refer to the DUAL ROUNDING INTERVAL EXPRESSION EVALUATOR EMBODIMENT of FIG. 4.

Interval Evaluator (102)

The interval evaluator (102) performs the numeric evaluation of an interval expression defined by a interval expression sequencer (100) by calling upon specified interval operators of the interval operator pool (104). This step-by-step evaluation of interval operands applied to interval operators produces a sequence of postimages, all of which may also serve as interval operands. The numeric precision of evaluation will determine the quality of "tightness" of the resulting postimage intervals, and the interval operators must support the specified precision of the numeric evaluation.

For example, Mathematica has an expression evaluation called "N", which performs numeric evaluation of mathematical expressions, including complex intervals; N can be considered as a interval evaluator (102). The interval expression passed to "N" defines the mathematical operations and can be considered as an interval expression sequencer (100). No doubt, inside the Mathematica® software machinery, the "N" routine calls upon support routines to perform the action of the interval operators. Taken together, these support routines can be called an interval operator pool (104).

In some applications, the entire embodiment may be compiled and assembled into a single small and optimized subroutine.

Note that all numeric processing is performed by interval operators of the interval operator pool (104), and the interval evaluator (102) sequences the calls to interval operators and manages the resulting postimage intervals.

Operation: Interval Expression

Evaluator Embodiment, FIG. 1

The interval evaluator (102) usually has a default value used to specify numeric precision. For example, many applications always use double precision floating point as the default numeric precision. In other cases, a specific numeric precision may be specified for use in evaluating an interval expression.

Inclusive Interval Operator

Compendium: See FIG. 2, FIG. 3

Overview

This section describes new and improved optimal metacomplex interval operators, together with a summary of previously known operators. Together, all simple arithmetic and real power operators are available, together with some degenerate and special operators. Interval processing is very strict; the goal, in essence, is to provide a numerical proof of the postimage warranty, which is the inclusive warranty described above.

True Image Shape, Intrinsic Dilution

All these operators operate on metadisc operands. The points defined by the preimage intervals produce a postimage interval. Even when the mapping is theoretically perfect, the resulting shape, defined by all postimage points, will not necessarily be a metadisc; this shape, whatever it may be, is called the true image shape. Its convenient to convert this true image shape into an optimal metadisc interval. That is, given that the final shape must be a metadisc, the resulting postimage interval, is the smallest possible metadisc, which fully encloses the true image shape. If the true shape image is not metacircle then there are points lying inside the optimal disc interval and outside the true image shape. These points are said to dilute the inclusive interval and constitute what I choose to call intrinsic dilution.

Numeric Dilution:

Numeric dilution occurs because numerical processing produces numeric errors. The result is that the exact best values cannot be known. For any vagueness in the result, the overriding concern is to preserve the warranty for inclusive image logic. Thus, results need to be rounded-off by increasing the metacircle radius for inclusive results.

Numeric Stability

Except for some considerations for some real powers, all of the arithmetic interval operators can be implemented using numerically stable techniques.

Expression Calculations

An expression evaluation is considered to be numerically stable if the basic operations can all be performed with the resulting value's relative precision guaranteed to be exact except for minor rounding and other small errors. In particular, cancellation of digits, such as when adding nearly equal positive and negative numbers, of which at least one value is approximate, is not allowed unless it is known that the error is always kept to the equivalent of a few URE rounding errors. For IEEE arithmetic, and easily implemented software floating point which incorporates IEEE rounding methods, exact values of different signs can always be added together with minimal (i.e. 1 URE) rounding error.

Polynomial Approximation

Optimal disc interval processing for some functions, not basic arithmetic, requires evaluation of a nonlinear real function. These functions are very smooth and easy to interpolate using standard methods for approximation functions.

Complex and Hypercomplex Multiplication Error Analysis:

Stable Point Multiplication Form:

Complex multiplication and quaternion multiplication of exact floating point values may be needed while processing some disc intervals. The general expanded forms for complex are easily extended to hypercomplex systems. Rounding errors, measured in URE, appear are less than $\text{Sqrt}[n]*n*\text{URE}$.

Resulting Error

On page 79, Nicholas Higham, in his book, *Accuracy and Stability of Numerical Algorithms*, indicates that the worst case IEEE rounding error for an expanded complex multiply is $\text{Sqrt}[2]*2\text{URE}$, with respect to the absolute value of the result. Note that a nURE value is given by $(n*u)/(1-n*u)$ on page 69 of the same book, where u is the unit rounding error for the floating point mantissa size. A three dimensional multiply is useful for squaring a three dimensional number (i.e. the last imaginary axis, the "k" axis of a quaternion, is zero). Using similar logic, I deduce $\text{Sqrt}[3]*3\text{URE}$. Similarly for four dimensions, $\text{Sqrt}[4]*4\text{URE}$ is obtained. Note, the Euclidean error of the final result is this rounding error times the absolute value of the full multiplication result. Be careful about the ordering of values: for 4 dimensions, each axis is the sum of four terms, each consisting of a single multiply; summing is performed in a tree-like form: (term1+term2)+(term3+term4).

Derivation

But where do I obtain the Sqrt[3], and Sqrt[4]==2, arise? In the Higham book, the 2 of Sqrt[2] comes about from the fact that $2 (a^2+b^2)(c^2+d^2) \geq ((\text{Abs}[ac]+\text{Abs}[bd])^2+(\text{Abs}[ad]+\text{Abs}[bc])^2)$, where all the {a,b} are the components of a complex number and similarly for {c,d}. The inequality relates to the norm. This inequality becomes equality when all a==b==c==d. Note the value 2 in the inequality. Similarly, for equal component values, and an analogous inequality, the 2 becomes a 3 in three dimensions, and a 4 for quaternions. (Note, for three dimensions, it is meant that the last component value, the "k" axis", of each operand is zero).

Rounding Errors and Worst Case Intervals

The rounding errors for disc intervals can be very small compared to the above described intrinsic dilution errors. It can be very tempting to ignore the rounding errors because they add so much time to computation. This can be dangerous, particularly when working with critical calculations. It is important to keep track of all errors in the interval operand algorithms so that the radius of the resulting disc interval can be appropriately increased to include the worst case error in the new center location of the disc interval, as well as any errors in calculating the new radius. Several methods are suggested.

Traditional Interval Processing

Traditional methods of tracking worst case error, for real value processing, involve using CPU rounding modes (or software implementation) to round values in higher and lower to determine worst case results. Absolute errors of real intervals can be extracted by differencing the lowest and highest bounds of an interval. This method of tracking errors can be very fast when floating point is implemented in software. In modern hardware implementations, changing rounding modes has deleterious effects on the CPU pipelines. Traditional interval processing is very good at handling all types of arithmetic errors, including massive digit cancellation.

Fast Multiply Interval Processing

Modern CPU floating point has very fast floating point multiplies, which, when the underlying rounding errors can be known, allow the fast calculation of absolute errors and other interval adjustments. I developed this method myself.

Suppose using error analysis, we know the number of unit rounding errors for a particular real valued result. We can define a real valued interval which will encompass the worst case error using two multiplies, which should be faster and cleaner than changing CPU floating point flags and repeating the operation with alternate rounding. Here is how. Recall that a nURE=(n*u)/(1−n*u), where u is the unit rounding error for the floating point mantissa size, and n is the number of unit rounding errors. If we multiply by a value by nURE, then an absolute error can be extracted. Similarly, if we multiply by 1+nURE, then the value can be adjusted upward to obtain an upper worst case error bound. Similarly by multiplying by 1/(1+nURE), a lower error bound can be obtained. Such calculations should include their own error compensation. All constants can be precalculated for each specific floating point mantissa length.

Safe Versus Unsafe

This document introduces the concept of safe and unsafe rounding. Books on complex interval analysis don't spend much time describing how to implement rounding error compensation. To preserve the postimage warranty (described above), the rounding errors affect the final result by increasing the size of the interval; such rounding is what I call "safe" rounding. If rounding is in the other direction, then it is "unsafe" and the warranty no longer applies. So why calculate "unsafe" when no other author even describes such a process? This calculation is useful because it can be used to detect insufficient precision, as described later.

3D and 4D (and Higher) Dimensions

A generalization of the complex number system to higher dimensions is relatively simple. Each additional dimension requires another imaginary axis. Whereas the single axis for a complex system is called "i", the higher dimensions are called "j", "k", etc.

Unitizing an Optimal Metacomplex Disc Interval, Using Unitized Metacomplex Form

Unitizing is the name of a technique for simplifying the algorithms of some interval operators. This method is utilized by books on complex interval processing. It is described, for reference, below. When unitizing, metacomplex disc intervals are reduced to a disc in the complex plane centered at location 1 on the real axis.

Unitized Metacomplex Form

This method for unitizing is called the unitized metacomplex form.

Nominal Center Location

A "nominal center location" is determined by the mathematical operation associated with the interval operator, but applied just to the center location of the interval operands. For example, if the input operands are quaternion disc intervals, and the operation is multiplication, then the nominal center location is the product of the center locations of the two interval operands. The absolute error (as a Euclidean distance) is computed and saved.

Input Unit Radius or Input Unit Radii (Safe and Unsafe Input Unit Radii)

For each interval operand a unit radius is calculated by dividing the original interval radius by the absolute value of the center location of the same interval operand. Errors in calculating the center and radius are accumulated. The safe input unit radius is the calculated input unit radius plus any accumulated errors. If an unsafe input unit radii is desired, then any accumulated error is subtracted from the input unit radius to create the unsafe input unit radii.

Result Unit Center, Safe Unit Radius, Unsafe Unit Radius

A special operation occurs which creates a resulting unit radius and unit center; this process is unique for each interval operator. Generally, safe and unsafe unit radii are processed separately. The result unit center is considered an exact real value (often near 1 on the real axis). As with calculating the input radii, the safe and unsafe radii are generally calculated separately and all accumulated errors, including absolute error of the unit center, are either added (for the safe radius) or subtracted (for the unsafe radius). These adjustments are similar to that occurring for the input unit radius calculation.

Final Center Location

The resulting unit center, a real value, is a stretching value between 0 and infinity. It is used to scale the previously calculated metacomplex nominal center location to create the final center location. Any absolute error is accumulated and will need to be applied to the radii.

Final Radius, Safe and Unsafe

The final radius for the final center location is calculated in the same proportion to the absolute value of the final center location, as is the unit radius to the result unit center. All relative and absolute errors must be used to adjust the final radius to meet the postimage warranty. All such operations are usually performed separately for safe and unsafe radii.

Non Intrinsic Optimal Disc Interval Operators

Overview

A list of simple, all with zero intrinsic dilution error, optimal interval operators are shown at the top of FIG. 2. The table of FIG. 2 indicates number system, together with an indicator for additional branchcut data. Only the inclusive invert operator (054) offers a new technique over the prior art, and this technique is only to ensure numeric stability. In all cases the absolute error of the center calculation and the rounding error of the radius are used to adjust the radius according to the choice of safe and unsafe rounding.

Inclusive Metacomplex Scalar (050)

A metacomplex scalar takes a metacomplex disc interval and multiplies it by a metacomplex scalar. The new center is simply the original metacomplex location multiplied by the scalar. Similarly, the new radius of the disc is found by scaling the original radius by the absolute value of the metacomplex scalar. The error analysis for metacomplex multiplication of the center location by the scalar was described earlier. Note, in general, the metacomplex dimension of both the disc interval and the scalar will be 2 or 4; multiplying in three dimensional space is limited—see rigid body rotation, immediately following. Simplified algorithms are possible when the scalar is pure real. A special case is negation; that is when the scalar is −1, there is no rounding error of any kind. All that is required is to negate the center location.

Inclusive Rigid Body Rotation (052)

Rigid body rotation in 3D space is accomplished by pre-multiplying a center location of a 3D hypercomplex interval by a unit length quaternion scalar, and then post-multiplying the result by the conjugate of the same scalar. Of course, to multiply, both values must be a quaternion. Therefore, the original center location is treated as being the 3 imaginary axes, and a zero is used for the real axis. That is, the 3D real value is mapped to the "i" quaternion axis, and the original "i" and "j" are mapped to the "j" and "k" axes. Similarly, after both the pre and post multiplications, the mapping is reversed. The radius is adjusted to affect the postimage warranty. Rigid body rotation is a well known rotation operator utilizing quaternions. Refer to the referenced book *Quaternions and Rotation Sequences*.

Inclusive Invert Operator (054)

The invert operator maps a disc interval to its inverse optimal disc interval, for any dimensional space. Naturally, the invert operation can be used with a power operator (described later) to raise an interval to a negative power. Also, if a multiply operator is available then a divide operator can be easily implemented by a multiplying the dividend interval by the inversion of the divisor interval. Inversion is sometimes considered invalid when the disc interval operand includes zero. In the book, *Complex Interval Arithmetic and its Application*, the authors provide formulas for finding the center and radius of an optimal disc interval for the inverse of a disc interval. The formula requires calculation of a denominator term of (Abs[center]^2−r^2). this is numerically unstable when the absolute value of the center location is similar to the original radius, denoted by r. None-the-less, the formula can be used directly whenever the absolute value of the center location is more than 2 to 4 times larger than the radius; this may be typical. Here are the formulas: the new center equals the conjugate of the prior center location divided by the denominator described above. The new radius of the optimal disc is simply the prior radius divided by the denominator term. Don't forget to compensate the resulting radius for all accumulated error.

Recall the previously described method of "unitizing", the unitized metacomplex form. When this method is used, the denominator can always be calculated with only a couple unit rounding errors. The unit center location has an absolute value of 1, therefore the denominator term, described above as (Abs[center]^2−r^2) becomes (1−unitRadius^2). (1−unitRadius)(1+unitRadius), where unitRadius is an exact number (typically a floating point value). The term (1+unitRadius) can be calculated with only 1 unit rounding error, as can (1−unitRadius). Although (1−unitRadius) may appear to suffer dramatic digit cancellation error; it does not, when using IEEE correct rounding. The product of these simple terms also produces 1 unit rounding error, for a total of 3 unit rounding errors.

Unit Power Operator (056), Zero Power Operator (058)

These two interval operators have virtually no processing. The unit power operator (056) raises an interval disc to a unit power: the disc interval is unchanged. The zero power operator converts any disc interval to a zero radius disc with a center at unity (real axis equals 1, and all imaginary axes are zero).

Direct Intrinsic Optimal Disc Interval Operators

Overview

Refer to FIG. 2. This section describes disc interval operators which produce results with intrinsic dilution. That is, the mathematical mapping of a metadisc produces a non-metadisc as a true image shape. The new optimal disc interval must enclose the entire postimage shape, which causes some non-image points to be included.

Optimal Inclusive Additive Operator (060)

The inclusive additive operator (060) can be used for both addition and subtraction of two operands: the only difference between addition and subtraction is in the calculation of the center location.

Center Location for Inclusive, Safe and Unsafe

The new center location is given by the metacomplex sum (or difference for subtraction) of the two center locations. The rounding error is typically 1 or 2 unit rounding error. The overall absolute error of the center location can be calculated from this relative error and later used for adjusting the final radius.

Radius-Inclusive, Safe and Unsafe

The preliminary value for the new radius for the optimal inclusive additive operator (038) is simply the sum of the radii of the operands. For safe inclusive processing, the effects of the absolute error of the center location and relative error of the radius calculation directly increase the final radius value. For the unsafe inclusive form, the radius sum is decreased by all the numeric rounding errors.

Inclusive Metacomplex Shape Converter (062)

The difficulty of a shape conversion depends upon the shape. In a typical application, the input shape is a metasquare. In this case the new center location is the center of the metasquare. Be sure to consider any absolute error in the center location, when calculating the radii.

Radius-Inclusive, Safe and Unsafe

For an inclusive conversion, the new radius is simply made large enough to reach every vertex of the metasquare from the center location. For safe processing, the radius must be guaranteed to fully enclose the entire shape, by adding in rounding errors to the radius. For unsafe processing, the rounding errors work to reduce the size of the radius.

Unitizing Range Operator: See FIG. 2

Overview

This section describes a disc interval operator for which the previously described "unitizing" method is employed, referenced by unitized metacomplex form. Generally, when a unitizing operator is used with two operands, both operands are scaled. However, in this case, where one operator is a disc interval and the other a real valued interval, only the disc interval is unitized. Recall that the "Nominal Center Location" step for unitizing involves calculating a center location which will later be adjusted. Here, the Nominal Center Location is the same as the original center location. Another step, Final Center Location, which uses the Nominal Center Location, still functions as before.

Inclusive Metacomplex Range (064), with Unitized Metacomplex Form

This interval operator takes two operands. The first operand is a metacomplex disc interval. The range operand specifies a continuous range of positive values. The operator finds an interval which encloses all possible points found by scaling any point of the disc interval by any point of the range of positive real values. If the metacomplex disc interval is unitized, using the unitized metacomplex form, then a simple method can be used. Two numbers will be computed: a low-end and high-end. The following description results in a unit radius (safe or unsafe, depending upon rounding) and a unit center location. Refer to the section on unitizing for finding the final center location and final safe and unsafe radius values.

High-end Value

The high-end value is easy. It is the largest value of the range times 1+r, where r is the unit radius (safe or unsafe).

Low-End Value

The low-end value depends upon the input unit radius (safe or unsafe) of the unitizing process, called r. If r=1, the low-end value is zero, if r<1, then the low-end value is given by the smallest value of the range times (1−r). Otherwise, r is greater than 1, and the low-end value is given the largest value of the range times (1−r), producing a negative number.

Result Unit Center

The unit center value is given by the average of the low-end and high-end values.

Result Unit Radius

The result unit radius value is 0.5 times the difference in high-end and low-end values.

Optimal Disc Multiplication Interval Operators: See FIG. 2

Overview

As described in the discussion of prior art, there are two main problems with the optimal multiplication of Krier.

First, there is the problem inclusion isotonicity: that is, the results are not always optimal. The problem only appears in degenerate cases where one of the disc intervals is centered at zero. This is trivially fixed by utilizing simple algorithms for special cases. In all cases, where an operand is centered at zero, the result will be centered at zero, and have a radius equal to the product of the radii of both operands. No more need be said, and the remaining discussion is centered on the non-degenerate case where both interval operands have non-origin based center locations. This more difficult case does not have a problem with inclusion isotonicity.

The second problem is much more troublesome as the prior art implies that the real root of a cubic equation is required to be found. This is disturbing, because direct cubic root solution of the equation produces roots which usually are numerically unstable. My multiply implementation a stable expression which returns that same desired real root, and the remainder of the algorithm (for a unitized version), already found in the literature, can be utilized. However, details for unitized method are provided herein.

The following description of multiplication requires use of the previously described "unitizing" method.

Stable Point Multiplication Form and Unitized Metacomplex Form

Regardless of the multiplication method, the use of the previously described stable point multiplication form and the unitized metacomplex form are useful in obtaining the best quality result with numeric stability.

Stable Krier Real Root Form

The real root is found by evaluating:

$$\frac{\sqrt{3}\ r1\ r2 \operatorname{Sec}\left[\frac{1}{3} \operatorname{ArcCos}\left[\frac{3\sqrt{3}\ r1\ r2}{(1+r1^2+r2^2)^{3/2}}\right]\right]}{2\sqrt{1+r1^2+r2^2}}$$

In the above expression, r1 and r2 are the unitized radii of the two operands; both are exact values. Only a few commonly available functions need to be available. Note that constants such as the square root of 3 are calculated once. Also, if (1/Sqrt[1+r1^2+r2^2]) is calculated once, and called the INVERTSQRT, then this expression becomes:

$$\frac{1}{2}\sqrt{3}\ r1\ r2\ \mathit{INVERTSQRT}[r1, r2]$$

$$\operatorname{Sec}\left[\frac{1}{3}\operatorname{ArcCos}[3\sqrt{3}\ r1\ r2\ \mathit{INVERTSQRT}[r1, r2]^3]\right]$$

In typical implementations, a divide operation is often as slow as a square root. By implementing an inverse square root function, performance is greatly improved. If such a routine is not available, then inverting the result of the square root function is similarly stable and precise, but probably takes a little longer.

Reduction to Two Special Functions:

The above formula requires only three special functions: INVERTSQRT[r1,r2] and Sec and ArcCos evaluations. This can be further reduced to two functions by creating a fast approximation, such as a polynomial approximation or rational approximation, for the function Sec[ArcCos [t]/3], called SecThirdArcCos [t].

Analyzing the "t" Parameter

Define t as:

$3\sqrt{3}r1r2\mathit{INVERTSQRT}[r1,r2]^3$

For r1>0 and r2>0, it is easy to show that this function is limited to between 0 and 1. The smallest value is 0 because all terms are positive. The maximum value is found by:

$$\operatorname{Print}\left[\operatorname{Maximize}\left[\frac{3\sqrt{3}\ r1\ r2}{(1+r1^2+r2^2)^{3/2}}, r1>0\ \&\&\ r2>0, \{r1, r2\}\right]\right];$$

$\{1, \{r1 \to 1, r2 \to 1\}\}$

Clearly t can be evaluated precisely, but can the rounding error be analyzed? Error analysis of real multiplication is straightforward for IEEE arithmetic, and therefore the only issue is for the function call INVERTSQRT. Errors can be analyzed because INVERTSQRT uses a standard sqrt function (which on a good system, rounding error can be kept to 1 or 2 URE). Also the input rounding error INVERTSQRT function is also easy to calculate. In all cases, the for r1>0 and r2>0, the value of t should be limited to between 0 and 1. For example, when the value of t is very close to 1, rounding error may cause it to slightly exceed the value of 1. In such case the ArcCos [t] may return a complex number instead of a real value; it depends upon your system. By limiting t to a maximum of 1, this simple problem is avoided.

Analyzing SecThirdArcCos [t], the Approximating Function

SecThirdArcCos [t], which equals Sec[ArcCos [t]/3], is a smooth over the range of t=0 to t=1. Print[Table[Sec[ArcCos [i]/3.], {i, 0., 1., 0.2}]];

{1.1547, 1.11407, 1.07961, 1.04975, 1.02345, 1.}

A very small derivative reduces the effect of any rounding error in the parameter "t". The final error will depend upon the input error, the reduction of the input error by the derivative of the function, and the effect of additional error caused by the function itself. In all cases, a precise, fast and stable function can be achieved with a good polynomial approximation combined with a precise polynomial evaluation method.

Analyzing Sec[ArcCos [t]/3]

If an approximation function is not available, then Sec [ArcCos [t]/3] can be implemented by composing the result of ArcCos [t] with division by 3 following by taking "Sec" function of the result (secant). Suppose the value of t has small relative error near t=1. ArcCos [t] is numerically unstable near t equal 1: much larger relative error is the result. Notice the numeric instability as input values approach 1. In this case, the input value is set to a precision of 15 decimal digits. Notice the decreasing precision of the output as t→1 using Mathematica®'s precision tracking numerical software. The SetPrecision function, seen below, sets the decimal digit precision.

Print[temp=Table[ArcCos [SetPrecision[1−(½)^n,15]], {n, 5, 50, 10}]];

{0.25065566233613, 0.007812519868, 0.00024414063, 7.629×10⁻⁶, 2.4×10⁻⁷}

Although the above results indicate a rapidly decreasing precision for values near t=1, a more exact readout of precision for each value is possible:

Print[Table[Precision[temp[[i]]], {i, 1, Length[temp]}]];

{13.8074, 10.7856, 7.77528, 4.76498, 1.75468}

However, the table, of ArcCos [t], has its precision restored for the composition of functions. The following code completes the Sec[ArcCos [t]/3] function for the above values:

Print[final=Table[Sec[temp[[i]]/3], {i, 1, Length [temp]}]]; {1.0035006406054226, 1.0000003390868842, 1.0000000033 11369, 1.000000000003234, 1.000000000000003}

These final values have a higher precision than the input. Print[Table[Precision[final[[i]]], {i, 1, Length[final]}]];

{15.9625, 15.9543, 15.9542, 15.9542, 15.9542}

This method is stable; the numeric instability in relative error near the extremely fast changing derivative of ArcCos [t] near t=1 is completely mitigated.

Use of Sec[ArcCos [t]/3]

Although a minor performance increase may be found by an approximating function, there the double function calls may be a better approach because widely available methods for implementing Sec and ArcCos allow for arbitrary precision.

Stable Inclusive Complex Multiplication (066)

This interval operator takes two metacomplex disc operands. The resulting metacomplex disc interval represents the optimal inclusive disc interval result for the product of two operands. The algorithm is described based upon both operands transformed by unitizing. (If at least one of the interval operands is centered at zero, then the simple degenerate algorithm, above, is to be used). Use the stable Krier real root form to determine the real root.

Result Unit Center: 1+root, where root is the real root described above.

Result Unit Radius:

The result unit radius value is (1+root)*Sqrt[2*root+r1^2+r2^2], where root is the real root described above. Note that the first term (1+root) is the same as the result unit center.

Stable Inclusive Quaternion Multiplication (068)

This operator is implemented identically to the complex case. In searching the little literature I had, I could find no reference to an optimal enclosure for higher dimensions, such as quaternions. However, using the product of a parameterization of the surface of a quaternion disc and a parameterization for a second disc, I was able to show that for random pairs of radii, the non-linear search for the best radii and center location produced the same results as for the complex case. The only difference is that finding the new center involves quaternion arithmetic.

Cubic Inclusive Quaternion Multiplication (070)

This process is the same as the above quaternion means but instead of using the stable Krier real root form, the unstable cubic solution is used. This means should never be used; the stable form above is far superior.

Contractive Power Operators: See FIG. 2

Overview

This section describes disc interval operators raising disc intervals to a positive real power less than 1. Discs are assumed to have a center location which is not the origin. An explicit solution, without unitizing, is provided for all cases. This formula can be used directly, but is numerically unstable when the radius approaches the absolute value of the center location. For cases where stable solutions are not available, the use of approximating polynomials can solve stability problems, at the cost of setting up the polynomial approximation. Similarly, results are for a unitized radius of less than 1; which is to say, the original disc interval operand does not include the origin. Safe and unsafe routines can be developed using methods described earlier for rounding direction of unitized operators. For the special case of square root, an explicit and numerically stable method is shown. If the disc interval, which is used for input, is centered at the origin, then the resulting center location remains at the origin, and the radius is determined by raising it to the specified real power; because of simplicity, this can be considered a degenerative case.

Unitized Contraction Power Form

As pointed out in section 3.5 of *Complex Interval Arithmetic and its Application*, where a proof is provided for p=1/k, for k an integer, a simple formula can be used to find the optimal disc interval for p. This formula works more generally for p, where 0<p<1.

$$\left\{\frac{1}{2}((1-r)^p + (1+r)^p), \frac{1}{2}(-(1-r)^p + (1+r)^p)\right\}$$

Inclusive Complex Contraction Power (072), and Inclusive Hypercomplex Contraction Power (074)

Here, the above described expression, the unitized contraction power expression, is used to find an inclusive interval for hypercomplex interval operands of at least two imaginary axes. The general expression can be evaluated directly or by creating a polynomial approximation.

Stable Inclusive Complex Square Root (076), and Stable Inclusive Hypercomplex Square Root (078), with Radius Square Root Form This interval operator finds an optimal inclusive disc for a square root operator. Of course it requires branchcut criteria to determine the correct branchcut. Unitizing is used. The calculation of the result unit radius requires a numerical trick for numerical stability. Using a unitized formula, the hypercomplex square root is calculated in the identical fashion as the complex case.

Result Unit Center

The unit center value is given by an average:

$$\frac{1}{2}(\sqrt{1-r} + \sqrt{1+r})$$

The above expression is stable when used with correct rounding and r as an exact number, which it is when a unitized process is used.

Result Unit Radius: Stable Square Root Form

The required expression for calculating the result unit radius:

$$\frac{1}{2}(-\sqrt{1-r} + \sqrt{1+r})$$

is inherently unstable. However, it can be calculated as: radius square root form=

$$\frac{r}{\sqrt{1-r} + \sqrt{1+r}}$$

Note that the denominator is simply twice that of the calculation for the result unit center; therefore only two square roots are required for the unitized calculation of the center and radius.

Non-Linear Unitizing Expansion Power Operators: See FIG. 2

Overview

Here, the goal is to find an optimal inclusive interval for a disc interval raised to a real power greater than 1. In general, a complete solution is provided in the book *Complex Interval Arithmetic and its Application*, although the authors limit their solution to positive integers, the general concept works with any positive number. By incorporating proper branchcut criteria, and utilizing the unitizing process, the algorithm can be extrapolated for use for any real power greater than 1. This inclusive process can be extended to any hypercomplex dimension to produce optimal inclusive intervals.

Unitized Metacomplex Form: See Earlier Description

Robust Expansion Nonlinear Search Form, Expansion Search Limit Forms

I believe my method of the nonlinear search, called robust expansion nonlinear search form, which includes both lower and upper bounds for a non-linear search, is more robust than that from the above mentioned book. The forms for the extreme search limits are called expansion search limit forms discs centered at origin If the disc interval, which is used for input, is centered at the origin, then the result is almost trivial. The center location remains at the origin, and the radius is determined by raising it to the specified real power.

Crest Approach

In general, both the prior art and the new parameterization rely on parameterizing a unitized radius, centered at $\{1,0\}$ in the complex plane, and finding a point on the circle boundary which when raised to a power "p", where p>1, the image of the point is at the highest point (largest imaginary value) of all image points of the circle. Then, that image point is broken into a real and imaginary parts, where the real part becomes the result unit center and the imaginary part becomes the result unit radius. It is that simple, and the unitized result works in complex as well as hypercomplex dimensions.

Prior Crest Approach

Here is a specific type of method for implementing a crest approach. Without plagiarizing the details, the original approach taken is as follows:

For complex intervals, a complete non-linear solution for finding optimal inclusive disc intervals raised to a power "p", for p and integer, p>1, is described in section 3.4 of *Complex Interval Arithmetic and its Application*. In that book an expression, I call a search function, must be zeroed. This is done by starting a standard non-linear Newton iteration to find the zero by beginning the search at a specified starting point for the parameterization.

The book claims that this method works for positive integers>1. After finding the solution, the parameter value is passed to other ancillary expressions to determine values for a unitized (the book doesn't use the term "unitized") values for the result unit radius and the result unit center. The search function, together with the parameterized solution, can, through standard implicit derivatives, and with derivatives for the ancillary expressions, be used to construct the necessary derivatives for creating polynomial approximation functions. With the proper starting value, the non-linear search can probably be used for any real power greater than 1.

Figure 3:
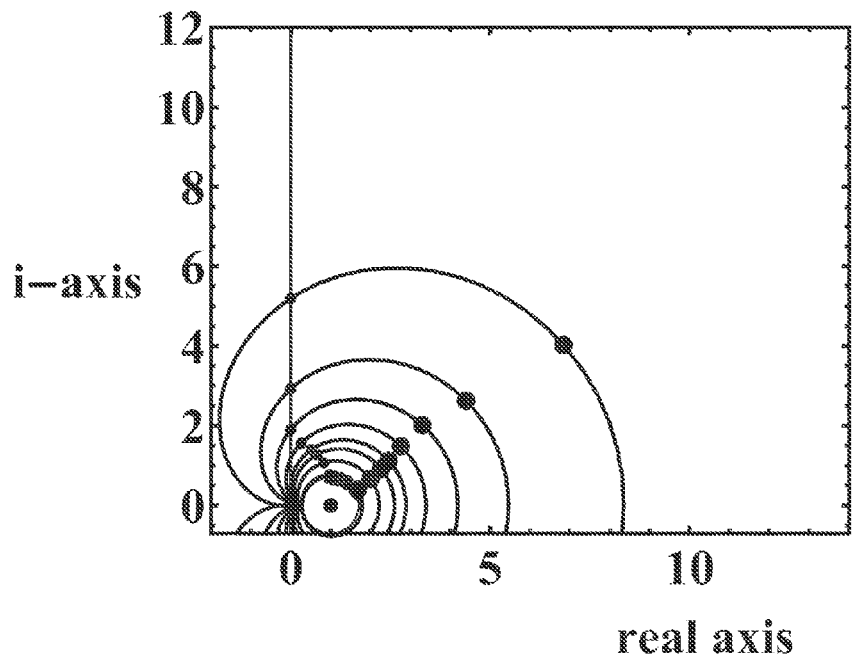
FIG. 3 shows the setup of points to the left and right of crest of a curve, which is the bounded target of a nonlinear search.

Robust Expansion Nonlinear Search Form: see FIG. 3

Expansion Search Limit Forms

The approach taken for this invention is similar, but also includes both lower and upper bounds to ensure correct iteration for all p>1. A parameterization of a point on a quarter-circle, in the first quadrant, is made, where the circle is center at $\{1,0\}$ of the complex plane, for a parameter "x" ranging from 0 to 1. The circle represents the necessary part of the boundary of the unit radius circle before raising to a power. This method, like the prior method, can be used directly to find optimal inclusive intervals, or can be used to construct polynomial approximations.

Unitized Parameterization

The real axis value is given as $1+r*x$ and the imaginary axis value is given by $r*Sqrt[1-x^2]$.

Ancillary Functions

The ancillary functions, which provide the result unit radius and result unit center, for the correct value of x, are, respectively, the imaginary and real parts of raising the expression $(1+r*x)+I*r*Sqrt[1-x^2]$, to a real power p>1, using the standard definition of a power function in the complex plane. Note that "I" is the square root of −1. That is, use the formula of the starting location and raise it to a power p. The imaginary part of the result is a preliminary unit radius, and the real part is the result unit radius. The preliminary unit radius is converted to a result unit radius using the necessary error adjustments of the unitizing process.

Full Search Function: Robust Expansion Nonlinear Search Form We seek the largest value of x, 0<x<1, where the following expression is zeroed, for p=real power greater than 1. Not all of the factors of the following expression may be necessary; however, their removal may affect the speed or success of the search iterations.

$$-\frac{1}{\sqrt{1-x^2}}\left(pr(1+r^2+2rx)^{-1+\frac{p}{2}}\left((r+x)\cos\left[p\text{ArcTan}\left[\frac{r\sqrt{1-x^2}}{1+rx}\right]\right]-\sqrt{1-x^2}\sin\left[p\text{ArcTan}\left[\frac{r\sqrt{1-x^2}}{1+rx}\right]\right]\right)\right)$$

Expansion Search Limit Forms

Lower and upper bounds are specified by expansion search limit forms:

xLower: Lower Bound for Starting Non-Linear Search: See FIG. 3.

Based on simple formula, one of two boundary starting values is determined. The Lower Limit Transition Expression is used when the unit radius is less than Tan $[Pi/(2*p)]$, then use x=0, otherwise x is given by:

$$\frac{-2\sin\left[\frac{\pi}{2p}\right]^2 + 2\cos\left[\frac{\pi}{2p}\right]\sqrt{\left(r-\sin\left[\frac{\pi}{2p}\right]\right)\left(r+\sin\left[\frac{\pi}{2p}\right]\right)}}{2r}$$

The lower bound is illustrated in FIG. 3.

xUpper: Upper Bound for Starting Non-Linear Search: See FIG. 3.

The upper bound is based on the lower bound, and is given by:

Cos [ArcCos [xLower]/3]

The upper bound is also shown in FIG. 3.

Explicit Solutions Root Search

Explicit solutions for x are sometimes available. Once explicit values are found, then they can be used with the ancillary functions to find the result unit radius and result unit center, just as if the x value was found by a non-linear search. For the case of squaring where power=2, the explicit result can be used to compute explicit radius and center functions, as described in the next section. The explicit solutions to the non-linear search function are typically polynomials, where the correct root must be chosen. Some non-zero factors of the full search function can be ignored. Here is one way of finding roots. The following code is written in Mathematica® Here is the expression which can be used to find explicit solutions.

$$explicitRootSearchExpression = \left((r+x)\cos\left[p\text{ArcTan}\left[\frac{r\sqrt{1-x^2}}{1+rx}\right]\right] - \sqrt{1-x^2}\sin\left[p\text{ArcTan}\left[\frac{r\sqrt{1-x^2}}{1+rx}\right]\right]\right);$$

The following routine will sometimes find roots.

```
ClearAll[explicitRootSearch];
explicitRootSearch[pp_]:=
    Solve[explicitRootSearchExpression==0/.p→pp,x];
```

Here it finds explicit solution for squaring:
Print[explicitRootSearch[2]];

$$\left\{\left\{x \to \frac{-1-\sqrt{1+8r^2}}{4r}\right\}, \left\{x \to \frac{-1+\sqrt{1+8r^2}}{4r}\right\}\right\}$$

Here it finds a polynomial solution. Only the first root is shown, the rest are similar.
Print[explicitRootSearch[5][1]]]
  {x→Root [
     −4r+4r³+#1−18r²#1+5r⁴#1+8r#1²−32r³#1²+
       24r²#1³−20r⁴#1³+32r³#1⁴+16r⁴#1⁵ &, 1]}

Inclusive Robust Complex Expansion Power (080)

The inclusive robust complex expansion power (080) takes a complex disc interval and raises it to a power p, p>1, to find the optimal inclusive disc interval by using robust expansionary power parameterization, described above, to directly compute the interval, or to evaluate an approximate polynomial created using results from the robust expansionary power parameterization.

Inclusive Hypercomplex Expansion Power (082)

Inclusive hypercomplex expansion power (082) takes a hypercomplex disc interval and raises it to a power p, p>1, to find the optimal inclusive disc interval by using a crest approach parameterization, described above, to directly compute the interval, or to evaluate an approximate polynomial created using results from the robust expansionary power parameterization.

Stable Explicit Power>1 Operator: See FIG. 2, Using Optimal Inclusive Squaring Form Overview A stable optimal inclusive squaring form is described. This form consists of numerically stable evaluations to produce a new radius and center location when squaring a complex or hypercomplex disc interval based on an optimal inclusive squaring form which supplies numeric stability. This section describes disc interval operators for which the previously described "unitizing" method can be usefully employed to create stable explicit and efficient solutions for squaring an interval. The routine requires evaluation of square roots, but because it is explicit, it can be developed for arbitrary precision.

Stable Inclusive Complex Square Power (084)
Stable Inclusive Hypercomplex Square Power (086)

The implementation for squaring is the same for complex or any higher dimension. The use of what I call a optimal inclusive squaring form provides numeric stability.

Squaring Root Expression

A value is needed for computing both the result unit radius and the result unit center. It is stable and easy to analyze for rounding error. We need to compute the value of:

$(1+\sqrt{1+8r^2})$

Because this is unstable for some values of r, the following method is used:

$$\text{optimal inclusive squaring form} = squaringRoot = -\frac{8r^2}{(-1-\sqrt{1+8r^2})}$$

Common Squaring Expression

We need to compute another value which will be used for both the result unit radius and the result unit center.

$$CommonSquaring = \frac{4 + SquaringRoot}{8}$$

Result Unit Center

The unit center value is given by: 2*CommonSquaring, or $$\frac{4 + SquaringRoot}{4}$$

Result Unit Radius

The result unit radius value is computed from the common squaring expression and the squaring root:

$$\frac{\sqrt{SquaringRoot + 4r^2}\,(4 + SquaringRoot)}{4\sqrt{2}}$$

Stable Inclusive Metacomplex Three Halves Power (088), Using Stable Inclusive Optimal Three Halves for, with Three Halves Power Form.

A stable inclusive optimal three halves form is described. This form consists of numerically stable evaluations to produce a new radius and center location when squaring a complex or hypercomplex disc interval. The implementation for three halves power is very similar to the explicit squaring means, except that branchcut criteria are required to specify which of many possible new center locations are required. The branchcut processing is completely separate from the unitized processing. The complex and hypercomplex processing have identical unitized processing. Unlike squaring, where the explicit x solution is used to create explicit radius and center solutions, here it is often useful to take the explicit x solution and raise the x solution to the ½ powers for r, an input unit radius, using a stable complex power function:
((1+r*x)+I*r*Sqrt[1−x^2])^(3/2)

See above, Ancillary Functions, for extraction of the result unit center and result unit radius after this operation is completed.

3/2 Explicit X-Solution: Three Halves Power Form

The explicit x solution is:

$$\text{three halves power form} = \frac{r}{1 + \sqrt{1 + 4r^2}}$$

Complex and Hypercomplex

A stable inclusive complex three halves power (088) uses the above method for the unitized operands, and using standard procedures for unitizing, it can be used for all such powers, and for both complex and hypercomplex systems (i.e. metacomplex).

Figure 4:
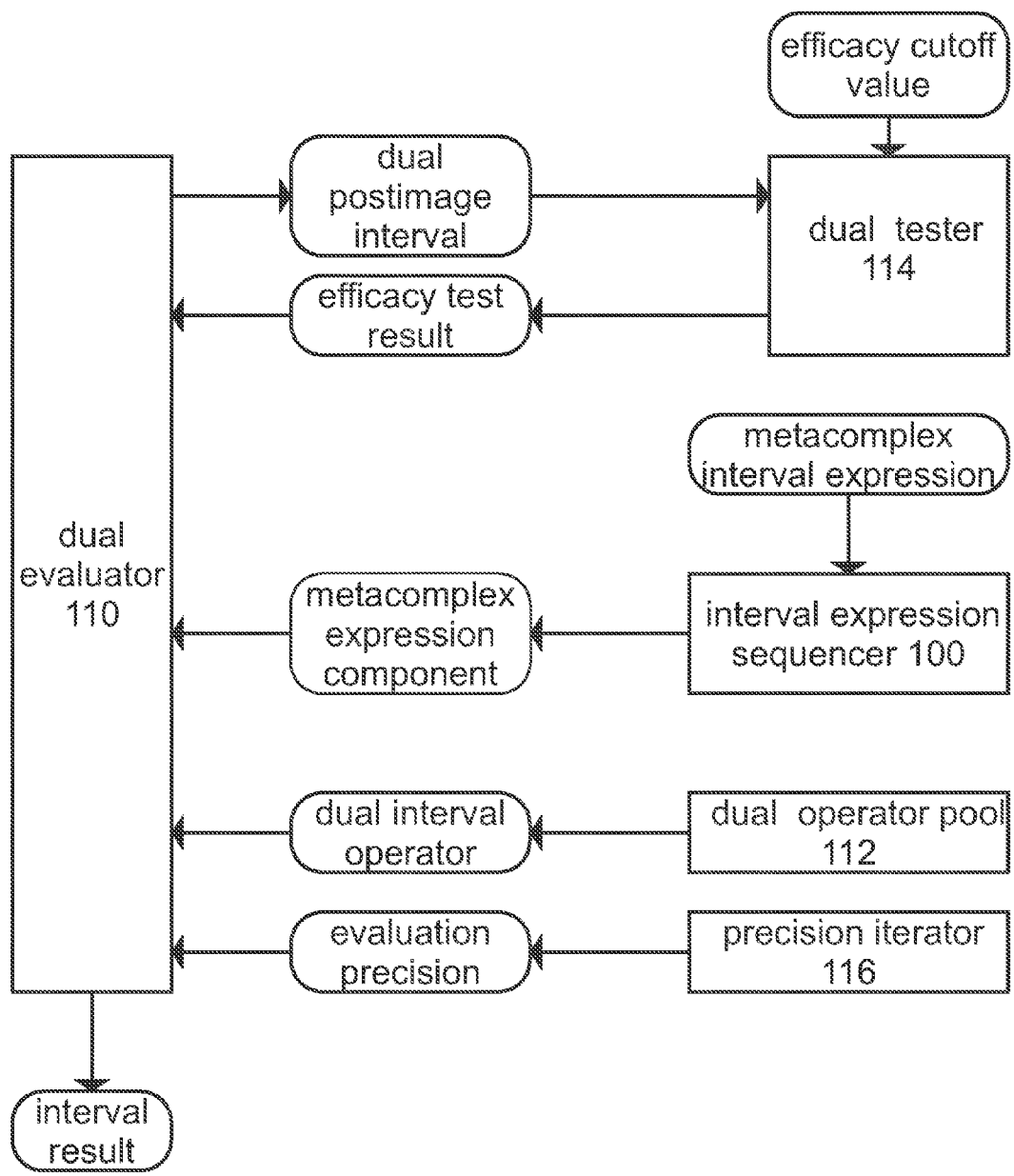
FIG. 4 shows the precision efficacy evaluation embodiment for evaluating an interval expression while detecting inadequate precision.

Dual Rounding Interval
Expression Evaluator Embodiment—FIG. 4

Overview

One of the classic problems with numeric processing is knowing when the numeric precision is inadequate to obtain useful results. With general interval processing, the intrinsic dilution of interval operators contributes to the overall dilution (increase in inclusive interval size). Intrinsic dilution and numeric rounding both contribute to dilution, and it is difficult to determine how much contribution is provided by each individually. When working with an interval expression sequencer (100) in the mode of an implicit interval expression, where as described above, all initial values are exact, then the numeric error is the underlying source of all error within the resulting error interval of the final postimage interval. In most all applications, increasing the precision will decrease the error interval. Therefore, it is easy to determine when numeric precision is inadequate by checking to see if the error interval is too large. However, non-numeric error also enters the postimage interval whenever the initial interval expression is an explicit interval and the interval operators used for evaluation contribute intrinsic dilution. In this embodiment, dual rounding addresses the problem of determining the efficacy of the numeric precision chosen for numeric evaluation.

Intrinsic Error

Refer to the INCLUSIVE INTERVAL OPERATOR COMPENDIUM: See FIG. 2, of the previous chapter.

Implementation

The trick is to track two types of intervals, safe and unsafe: hence the use of "dual" in the name of this embodiment. The safe interval, as in a standard inclusive interval, is created using the processing described earlier. Recall that all numeric errors contribute to increasing the size of the inclusive interval radius. The unsafe intervals are created similarly except that all numeric errors are applied so as to shrink the interval radius. Thus, inclusive postimage intervals for safe rounding tend larger for any given numeric error while unsafe inclusive postimage intervals become smaller. Therefore, the difference in dilution of safe and unsafe postimage intervals results from numeric error. And this same difference can be the basis of determining when the numeric precision is inadequate.

Final Postimage Interval

Although, internally, safe and unsafe postimage intervals are processed separately, the final postimage interval can be returned as a single "safe" interval, provided all numerical efficacy testing is completed. Of course, in applications where additional interval processing occurs upon these same intervals, it might be useful to return both safe and unsafe intervals as the final step of interval evaluation.

Negative Radius Issues

This method cannot be applied to an implicit interval expression, because the starting interval is essentially a point interval and there is no way to round an inclusive interval unsafe interval smaller, For example, a disc interval would obtain a negative radius, and what does that mean? The same issues may arise even when not using disc intervals; for example a rectangular interval could obtain negative lengths for each side. The problem of negative radius (or its equivalent in a non-disc system) may also occur in an explicit interval expression. For example, while performing an unsafe inclusive interval operator, the rounding to decrease the radius may be so exacerbating that the radius goes negative. Such situations would normally trigger an exception error or some other error means to indicate that the usual efficacy testing is impaired.

Optimization

By careful optimization, significant parts of the processing for the separate intervals, safe and unsafe, can be performed just once, saving significant time. The use of this optimization relies heavily on the implementation of the individual interval operators. See the description of dual operator pool (112), below.

Optional Component

Dual evaluation allows detection of inadequate precision. An optional component, precision iterator (116) allows this detection to control the use of higher precision to mitigate rounding effects.

Description: Dual Rounding Interval Expression Evaluator Embodiment, FIG. 4

Overview

The FIG. 4 shows a dual rounding interval expression evaluator embodiment, and is an enhancement of the previous INTERVAL EXPRESSION EVALUATOR EMBODIMENT of FIG. 1; the interval expression sequencer (100) is unchanged; the dual operator pool (112) is a mode of the interval operator pool (104); and the dual evaluator (110) is analogous to the interval evaluator (102) with additional testing mechanisms. The dual tester (114) is used to detect inadequate precision. The precision iterator (116) is optional, and provides automatic iteration of higher and higher evaluation precision.

Interval Expression Sequencer (100)

This component was previously described.

Dual Operator Pool (112)

Overview

The dual operator pool (112) is simply an interval operator pool (104), which in addition to safe rounding, there is the capability to return intervals with unsafe rounding. An dual interval operator returns a dual interval operator—an operator which operates on and produces both safe and unsafe intervals. In many applications, the safe and unsafe intervals are processed at the same time, and this can often be more efficient. However, in other systems where the lowest numeric precision is almost always sufficient, it may be useful to only perform the unsafe rounding when numeric precision is a problem—for example the resulting postimage intervals grow so large as to be unusable.

Simplifying Dual Disc Intervals to One Center

Suppose we have a dual interval represented as separate safe and unsafe intervals, and that we wish to combine them into a dual interval with one center, with both safe and unsafe radii. Assume that the intervals are disc intervals. If the center locations of the safe and unsafe disc intervals are the same, then the radii are used together with the common center and we are done. Otherwise, the center difference is calculated as the distance between the two centers. r an inclusive operation, the center for both safe and unsafe is set to the safe center, and the unsafe radii must be decreased by the center difference, and the rounding errors associated with this and the calculation of the center difference. Of course, we could preserve the unsafe center and correspondingly increase the safe radii by the center difference, including any numeric rounding considerations. However, I like the former approach because it preserves the tightness of the safe disc interval, which is usually more important than the tightness of the unsafe disc interval.

Optimizing for a Common Interval Center

For interval operators utilizing a metacomplex unity conversion (see Unitizing an Optimal Metacomplex Disc Interval in the Optimal Interval Operator Compendium, above), a useful optimization is possible when a common center is used for both safe and unsafe disc intervals. The metacomplex unitizing conversion involves the calculation of the unity radius, which in turn, involves dividing each original radius by the absolute value of the center of the interval. The calculations can be time-consuming. However, with a common center, it can be performed once for use by both safe and unsafe processing. This single calculation of a unitized center produces some rounding error, called the center location rounding error, which is an absolute error value. The adjustment needed for this absolute error is different for the safe and unsafe unity radii, and has already been described.

Dual Tester (114)

A dual tester (114) returns an efficacy test result by applying a comparison of a efficacy cutoff value to an efficacy metric of dual postimage interval returned by dual interval operators of the dual operator pool. The efficacy test result is returned as success or failure, based on a comparison to a dual efficacy cutoff value. The dual tester (114) must apply the test in a compatible manner with the dual postimage interval. For example, if the dual efficacy test specification is for a dual disc interval with a common center, then the provided dual interval must be in the same form or converted to a common center.

Dual Intervals

A dual interval is a representation of two intervals created through an identical evaluation sequence except that one sequence used safe rounding and the other sequence used unsafe interval rounding. For an inclusive interval, the unsafe rounding interval will always lie entirely within the shape defined by the safe rounding interval. Because working with two centers and two radii can be cumbersome, and the two centers are relatively close together, a dual interval can also be more simply implemented as a single center with a safe and unsafe radii: see the description of dual operator pool (112) for implementation.

Dual Test: Dual Efficacy Cutoff Value

A dual test is a geometric comparison of the divergence of shapes defined by the safe and unsafe intervals, against a dual efficacy cutoff value which specifies a crossover value used to chose between success and failure of the evaluation precision. Without loss of generality, the dual intervals are defined, herein, by a single center and two radii. For a system that uses a separate center location for safe and unsafe, a conversion to a single center is required—refer to the description of the dual operator pool (112), described next. Here are some useful efficacy tests which might be chosen. Some applications may require custom tests.

Relative Radius Efficacy Test Means

A relative radius efficacy test returns an efficacy failure when the absolute value of the difference of the disc radii divided by larger of the disc radii, is greater than a predetermined relative radius cutoff.

Relative Error Efficacy Test Means

A relative radius efficacy test returns an efficacy failure when the absolute value of the difference of disc radii divided by the average of the absolute value of disc centers, is greater than a predetermined relative error cutoff.

Absolute Radius Efficacy Test Means

An absolute radius efficacy test returns an efficacy failure when the absolute value of the difference of disc radii is greater than a predetermined absolute radius cutoff.

Precision Iterator (116)

At the bottom of FIG. 4 there is an optional component: precision iterator (116). When present, it provides a way to iterate through a series of evaluation precisions. For example, the lowest precision level might be 53, specifying the number of mantissa bits in a IEEE standard double precision floating point. The next higher precision might be 128 mantissa bits, representing an integer implementation of hardware floating point using two 64-bit numbers.

Dual Evaluator (110)

The dual evaluator (110), an enhancement of the earlier described interval evaluator (102), takes advantage of dual rounding to detect and optionally act on inadequate numeric precision. The dual evaluator (110) manages dual postimage intervals; however, if intervals are implemented in an object oriented manner of modern software programming, then the different interval type (dual interval versus a simple safe interval), can be transparent.

The real difference from a simpler interval evaluator (102) is that the dual evaluator (110) must call the dual tester (114). This is a simple process. A failure might be implemented by an error return or exception. When the optional component, precision iterator (116), is present, then, when efficacy fails, a higher precision can be tried. If all evaluation precisions fail, or the optional precision iterator (116) is not present, then the dual evaluator (110) signals inadequate precision.

Operation: Dual Rounding Interval Expression Evaluator Embodiment, FIG. 4

This embodiment operates nearly identically to the INTERVAL EXPRESSION EVALUATOR EMBODIMENT. However, the program calling it to return a interval should be aware that it can return an error of inadequate precision. In modern programming, this type of error is typically returned as an "exception", but a simple error flag can also be returned. When iteration is used, it is analogous to commercial programs, such as Mathematica®, where the evaluator routine, "N", repeats evaluation at successively higher precision until a desired resulting precision is achieved. The difference is that repetition is based not on a specific goal to achieve a desired precision, but rather on a different type of test: the comparison of safe and unsafe intervals.

Conclusion, Ramifications, and Scope

Embodiments are described for producing interval results from a metacomplex interval expression. The inventions are particularly addressed to optimal inclusive complex and hypercomplex disc interval processing. The embodiments for dual rounding and tightness apply to any metacomplex interval operators.

In some applications, additional special case interval operators will be useful. Other interval operators, particularly transcendental functions, are described in the book *Complex Interval Arithmetic and Its Applications*. These additional operators can also be used within the interval operator pool (104) or the dual operator pool (112).

DETAILED DESCRIPTION

Escape Distance Solver Embodiment

FIG. 5

This embodiment provides automatic calculation of escape distances, which are used to test iterated points and intervals for achieving an escape when used with discrete dynamic iterations.

Description: Escape Distance Solver Embodiment—FIG. 5

Overview:

The approach incorporates finds two expressions, dominant and inferior, whose sum is an iteration expression, wherein the absolute value one of the expressions, the dominant expression, will, once it iterates far from zero, will dominant completely over the absolute value of the inferior expression. At the top of FIG. 5, several input parameters are indicated, and there is also one output parameter at the bottom of the diagram.

Input Parameter: Real Escape Expression

In the top left of FIG. 5, note the data called real escape expression. The real escape expression is a mathematical expression of the relationship of two real valued expressions: a real dominant expression (also called rde) and real inferior expression (also called rdi), below. The largest positive root of the expression, when equated to zero, defines an escape distance. Three important expressions have been identified for use as a real escape expression.

Category Escape Expression=>Category Escape Distance

This expression determines the minimum distance for the absolute value of a point or interval iterate in order to be sure that real dominant expression, abbreviated as "rde", exceeds the real inferior expression, abbreviated by "rie", at each future iteration, by at least the absolute value of the most previous iterate. This method of escape specifically defines the absolute value required to concretely define "escaping to infinity". This escape distance is called the category escape distance:

categoryEscapeExpression=rde−rie−x;

Error Reduce Expression=>Growth Rate Escape Distance

This expression is nearly identical to the previous expression, the category escape expression. However, here, the goal is to pick an escape distance which causes the guaranteed absolute value increase from the current iterate to the next iterate is at least equal to the inverse of "errorFraction", which is typically a constant, such as ½ or ⅔. This escape distance is called the growth rate escape distance:

errorReduceExpression=errorFraction(rde−rie)−x;

Precision Escape Expression=>Precision Escape Distance, Constants: errorFraction, relativeErrorGoal When obtaining a point value for an infinite iteration, it helps to know when the dominant expression completely dominants the final result; when it does, then the inferior term can be ignored, and analysis can be performed to precisely determine the infinitely iterated value at the current iteration. This escape distance is called the precision escape distance:

precisionEscapeExpression=rie/rde−(1−errorFraction)
   *relativeErrorGoal;

The relativeErrorGoal specifies the amount of relative error goal for obtaining a precise result; a typical high precision goal might be 10^-10. The errorFraction, typically ½, specifies relative error improvement requirements at the point of termination of iteration.

Input Parameter: Metacomplex Iteration Expression

Refer to the middle data object at the top of FIG. 5. The input to the algorithm is a metacomplex iteration expression. This is nominally a polynomial, but can be more complicated. Without loss of generality, the expression is in terms of zLast (the last iterate) and, optionally, z0, which is the initial iterate, 0'th iterate.

Iteration Variable:

The zLast value is called the iteration variable. A point value is determined by substituting the prior result into zLast and evaluating the expression. Here are examples of three metacomplex iteration expressions. These are simple cases for illustration, and additional terms and coefficients can be handled. Here is code to define three sample expressions:

Mandelbrot=zLast^2+z0;
JuliaSet=(1+ $\mathbf{i}$ )+zLast$^2$;
Alpha=z0+z0 zLast$^2$;

The later, Alpha, could also be expressed as z0 (1+zLast^2).

Output: Escape Distance

Within an escape topology, the escape distance, for a point or an entire metacomplex interval of points, is a distance from the origin. The escape distance is the usual final result of the processing of this embodiment, the result may be numeric or a symbolic list of roots from which the largest positive root should be used (when symbols are replaced so that a numeric positive result can be found).

Sample Code Discussion

Sample code for this embodiment can be is implemented within a powerful mathematical environment, or any suitable mathematical environment.

Metacomplex Iterations

The following implementation works for metacomplex iterations, whether complex or hypercomplex. In hypercomplex systems, commutativity of multiplication is not always available; here, for finding escape distances, commutativity doesn't matter because all values are converted to real numbers, which are commutative. Similarly, the iteration expression may incorporate several number systems when implementing rigid body motions. For example, in three dimensions, there is no multiply; however, a rigid body motion can be implemented using 4th dimensional pre and post multiplication. None of this is critical because all such constants and intervals needed for these operations are converted to absolute values within the real valued number system.

Pt[a,b,c]

The value of Pt[center, radius] refers to a point, where the parameters to Pt are the axis values. For example, Pt [a,b] represents the complex value of a+bI. For quaternion space, of four dimensions, the four numbers are needed. This construct is used to specify metacomplex constants of any dimension.

Disc[center: Pt[ . . . ], radius]

The term Disc[center, radius] refers to a disc interval with a center and radius. The radius is 0 or a positive value and the center is a list of values representing the coordinates in metacomplex space; for radius 0, the Pt function, above, can also be used.

MinAbs[Symbol], MaxAbs[symbol]

When a symbol is encountered, representing a variable, then the minimum or maximum absolute value must be taken at a later time. Even when the symbol will become a metacomplex constant, it can be useful to have both a minimum and a maximum; a minimum absolute value requires eventual rounding downwards towards zero when taking the absolute value. For MaxAbs[symbol], the rounding is away from zero.

RigidBody[unitQuaternion, 3Dvariable]

Normally, there is no way to multiply within a 3D number system because the result becomes 4 dimensional. However, there is a trick which allows it. Suppose we have a unit quaternion (absolute value of 1), and a 3D variable. Let Up4D [3DVariable] be a method for taking the 3 axis values of the 3Dvariable as 3 imaginary axis values (i,j,k axes), and let 0 be used as the real axis value; this creates a quaternion. Similarly Down3D[quaternion] takes the 3 imaginary axes as a 3D number and throws away the real value. Now we can multiply as:

unitQuaternion*UpQuaternion[3DVariable]*Conjugate
   [unitQuaternion]

The function Conjugate takes the quaternion conjugate; the three imaginary axis values are negated. The result of the above operation is a rigid body motion around an axis through zero; the extreme absolute values of any 3D interval encountering such an operation are unchanged. Therefore, for purposes of finding escape distances, the entire operation is converted to become the absolute value of the 3DVariable.

Common Iterate Replacer (262):

Creates: Reduced Iteration Expression

The common iterate replacer (262) creates a reduced iteration expression from the metacomplex iteration expression, either by direct copy or by the optional conversion, of the z0 variable into the zLast variable when it appears as a common factor of the entire reduced iteration expression. Refer to the top of the diagram of FIG. 5.

Sample Mathematica Code:

This code simply returns the original input expression unless a common iterate reduction rules is present. If present, then the rules are applied to each factor. The usual option is to replace z0 by zLast whenever z0 is a common factor of the entire expression; here is a code sample:

```
IterationReplacer[iterationExpr_,z0ReduceFlag_:True]:=
    Module[{factors},If[z0ReduceFlag,
        factors=FactorList[Cancel[Together[iterationExpr]] ];
        Apply[Times, Map[Power[#[[1]],#[[2]]]&,Map[
If[ #[[1]]===z0,{#[[1]]/.z0→zLast,#[[2]]},#]&,factors]]],
iterationExpr]];
Print[Map[IterationReplacer[#] &,{Mandelbrot,Alpha}]];
    {z0 + zLast², zLast (1 + zLast²)}
```

Dominant Splitter (250):
Creates: Dominant Expression and Inferior Expression Refer to FIG. 5. The dominant splitter (250), is shown just below the common iterate replacer (262). It separates the reduced iteration expression resulting from the common iterate replacer (262) into two parts: the dominant expression and the inferior expression. This is done by separating the term with the highest power of zLast. If the reduced iteration expression has a denominator, as in the iteration expression being a rational polynomial, then additional care is required. Refer to the code examples for comments on this. Both of the created expressions remain metacomplex expressions, and when the two output expressions are summed, they are equal to the input: the reduced iteration expression. As with the common iterate replacer (262), the effort for dominant splitter (250) may be trivial; for example, if the underlying metacomplex iteration expression is already be separated into a dominant and inferior part.

Dominant Splitter (250) Code:

This dominant splitter (250) implementation assumes that the dominant term is the term with the highest power of the variable zLast. The use of "NumerDenom" to find numerator and denominator may not be necessary for simple polynomial iterations.

```
NumerDenom[rp_]:=
        With[{t=Together[rp]},{Numerator[t]/Denominator[t]}];
DominantSplitter[reducedIterateExpr_]:=
    Module[{ numer,denom,coefs,theDominant,theInferior},
        {numer,denom}=NumerDenom[reducedIterateExpr ];
        coefs=CoefficientList[numer,zLast];
        theDominant = Last[coefs]*zLast (Length[coefs]-1)/denom;
        theInferior =Apply[Plus,Table[coefs[[i]]*zLast^(i-1),
    {i,1,Length[coefs]-1}]]/denom;{theDominant ,theInferior }];
Print[ "Mandelbrot: ",DominantSplitter[ Mandelbrot] ];
        Mandelbrot: {zLast², z0)
```

Metacomplex Extreme Absolute Converters (260)

This component performs the low level conversion of metacomplex expressions into real expressions. All metacomplex variables are converted to their absolute values, and expression terms are changed so that these partial expressions are maximized or minimized. For example, the maximum absolute value of the expression $s-3$ is certainly no greater than the absolute value of $Abs[s]$ plus $Abs[3]$. Similarly, the minimum absolute value of the expression $1/(s-3)$ is certainly no less than $1/(Abs[s]+3)$. Also, the replacement of a denominator $(s-3)$, s a real scalar, by $(Abs[s]+3)$ prevents any chance of a divide by zero. The metacomplex extreme absolute converters (260) is used for implementing the next two components: the dominant reducer (252) and inferior reducer (254). The metacomplex extreme absolute converters (260) must be able to maximize and minimize expressions and terms arising from any input of the metacomplex iteration expression.

Metacomplex Extreme Absolute Converters (260) Code:

Absolute Value of Points and Exact Values

This section shows how to take the minimum and maximum extreme values of the absolute value of points, intervals, and symbols. In general, the absolute value of a point is its Euclidian distance to the origin. Here is the sample code:

```
AbsPt[pt_Pt ]:=Sqrt[Apply[Plus,Map[#^2&,pt]]];
AbsPt[pt_?NumericQ ]:=Abs[pt];
```

Absolute Values of a Disc (or Other Interval Types)

Because both minimum and maximum absolute values are required, the implementation must find the extreme absolute values of intervals. Intervals can be expressed as disc intervals, which require a center (i.e. Pt[a,b,c] for a 3D number) and a positive real valued radius. The function MinDisc finds the minimum absolute value; MaxDisc finds the maximum absolute value. Here is the sample code:

```
MinDisc[Disc[center_,radius_]]:=With[{absCenter=AbsPt[center]},
If[radius≧absCenter,0,absCenter-radius]];
MaxDisc[Disc[center_,radius_]]:=AbsPt[center]+radius;
```

Absolute Values of Factors: Extreme Values.

Here, extreme limits (minimum and maximums) of absolute value are taken for components of a polynomial. This implementation finds minimums and maximums for numeric values, points, products of values and sums of values. Here is the sample code:

```
MaxAbs[e_?NumericQ]:=Abs[e];MaxAbs[zLast]:=zLast;
MinAbs[e_?NumericQ]:=Abs[e];MinAbs[zLast]:=zLast;
MinFactor[f_]:=
    Which[ NumericQ[f], Abs[f],      Head[f]===Pt,AbsPt[f],
        Head[f]===Power,Power[MinFactor[f[[1]]],f[[2]]],
        Head[f]===RigidBody,MinAbs[f[[2]]],Head[f]===Disc,MinDisc[f],
        Head[f]===Interval,Min[Abs[f]],
```

```
        Head[f]===Symbol, MinAbs [f],True, f];
MaxFactor[f_]:=
    Which[ NumericQ[f], Abs[f],       Head[f]===Pt,AbsPt[f],
        Head[f]===Power,Power[MaxFactor[f[[1]]],f[[2]]],
        Head[f]===RigidBody,MaxAbs[f[[2]]],
        Head[f]===Interval,Max[Abs[f]],Head[f]===Disc,MaxDisc[f],
        Head[f]===Symbol, MaxAbs [f],True, f];
```

Absolute Values of Terms: Extreme Values.

A term is a product of one or more factors; the result is a product of the extreme factors calculated by the above methods.

```
    MinTerm[t_]:= If[ (Head[t]===Times),
        ApplytTimes, Map[MinFactor[#]&, t]],MinFactor[t]];
    MaxTerm[t_]:= If[ (Head[t]===Times),
        ApplytTimes, Map[MaxFactor[#]&, t]], MaxFactor[t]];
```

Absolute Values of Polynomials: Minimums and Maximums

It is easy to take the minimum of a sum of positive minimum terms; just take the sum. However, for the sum of positive minimums, there is no simple rule. Note the "Throw" in the minimum code, below, which detects this limitation.

```
MinPoly[t_]:=If[ (Head[t]===Plus),(* its a sum of factors *)
    Throw["cannot take minimum of multiple terms"];,MinTerm[t] ];
Print[ Map[MinPoly[#]&, { s z, - 3 z^2}]];
        {MinAbs[s] MinAbs[z], 3 MinAbs[z]$^2$}
MaxPoly[t_]:=If[ (Head[t]===Plus),(* its a sum of factors *)
    Apply[Plus, Map[MaxTerm[#]&, t]],MaxTerm[t] ];
Print[ Map[MaxPoly[#]&,{ Disc[Pt[1,2 ], 2]+s zLast, - 3 zLast^2}]];
        {2 + √5 + zLast MaxAbs[s], 3 zLast$^2$}
```

Minimums and Maximums of Partial Fractions

A simple case of a rational polynomial is a partial fraction. Not all partial fractions are supported because of the above described limitation of finding the minimum of a polynomial.

```
MaxFraction[ p_]:=
    With[{nd=NumerDenom[p]},MaxPoly[First[nd]]/MinPoly[Last[nd]]];
MinFraction [p_]:=
    With[{nd=NumerDenom[p]},MinPoly[First[nd]]/MaxPoly[Last[nd]]]; '
```

Dominant Reducer (252), Creates: Real Dominant Expression

The dominant reducer (252) takes one critical parameter, the dominant expression. This dominant expression is a metacomplex expression and may include complex and hyper-complex constants and operators. The purpose of the dominant reducer (252) is to produce a real valued expression (typically the highest term of a polynomial) to represent the dominant expression.

All real valued constants are made positive by taking the absolute value; similarly, any metacomplex constants are made positive by taking the absolute value. If there is any rounding, then the direction of rounding is taken so as to decrease the absolute value of the entire term; rounding is upward for the denominator (if any), and rounding is downward in the numerator. Similarly, for any interval, whether real or metacomplex, the absolute value is taken of the most extreme point which causes the value of the entire result to be minimized. That is, if the interval is in the denominator, then the largest absolute value of the interval is taken; for the numerator, the smallest value is taken.

The end result is the real dominant expression, which is one term, as possibly a product of values, possibly with a denominator, where all values are positive constants, except for the "zLast" variable; as a final step the zLast variable is changed to be "x" to indicate a real valued expression. Note that although the numerator is made up of a product of factors (such as 2 x^3), the denominator might be a multi-term polynomial.

Dominant Reducer (254) Code:

```
DominantReducer[e_] :=
    (MinFraction[e]/.{MaxAbs[z0]→x, zLast→x});
Print[" zLast/(3−z0): ",DominantReducer[ zLast/(3−z0)]];
```

$$zLast/(3-z0): \frac{x}{3+x}$$

Inferior Reducer (254), Creates: Real Inferior Expression

The inferior reducer (254) takes one critical parameter, the inferior expression. This inferior expression is a metacomplex expression and may include complex and hypercomplex constants and operators. The purpose of the inferior reducer (254) is to produce a real valued expression, called a real inferior expression, to represent the inferior expression. All real valued constants are made positive by taking the absolute value; similarly, any metacomplex constants are made positive by taking the absolute value. If there is any rounding, then the direction of rounding is taken so as to increase the absolute value of the entire expression; rounding is downward for the denominator (if any), and rounding is upward in the numerator. Note that the direction of rounding is exactly opposite of that of the dominant reducer (252). And, similarly, the overall goal is to round so as to make the reduced inferior expression as large as possible.

Similarly, for any interval, whether real or metacomplex, the absolute value is taken of the most extreme point which causes the value of the term to be maximized. That is, if the interval is in the denominator, then it the smallest absolute value of the interval is taken; for the numerator, the largest value is taken. The end result is the real inferior expression, which is at least one term or more, possibly with a denominator, where all values are positive constants, except for the "zLast" variable, and any variables within the original inferior expression; the zLast variable is renamed as "x" as a reminder of a real valued variable.

Partial Fractions

The output, a reduced inferior expression, may represent several terms. If there is no denominator, all is well. So consider a denominator. For the denominator, it is tempting to use the method similar to that of the dominant reducer (252), where the denominator is made the sum of positive terms. This will not usually work for the inferior reducer, because, all transformations must be to force the entire real inferior expression to become larger. Therefore, the best approach is to use partial fractions of the entire inferior expression; each fraction is separately made positive and the result is the positive sum of the positive fractions. But wait, even with that, the denominators must still be kept as single terms. For example, $s^2$ is a perfectly good denominator for any of the partial fractions. But $s^2-1$ is not, because a polynomial cannot be minimized.

Inferior Reducer (254) Code:

The inferior reducer (254) requires the summing of separate absolute terms so that the inferior term always maximizes the resulting values. For a rational inferior expression, separation into partial fractions is taken.

```
InferiorReducer[p_] :=
 (With[{pf=Apart[p]},If[Head[pf]===Plus,Apply[Plus,Map[
    MaxFraction[#]&,pf]],MaxFraction[pf]]]/.
    (MaxAbs[z0]→x,zLast→x}) ;
Print["InferiorReducer: ",Map[InferiorReducer[#]&,
    {(-2* Pt[1, 2, 3] +z0 zLast)/-a, Mandelbrot}]];
```

$$\text{InferiorReducer:} \left\{ \frac{2\sqrt{14}}{\text{MinAbs[a]}} + \frac{x^2}{\text{MinAbs[a]}}, x + x^2 \right\}$$

Escape Formula Replacer (256),
Creates: Substituted Real Escape Expression

The substituted real escape expression is created from the real escape expression by replacing the both the real dominant expression and the real inferior expression into the rdi and rie variables. Once the real dominant expression and real inferior expression are available, then the escape formula replacer (256) substitutes them, respectively, for the rde and rie variables of the real escape expression; this expression, a real valued expression, is called the substituted real escape expression.

Escape Formula Replacer (256) Code:

In this sample code, the categoryEscapeExpression is used as the default for the real escape expression. Simple replacement of values is utilized.

```
ClearAll[EscapeFormulaReplacer];
EscapeFormulaReplacer[realDominant_, realInferior_,
    realEscapeExpr_: categoryEscapeExpression] :=
    realEscapeExpr/. {rde → realDominant, rie → realInferior};
Print[Map[ Apply[EscapeFormulaReplacer, #]&,
    {{x², x}, {x 2, c}}]];
    {-2 x + x², -c - x + x²}
```

Positive Root Solver (258)

Once the substituted real escape expression is available from the escape formula replacer (256), the positive root solver (258) is initiated. The positive root solver (258) finds the escape distance by equating the substituted real escape expression, produced by the escape formula replacer (256), to zero. The equation is solved for the largest positive root of x. If there are no other variables, then the equation is numerically or symbolically solved. If the positive root solver (258) detects the presence of additional variables, other than x, then no numeric solution can be made be immediately found and so a symbolic explicit solution is found, and otherwise optional root variable rules are applied to the explicit solution root list to create numerical results; and then, finally, the largest positive root is found. The advantage of the explicit solution is that root solutions for a wide class of parameterized iteration expressions can be quickly found without having to run the entire embodiment.

Common Code

For robustness, a checker is included to ensure that there is at least one positive root to be returned. This check merely ensures that there is at least one positive root, before returning the largest root.

```
PostiveRootCheck[rootList_]:=
    With[{posRoots=Select[rootList, Positive]},
        If[Length[posRoots]<1,Throw[BadRoot]];posRoots[[1]]];
```

Numeric Positive Solver

This mode can be utilized whenever there is a single unknown variable: x. As setup in the substituted real escape expression. Here is the simple code. Standard methods are used. In this code, NSolve solves numerically.

```
NumericPositiveSolver[expr_] :=
    PostiveRootCheck[x /. NSolve[SetPrecision[expr == 0, ∞], x, 17 ]];
Print[NumericPositiveSolver[-2 x + x²]] ;
    2.0000000000000000
```

Symbolic Positive Solver

When there are additional variables, other than x, then some preliminary work can be done by finding explicit root solutions. Then at some time later, when values are chosen for the variables, the substitutions can be made and the largest positive root can be returned. For purposes of illustration, the substitution is made immediately. A printout option is available only for this document, and would not be used in production.

```
SymbolicPositiveSolver[
    expr_, rootReplacementRules_: { }, isPrint_: False] :=
    Module[{numericRoots, symRoots = x /. Solve[ expr == 0 , x ]},
    numericRoots = symRoots /. rootReplacementRules;
    If[isPrint, Print[symRoots ]];
    If[Variables[numericRoots] === { },
        PostiveRootCheck[numericRoots ], numericRoots]];
Print[SymbolicPositiveSolver[ -2 c x + x², {c → 1}, False]] ;
    2
```

When all variables are not assigned to numeric values, then the result is symbolic and may include more than one root. The variables must be replaced by numeric values and the largest resulting root is returned; here is the code sequence:

```
Print["symbolic result: ", temp = SymbolicPositiveSolver[-2 c x + x² ]];
Print["numeric resolution: ", PostiveRootCheck[temp /. c → 1]];
    symbolic result: {0,2 c}
    numeric resolution: 2
```

Positive Root Solver:

This implementation allows both numeric and symbolic solution; such flexibility is not always needed. Refer immediately above to obtain a final answer for the symbolic case.

```
PositiveRootSolver[expr_, rootReplacementRules_: { }] :=
    If[Variables[expr] === {x}, NumericPositiveSolver[expr],
        SymbolicPositiveSolver[expr, rootReplacementRules] ];
Print[Map[ PositiveRootSolver[#, c → 1] &, {-2 x + c x^2, -2 d x + x^2}]];
    {2,{0,2 d}}
```

Escape Distance Driver (264)

This component simply ensures that each of the required components is executed when its parameters are available. Note that in many systems, the driver can be initiated as soon as there is a defined "metacomplex iteration expression".

Escape Distance Driver (264) Code and Tests

The entire process of computing escape distance is often dependent only on the metacomplex iteration expression, the first parameter for this implementation of the escape distance driver (264). The next parameter is the real escape expression, with a default. The next parameter specifies the root replacement rules, which are only needed when the result of the positive root solver (258) is symbolic. The next two parameters are optional and provide the default values for errorFraction and relativeErrorGoal, which are needed for the precisionEscapeExpression.

Code for EscapeDistanceDriver

```
EscapeDistanceDriver[metaComplexIterationExpr_,
        realEscapeExpr_: categoryEscapeExpression,
        rootReplacementRules_:{ },
        errorReduce_:1/2, reGoal_:2^-25 ]:=
    Module[{escape,reduced,theDominant,theInferior},
        reduced=IterationReplacer[metaComplexIterationExpr];
        {theDominant,theInferior}=DominantSplitter[reduced];
            PositiveRootSolver[EscapeFormulaReplacer[
                DominantReducer[theDominant],InferiorReducer[theInferior ],
    realEscapeExpr/.{errorFraction→errorReduce,
                relativeErrorGoal->reGoal}],rootReplacementRules]];
```

Examples of Escape Distance, Numeric and Symbolic

```
Print[ Map[N[EscapeDistanceDriver[ #]]&,{
    Mandelbrot,JuliaSet,Alpha}]];
    {2.,1.79004,1.41421}
```

Examples of errorReduceExpression, precisionEscapeExpression

```
Print[ N[Map[EscapeDistanceDriver[ #,errorReduceExpression]&,
    { Mandelbrot,JuliaSet,Alpha}]]];
    {3.,2.55377,1.73205}
```

Examples of precisionEscapeExpression:

```
Print[ N[Map[EscapeDistanceDriver[ #,precisionEscapeExpression]&,
    { Mandelbrot,JuliaSet,Alpha}]]];
    {6.71089×10^7, 9741.98, 8192.}
```

Operation: Escape Distance Solver—Embodiment—FIG. 5

The operation of this embodiment is quite automatic: supply parameters to the escape distance driver (264) and obtain a result. However, the underlying usefulness of precision escape distance requires some explanation.

Error Reduce Expression, Precision Escape Expression

Overview

In the prior art, to determine a pixel value, iteration of a point value is continued until a very large value is achieved. This is a simple method, and for purposes of rendering graphics, this ad hoc method is more than adequate. This section describes a more formal method.

When calculating iterates, chaotic and fractal functions of the metacomplex dominant form are iterated until the dominant expression is so large as compared to the inferior expression that further iteration, without inclusion of the inferior expression, produces negligible reduction in relative error.

Although this method may seem overly formal, the ability to predict precise values can be complicated in some situations. In some cases, the escape can proceed very slowly, and these formal methods provide accurate methods for deciding when to terminate iteration.

Strategy

For each iteration in which the inferior expression is ignored, there is the possibility of additional error. Because the function is exactly defined only by an infinite number of iterations, and, of course, we must stop at a finite number of iterations, it implies that an infinite number of error terms are accumulated. How can we ever be sure that this infinite number of errors never exceeds a tiny error specification? When the relative error is very tiny, and when we know that the final sum will be very tiny, then the complicated error analysis can be skipped, and the total error is very nearly the sum of the tiny relative errors, but still an infinite number of errors.

Consider the infinite sum of $\frac{1}{2}+\frac{1}{4}+\frac{1}{8}\ldots$. This sum is less than 1 for any finite number of terms, and is equal to 1 with an infinite sum. Now suppose we know that the worst case relative error of the first term of an infinite sum is equal to $2^{-51}$, and the second term is $2^{-52}$, and so on, with each term's relative error no more than half the previous. In this case, the total error is $2^{-50}$. In other words, if each term is half the previous, then the total error is twice the initial term. Of course, other infinite sums work just as well. If the value of each term is ¾ (instead of ½) the prior term, then the sum is still finite, but will be more than twice the first term.

In order to establish a required precision, we should establish, by proof, both a rate of error decrease and an initial iterate error, the former is established using this embodiment with an error reduce expression, and the latter using the precision escape expression. The larger of the two distances should be used. In practice, the error reduce expression creates such small numbers and the precision escape expression creates such large numbers, it is usually acceptable just to use the results of processing the precision escape expression.

Relative Error Specification:

(1−errorFraction)*relativeErrorGoal

The precision escape expression contains the expression: (1−errorFraction)*relativeErrorGoal, where does this come from? Suppose the goal of a pointwise iteration is to achieve an iterate which has a relative error specified as "reErrorGoal". This value might be 2^−12 for use as a pixel color value, or very much smaller for more precise renderings. Suppose the goal is to have subsequent iterate reduce the error by an amount given as errorRatio, where the errorRatio is typically set to ½ or ⅔, or some other fraction. Given all that, what is the requirement for the relative error in the iterate, in order to terminate iteration, while achieving the requirement for reErrorGoal? Use:

maxIteraterReError=(1−errorRatio)*reErrorGoal

Although error analysis is performed using real values, the actual error is, of course, in the metacomplex space. Here are some examples for an error goal of 2^−12.

```
MaxRelativeErrorGoal[
    errorReduce__, reErrorGoal__]:=(1−errorReduce)*reErrorGoal;
Print[N[Map[MaxRelativeErrorGoal[#,2^−12]&,(½,⅔,¾}]]] ;
    {0.00012207,0.0000813802,0.0000610352}
```

Category Escape Expression:

The category escape distance is the safe distance for all points at any level of iteration to determine if the point will escape.

Interval Escape Categorization-Embodiment—FIG. 6

Description: Interval Escape Categorization Embodiment, FIG. 6

Overview:

FIG. 6 shows a block diagram for categorizing a spatial subset, called a coverage cell, of a parametric space, under an escape topology for a metacomplex discrete dynamic system. An iteration of an interval iterate is run until either the interval iterate either escapes beyond a certain distance, or violates a topological restriction. The result is a numeric proof of categorization for an entire coverage cell of points.

Embodiment Purpose

The goal is create a numerical proof that, beginning with an inclusive interval of all points of a coverage cell of a parameter space, all points of the interval iterate to a specific escape distance at a specific finite iteration level.

Interval Escape Sequence,

When successful, the result is an interval escape sequence: a numerical proof that all points of the original interval, defined by a coverage cell of the parameter space, fully escapes. In some cases, the resulting points may iterate to an interval that completely surrounds the interval like a donut, where the inner ring is beyond the escape distance. However, in most cases, the generated intervals are not donuts, but discs.

Principle Escape Sequence

A principle escape sequence is an interval escape sequence where the escaped points do not completely surround the origin, not a donut. Refer to the escape categorizer (204) for details on controlling this limitation requirement. If the interval is iterated as a disc, then the implicit nature of disc prevents a "donut".

Reversible Escape Sequence

Also, in some cases, every iterate, not just the escape iterate, may need to be a principle interval (i.e. not a donut which surrounds the origin), in such cases, the indeterminate checker (206) can enforce this. See below.

Discrete Dynamic Systems

A discrete dynamic system is system for mapping values from a parameter space to a codomain of values. The mapping is defined by a sequence of mathematical iteration steps which are organized into iteration levels. Each iteration level is composed of simple mathematical steps for mathematical operators. The distinction of levels and steps is somewhat arbitrary: each step could be considered a separate level, but the concept of an iteration level is useful, because often the proscribed sequence of steps is repeated over-and-over at each iteration level. For example, for the original Mandelbrot, each iteration level consists steps of a squaring and an addition.

The parameter space is mapped directly into a metacomplex value. Metacomplex is my generic term for a number system for either complex or hypercomplex, where hypercomplex is when at least two imaginary axes are present. For example, a hypercomplex system of three imaginary axes is traditionally called a quaternion.

Cell State, and Final Cell State

Three cell states are provided. Only the first two are used for a return value, called a final cell state.

Escape Category

An escape category indicates all points iterate to a designated escape distance. Refer to the escape categorizer (204).

Indeterminate State

An indeterminate state indicates that continued iteration is not likely to establish an escape category.

Incomplete State

An additional state, an incomplete state, indicates additional iteration is needed; this state is used internally and not part of a final result, which is called the final cell state.

Cell Iterate Data

The cell iterate data consists of all the iteration interval result data which is accumulated during interval iteration, beginning with the 0'th iterate, or coverage cell.

Interval Iterate Data

In cases where each iteration is subdivided into separate intervals, the cell iterate data keeps track of each of these separate interval results as separate intervals. When an individual interval is processed separately as part of there own sequence of interval results, then the interval iterate data is used to designate a subset of the entire iterate.

Required Input Parameters

Metacomplex Iteration Expression

For a discussion of data types refer to the ESCAPE DISTANCE SOLVER-EMBODIMENT, of FIG. 5.

Coverage Cell

A coverage cell is the spatial subset of the parametric space; the spatial subset forms the 0'th iterate.

Output Result: Final Cell State, and Cell Iterate Data (See Above).

Indeterminate checker (206)

Refer to the lower right of FIG. 6. The indeterminate checker (206) returns a cell state to indicate an indeterminate state or incomplete state based on the cell iterate data. If the last iterate of the cell iterate state includes the origin, and then an indeterminate state is always returned. Otherwise, an incomplete state is returned, unless an optional test is provided:

Maximum Indeterminate Iteration Level

When testing an unknown area of the parametric space, it is useful to have some limit set on the maximum number of allowed iterations. This is easily accomplished by returning an indeterminate state whenever the iteration level exceeds a maximum indeterminate iteration level.

Optional Prisoner Test

If the cell iterate data indicates that the interval represented by the current iterate is fully enclosed by an interval representing a previous iterate, then the indeterminate checker (206) can return an indeterminate result, because future iterates will repeat this enclosure forever. (This implies that each iteration expression is the same for each iteration level).

Escape Categorizer (204)

Overview

For the escape categorizer (204), refer to the bottom right of FIG. 6, just above the indeterminate checker (206). The escape categorizer (204) returns a cell state to indicate an escape category when the absolute value of every point of the last iterated interval of the cell iterate data, achieves a designated category escape distance, and otherwise returns an incomplete state unless, optionally, the combined argument angle span exceeds angle span cutoff value.

Angle Span Submode:

Predetermined Angle Span Cutoff, or Implicit in the Nature of the Interval Iterate Angle span testing seeks to ensure that the maximum angle, from the center point of the interval iterate to any other point of the interval iterate, is limited to a predetermined angle span cutoff value, typically given in radians or degrees. This definition applies to both complex and hypercomplex forms.

Issues

Issue of Implicit Angle Span Cutoff

The actual test of an angle span may not need to be explicit. For example, the interval iterate may consist of only one subinterval and that subinterval might be an interval disc comprised of a center location (i.e. metacomplex value) and an inclusive radius. Because all points of the disc achieve at least the minimum escape distance, prior to testing the angle span, it implies that the total angle span is less than Pi radians (or 180 degrees). For example, for a circle interval (i.e. disc in the complex plane), if the absolute value of the center location exceeds the radius by a minimum escape distance, then points within the circle must all have a complex argument angle less than Pi radians different than any other point on the circle.

Multiple Subinterval Testing

When multiple subintervals are involved (see level iterator (202), below), then although each subinterval escapes and has a limited angle span, the full angle span of intervals taken together, may exceed the predetermined angle span cutoff. In most all cases, the angle span will never be allowed to get close to 2 Pi radians (or 360 degrees) because it raises ambiguity with some points having the same principle angle but actually achieving an additional rotation around the origin.

Application

When there is an implicit angle cutoff inherent in the interval itself, and that cutoff meets the purposes of the application, then no additional processing at all is required. However, an explicit cutoff requires that upon successful completion of the escape testing, the cutoff test is performed; in such a case, the result is given as follows: escape category is the result when the angle span is less than or equal to the predetermined angle span cutoff; indeterminate category is the result when the angle span exceeds the predetermined angle span cutoff.

Cell Iterate Analyzer (208)

A cell iterate analyzer (208) tests an interval iterate by returning the results of calling the escape categorizer (204) and indeterminate checker (206). If the escape categorizer (204) or indeterminate checker (206) returns a result other than "incomplete state", with precedence given to the escape categorizer (204), then that final cell state is returned. Otherwise, "incomplete state" is returned.

Parametric Interval Iterator (200)

The parametric interval iterator (200), shown near the top-right of FIG. 6, takes two parameters, the metacomplex iteration expression, and the interval iterate data. The interval iterate data may only need to provide the most recent iterate (e.g. zLast), but other iterates may also be needed. For example, the standard Mandelbrot expression, $zLast^2+z0$, requires z0, which is the 0'th iterate. The component must substitute these intervals into the metacomplex iteration expression and evaluate the resulting interval expression using inclusive interval processing. After substitutions are made, it results in a metacomplex interval expression, which is then processed as an interval expression by methods such as the INTERVAL EXPRESSION EVALUATOR EMBODIMENT of FIG. 1 or DUAL ROUNDING INTERVAL EXPRESSION EVALUATOR EMBODIMENT as shown in FIG. 4. My belief is that the optimal disc inclusive operators described earlier, and as part of another patent, are extremely important to achieving good efficiency.

Level Iterator (202)

The level iterator (202) takes cell iterate data, which defines the iteration of the metacomplex expression up to the previous iteration. When the cell iterate data is empty, then the coverage cell is used as input to create one or more subcells to cover a representative sample of the coverage cell.

A representative sample may include the entire coverage cell, but in the case of some functions, such as the analytic functions, the use of only boundary subcells may be needed. For this initial iteration, the 0'th iteration, the resulting subcells are converted without additional processing.

When subsequently called, for each iteration sequence of the cell iterate data, the interval iterate data (specific to one subinterval sequence), is passed to the parametric interval iterator (200). The results of each of these calls to the parametric interval iterator (200) are accumulated, and used to update the cell iterate data, before returning the updated results.

Cell Categorizer (210)

A cell categorizer (210) processes a specified coverage cell, or spatial subset, of a parameter space, to establish a topological state of either an escape category or indeterminate state. It manages the full embodiment as shown in FIG. 6. The cell categorizer (210) initializes a cell iterate data, and then loops on the process of calling the level iterator (202) with the successive cell iterate data and obtaining the updated cell data in return, followed by calling the iterate analyzer means with the same cell iterate data. This loop continues until the cell iterate analyzer (208) returns a cell state which indicates an escape category or an indeterminate state. The cell state is returned together with the cell iterate data.

Operation: Interval Escape Categorization Embodiment, FIG. 6

Operation of the INTERVAL ESCAPE CATEGORIZATION EMBODIMENT of FIG. 6 can be simple. A spatial subset is selected and the cell categorizer (210) is called to iterate. If the result specifies an escape category, then completion is made. If the result is indeterminate state, then an external program may wish to subdivide the initial spatial subset and make another call to the cell categorizer (210).

Typically, a large area is recursively subdivided and processed until enough detail is known. When the cell categorizer (210) has a limit on the number of iteration steps, then any location can be processed without concern for an infinite loop. However, if there is no limit on the number of iterations, then one should start from a spatial subset which is known to iterate quickly, and after that, only select spatial subsets adjacent to spatial subsets known to escape. This trick means that each new spatial subset will have some points which escape (because of the adjacency); if any points don't iterate or require many iterations, then the resulting interval is guaranteed, for most any escape technology, to reach an indeterminate state fairly soon after the iteration count reaches the iteration count of the successfully escaped neighboring spatial subset. This technique of guaranteeing completion of adjacent spatial subsets, is the hallmark of the prior art, which did not use inclusive intervals, but rather used Koebe ¼ Theorem to guarantee an escaping interval.

Same Level Winding Embodiment—FIG. 7
Description: Same Level Winding Interval Embodiment—FIG. 7
Purpose:

The purpose of this embodiment is to create consistent winding counts by converting principle escape sequences into winding escape sequences. This embodiment, SAME LEVEL WINDING INTERVAL EMBODIMENT, shown in FIG. 7, is a method for assigning consistent winding counts to principle escape sequences. A principle escape sequence is a numeric proof that an escape interval is an inclusive interval which includes all images of points passed through an iteration of a metacomplex iteration expression, without a full wrap-around of argument angles throughout 2 Pi radians. A winding escape sequence is simply a principle escape sequence with a consistent winding count assigned to the last iterate of the sequence.

Complex Only for Metacomplex Iteration Expression

Winding counts around the origin occur in complex space; therefore, the entire INTERVAL ESCAPE CATEGORIZATION EMBODIMENT of FIG. 6 needs only function with complex operators.

Interval Center

Winding counts are assigned based upon the number of times a point winds past the branchcut, where the branchcut is typically taken as the negative real axis. Because an interval has many points, one point of the interval must be chosen as the point for counting branchcuts. Typically, this point is chosen as the center point of the complex argument span of angles. When the interval is a circle, then the logical point is the center of the circle. This point will be called the interval center. The winding count is always an exact integer so that there must never be ambiguity about which side the interval center lies with respect to the negative real axis.

Winding Escape Interval

A principle escape interval is the last interval iterate of a principle escape sequence. A winding escape interval is simply a principle escape interval plus a winding count. When there is no ambiguity, the following shortened names are used: winding interval for a winding escape interval; winding cell for the original coverage cell used to create the principle escape interval; winding level for the escape iteration level of the winding interval; and, winding center for the center of the winding interval.

Interface:

For the purposes of simplifying the block diagram, some of the structures for input and output are given abbreviated names:

PEII, Principle Escape Interval Iterates

A PEII is simply a cell iterate data returned from the cell categorizer where the corresponding cell state is "category escape". The resulting interval must be a "principle" interval because, by itself, it must not fully wrap around the origin like a donut.

WEII, Winding Escape Interval Iterates

This is simply a PEII combined with a winding count for the last interval of the iteration, the winding escape interval. WEIIs are created usually created using an adjacent WEII through use of a same level resolver (222), see below. To find an initial WEII, refer to the description of the anchor resolver (226), see below.

Principle Escape Categorizer (211)

The principle escape categorizer (211), shown at the top of FIG. 7, is used to categorize a coverage cell and return cell iterate data and a final cell state, where terminology was defined in the previous embodiment, INTERVAL ESCAPE CATEGORIZATION EMBODIMENT of FIG. 6. That same embodiment should ensure that all generated sequences, which achieve an escape category, are principle escape sequences: refer to the angle span submode of the escape categorizer (204) of that same embodiment for details on ensuring that only principle intervals are generated; usually, nothing special is needed, particular with that embodiment uses a single interval for each iterate.

Anchor Resolver (226)

An anchor resolver (226) takes a PEII and assigns a winding count to the escape interval, the last iterate. The combined result is a WEII. In FIG. 7, the anchor resolver (226) is shown at near the middle left.

Assignment of Winding Count

An attempt is made to resolve a principle escape interval based on a special relationship of its associated coverage cell's, or spatial subset's, and unique location in the parameter space. A winding count, consistent with the overall topology, is created, and assigned to the principle interval to form a winding interval.

Mode: 0'th Level Anchor

If the cell iteration data terminated at the 0'th interval, then a winding count of zero is assigned and combined with the cell iterate data to form a WEII Mode: Higher Level Anchor Enhancement Sometimes a winding count can be assigned to principle intervals with an iteration count other than 0. For example, in the Mandelbrot, any coverage cell which touches the positive real axis can be iterated to a principle escape interval and can be immediately assigned a winding count of 0. The coverage cells touching on the negative real axis can also be assigned a specific winding count: $2^{(n-1)}$, where n is the iteration level; that is, after one iteration, the winding count is 1, after 2, the winding count is 2, and so on.

Failure Indication

In a typical system, a call to the anchor resolver (226) where the PEII is always 0'th iterate level, the result is always a success. However, on systems where a failure may occur because the iteration level is arbitrary, then failure is possible and a failure can be indicated with an empty return or some other simple method.

Branchcut Adjuster (220)

The branchcut adjuster (220) is shown at the bottom right of FIG. 7. A branchcut adjuster (220) is a fundamental component for resolving consistent winding counts. Its purpose is simple: determine a branchcut adjustment to a winding count based on complex intervals crossing, or not crossing, the branchcut of the negative real axis of the complex plane.
Parameters:

Two complex points are provided. Points can be found by direct iteration to the same iteration level, or points may simply be points within an interval, where it is typical to use the center point of an interval.

Donor Point

A donor point is simply a complex point.

Receiver Point

A receiver point is simply a complex point.

Rotational Direction

Consider a ray from the origin to the donor point. The ray can be rotated around the center until it intersects the receiver point; choose the direction which requires the minimum angle of rotation. For example if the donor point is on the positive real axis, and the receiver is on the negative imaginary axis, then the angle is −Pi/2. However, if the receiver is on the positive imaginary axis, then it is shorter to rotate counterclockwise (positive), indicating Pi/2. Of course, if the two points are exactly opposite the origin, then either an error or arbitrary direction is chosen; don't let the system generate such a request! Thus, the rotation angle is less than Pi.

Algorithm for Adjustment: {−1, 0, 1}

A branchcut adjuster (220) is a simple low level component which computes an integer adjustment of 1, 0 or −1. If the rotating ray passes from the negative real axis into the 3rd quadrant; then return 1; this indicates a positive branchcut transition. If the ray passes from the 3rd quadrant onto (or passed) the negative real axis, then return −1; this is a negative branchcut transition. Otherwise return 0.

Fast Branchcut Algorithm Mode:

The above method for finding an adjustment is very intuitive, but it may require conversion from points to angles, which can be burdensome. The center of an interval is usually a Cartesian complex point, and, for such, there is no need to use trigonometric angle conversions. If we let the real and imaginary parts of the donor point be represented as rD and iD, respectively, and we let the real and imaginary parts of the receiver point be represented as rR and iR, respectively, then a simple high speed algorithm can be used to compute the adjustment. Here is the recursive code, as implemented in the Mathematica language, of Mathematica.

```
Compile[{rD,iD,rR,iR},Which[rD==0.,If[iD>0.,If[rR<0.,If[iR<0.,1,0],0],
If[rR<0.,If[iR≧0.,−1,0],0]],rR==0,−
FastFielder[rR,iR,rD,iD],iD==0.,If[rD>0.,0,If[iR<0.,1,0]],iR==0.,−
FastFielder[rR,iR,rD,iD],{iD>0.)==(iR>0.),0,iD<0.,−
FastFielder[rR,iR,rD,iD],rD>0.,If[rR>0.,0,If[iR rD>iD
rR,1,0]],True,If[rR<0.,1,If[iD rR<iR rD,1,0]]] ];
```

If the complex argument angles for the donor and receiver are known or computed, then the above algorithm is not needed, a simple check of the amount of difference between angles and branchcuts is straightforward.

Output: Winding Adjustment

The result is an integer of 1 or 0 or −1.

Same Level Resolver (222)

Refer now to FIG. 7, at the bottom, to find a same level resolver (222). The same level resolver (222) has a donor WEII parameter and receiver PEII parameter; both the WEII and PEII have the same iteration level for escaping. At the 0'th iteration level, the two 0'th iterates are in contact, with at least one point. The difference between the WEII and PEII is that the WEII has an assigned winding count. The purpose of this component is to use the winding count of the WEII to compute a winding count for the PEII, and return a result WEII composed of the new winding count and the original PEII. One of the inputs may represent a pointwise iteration. There are two modes, and hybrid of both, which can be used to compute the new winding count. Both modes require the use of the branchcut adjuster (220), and one mode requires the metacomplex iteration expression for input.

Same Level Interval Contact Mode

This mode of operation is fast and will work for most inputs. Its successful operation requires that the angle span of the union of the escape intervals of the donor WEII and receiver PEII do not fully wrap around the origin for 2Pi radians; wrap-around causes ambiguity. First the winding count adjustment is computed by calling the branchcut adjuster (220), using the center of the donor WEII escape interval as the donor point and the center of the escape interval of the receiver PEII as the receiver point, to serve as input to the branchcut adjuster (220). The result of calling the branchcut adjuster (220) is the winding count adjustment. Next, the new winding count is set to the winding count of the donor WEII added to the winding count adjustment, just computed. Finally, the new winding count is combined with the donor PEII to produce the result WEII.

Same Level Point Contact Mode

In systems where the escape intervals (the final interval of the PEII or WEII iteration) may have union which spans at least 2 Pi radians, then this mode, the same level point contact mode, is used; it always succeeds. This process requires two calls to the branchcut adjuster (220) and a standard, principle only, iteration of point.

Step #1: Construction of: Initial Contact Point and Escape Contact Point.

An initial contact point, any point common to the 0'th iterates of the donor and receiver, is found. For example, the 0'th iterates are a shape interval of the coverage cell representing a portion of the parameter space. If these are both squares (very likely in a complex iteration before conversion to a disc interval), then a simple intersection of the two squares will result in a point, a line segment, or a rectangle (or square). Pick any point from the result; that becomes the initial contact point. Under the control of the operands and operators of the metacomplex iteration expression, using standard complex arithmetic as in traditional prior art, this point is iterated to that iteration level which is the level indicated by both the donor WEII and the receiver PEII. The resulting point has no winding count. However, it has escaped (because all points of both intervals escape, and the contact point is part of both intervals). Therefore, the result is called the escape contact point.

Step #2: Resolving the Escape Contact Point: Winding Contact Point.

Because the escape contact point is a point, it will have a zero angle span. Therefore, treat the escape contact point as a receiver point for the branch adjuster (220). The center of the escape interval of the donor WEII is used as the donor point for the branchcut adjuster (220). Then the branchcut adjuster (220) is called and it returns a winding count adjustment. A new winding count is computed as the sum of the winding count adjustment added to the winding count of the donor WEII. Then this new winding count, together with the escape contact point, constitutes a resolved point, called the winding contact point.

Step #3: Resolving the Receiver PEII to Produce the Result WEII

The winding contact point is used as a donor point to the branchcut adjuster (220). The center of the escape interval of the receiver PEII is used as a receiver point for the branchcut adjuster (220). Then, the branchcut adjuster (220) is called to return a winding count adjustment. A final winding count is computed as the sum of the winding count adjustment, just computed, and the original winding count from the winding contact point from step #2. A result WEII is found by combining the final winding count with the receiver PEII.

Same Level Hybrid Mode

This mode includes both of the above modes. If the same level interval contact mode can be applied without ambiguity (total angle span coverage of both escape intervals of less than 2 Pi), then it is used. Otherwise, the same level point contact mode is used, which always succeeds.

Best Mode

If there is no chance of the combined angle span reaching 2Pi radians, then the very fast same level interval contact mode is best; its easy to implement and extremely fast. Otherwise, the best mode is the hybrid, which allows for speed when applicable, but has the fallback position of the same level point contact mode, which is usually much slower because iteration through all iteration levels is required.

Winding Escape Chain Constructor (340)

The winding escape chain constructor (340) constructs winding escape chains. The most basic winding escape chain is a winding escape sequence consisting of a single winding escape sequence. A winding escape sequence is most easily constructed by calling the anchor resolver (226); the anchor resolver (226) is the only way to create a winding escape sequence without referring to another winding escape sequence. The anchor resolver (226) can only create winding escape sequences from very special PEII, those which have special topological properties. However, if another principle escape sequence (as in a PEII), operating as a receiver, is created so that it touches a previous winding escape sequence, called a donor, then the winding count information from the donor can be transferred from the donor to receiver using the same level resolver (222). Of course, in this embodiment, the winding escape chain constructor (340) is limited by the same level resolver (222), which can only transfer winding count information when the donor and receiver are at the same iteration level.

Winding Escape Chains

When two winding escape sequences are adjacent, as in having a least one point in common at the 0'th iterate, then a winding escape chain is formed. Any number of winding escape sequences can be joined together to form cover an area or swath a path.

Operation: Same Level Winding Interval Embodiment—FIG. 7

The goal of this embodiment, WINDING INTERVAL EMBODIMENT, see FIG. 7, is the creation of winding escape chains. In this system, each iteration level is independently processed with its own winding escape chains.

Anchor Resolver (226) Usability Requirement

It is probably silly to operate this embodiment as is, unless the anchor resolver (226) uses a higher level anchor enhancement mode; otherwise, only winding counts at iteration level zero can be assigned, and they will be assigned 0.

High Speed Resolving with Winding Escape Chains

It should be clear that the real power of this embodiment is only realized when an additional PEII is found adjacent to a currently available (remembered) WEII; in such a case, a winding count can be quickly assigned calling on the same level resolver (222), provided the WEII and PEII are at the same iteration level. But the principle escape categorizer (211) may return iteration levels with a count higher and lower than the adjacent WEII! Thus, only random luck would allow finding a PEII and adjacent WEII at the same level. Consider the following possible enhancement. Suppose, we have an available WEII at level, say n, and we wish to find an adjacent PEII at the same iteration level. This can be done by setting a "required iteration level" flag inside the principle escape categorizer (211) so that no escape category is allowed below this level, and all iterations above level n are aborted by returning a final cell state of indeterminate state. Now, with this setup, and a small enough coverage cell adjacent to the WEII's coverage cell, it will be possible to find a PEII that can be resolved. With such a setup, a final cell state returned as "escape category" will always be at the correct level. And a final cell state of indeterminate state will signal a requirement to make the coverage cell smaller and smaller (but still in contact with the WEII's coverage cell) and the indeterminate state should eventually switch to an escape category.

Self Winding Resolver Embodiment—FIG. 8

Description: Self Winding Resolver Embodiment—FIG. 8

Limitations

Complex Only:

The metacomplex iteration expression is limited to complex expressions.

Dominant Expression Limitations:

A dominant expression is created from the metacomplex iteration expression by a complex dominant splitter (251), shown in the upper right of the diagram FIG. 8. Each operator in the dominant expression is limited to operators such as multiply, divide, or integer power, or degenerate forms of these. See the self winding operator pool (224) for available operators.

Anchor Resolver (226):

see description in SAME LEVEL WINDING EMBODIMENT—FIG. 7

Branchcut Adjuster (220):

see description in SAME LEVEL WINDING EMBODIMENT—FIG. 7

Complex Dominant Splitter (251)

Creates: Dominant Expression and Inferior Expression

See description of dominant splitter (250) in SAME ESCAPE DISTANCE SOLVER—EMBODIMENT—FIG. 5; this component is identical except that it only needs to operate on complex expressions instead of metacomplex expressions. This component is generally executed only once because the results are unchanging for all processing of the same metacomplex iteration expression.

Self Winding Operator Pool (224)

Overview

The self winding operator pool (224), shown on the right of FIG. 8, takes a request for a specific winding operator and supplies the requested winding operator. The linkage between request and return may be as simple as direct evaluation of the operator, or a more formal process of opening a library and setting up a runtime linkage. The hard part is the implementation of the winding operators, and is detailed here. Although ordinary complex arithmetic does not admit to winding counts, we can impose a system of arithmetic operators which do preserve winding counts. The operators in this pool operate on pointwise values. The process works with forward or inverse iteration; therefore, the operators in the self winding operator pool (224) should support all operators, and inverses, of the complex iteration expression, which defines the operators and their sequencing. Inverse sequencing of the complex iteration expression might seem, at first glance, to be impossible, because the inverse of a squaring operation (for example, squaring is part of the Mandelbrot) is the complex square root which produces two results. Which one is to be chosen? However, by use of winding counts, there is only one inverse choice, as described in detail below.

To understand the process requires a deeper concept of winding counts with respect to each mathematical operator found in steps of the iteration. Some operators (multiplication, inversion, power raising) permit self winding because of their close relationship to logarithms. A winding count is simply a way of keeping track of branchcuts across the negative axis of the complex plane. When a logarithm is taken of a complex number, the imaginary part specifies the winding count as a multiple of 2Pi. For example, if we take the logarithm of (1+I) with an associated winding count of w, the imaginary part is given by w*2*Pi+Pi/4, where Pi/4 is the imaginary part of taking the principle logarithm of (1+I). Note that "I" is the symbol in Mathematica for the square root of −1. The operators for addition (and subtraction) require outside help using the branchcut adjuster (220), as described below under the winding addition routine.

Notation

"Winding" Naming, as in windingMultiply.

Operator names include the "winding" mnemonic to remind the reader that the operator uses winding counts.

Winding Point, or WindingPt[cp_,wc_]

A "wc" parameter is the winding count for use with the point value. A "cp" is simply the complex value of a point. Therefore, WindingPt[cp, wc] is the specification of a point with a winding count.

Logarithmic Point, or LogPt[cp:realPart_,ip: imaginaryPart_].

A logarithmic point is the invertible complex logarithm of a winding point. In some applications, the imaginary part of a LogPt can be extraordinarily large because winding counts can be extraordinarily large.

Winding Operators

This section contains a list of mathematical winding operators which operate on points. The first two, the windingLogarithm and windingExponential may be used, but are more for illustration of the underlying principles and to verify that the other winding operators are correct. All of these operators include "winding" in their name. And they are described now.

LogPt[cp]=windingLogarithm[WindingPt[cp,wc]]

The complex logarithm of such a point, called a windingLogarithm, is given by the principle logarithm plus I*w*2*Pi, as described above. The real part of the winding complex logarithm is simply the absolute value of cp. Unlike the standard multi-valued complex logarithm, the winding logarithm is a one-to-one function. For an inverse operation: see windingExponential[LogPt[cp]], below.

windingLogarithm[WindingPt[cp_,wc_]]:=
        LogPt[Log [cp]+I*wc*2 Pi];
    Print[Map[windingLogarithm[WindingPt[#[[1]],#[[2]]]]
    &,
       {{1+I, 2}}]]

--- windingLogarithm[WindingPt[cp_,wc_]]:=
  LogPt[ Log[cp]+ I*wc*2 Pi] ;
Print[ Map[ windingLogarithm[WindingPt[#[[1]],#[[2]]] ] & ,
    { {1+ I ,2} }]]
    {LogPt[4 i π+Log[1+i]]}

---

WindingPt[cp,wc]=windingExponential[LogPt[cp]]

The windingExponential of a LogPt provides a unique WindingPt. The cp part of the result is simply the complex exponential of rp (real part) and ip (imaginary part) treated as rp+I*ip. The wc part is selected so that the windingLogarithm of the result produces the original LogPt[rp,ip] value. Mathematica offers a Quotient function to find the wc value. For an inverse operation: see windingLogarithm[WindingPt[cp, wc]], above.

--- windingExponential[LogPt[cp_]]:=
  With[{theMod=Mod[Im[cp],2 Pi],wc= Quotient[Im[cp],2 Pi]},
    WindingPt[Exp[cp],If[theMod>Pi,1,0]+Quotient[Im[cp],2 Pi]]];
expResult=Map[windingExponential[LogPt[#]]& ,
    logInput={ I 5Pi/2,1+ I Pi,− I 5Pi/2}] ;
Print["log: ", logInput];Print["exp: ", expResult];
Print["Log[Exp[ ]]:", Map[windingLogarithm[#][[1]]&,expResult]] ;

$$\log: \left\{ \frac{5i\pi}{2}, 1 + i\pi, -\frac{5i\pi}{2} \right\}$$

exp: {WindingPt[i,1],WindingPt[−e,0],WindingPt[−i, −1]}

$$\text{Log[Exp[ ]]}: \left\{ \frac{5i\pi}{2}, 1 + i\pi, -\frac{5i\pi}{2} \right\}$$

---

WindingPt[cp,wc]=windingInvert[WindingPt[cp,wc]]

When the cp value is not on the negative real axis, then the winding inversion is given simply by WindingPt[1/cp, −wc]. Otherwise, we have WindingPt[1/cp,−wc−1]. This same operation can be performed using the windingLogarithm and windingExponential functions. The windingInvert is its own inverse operation.

---

{windingInvert[wp:WindingPt[cp_,wc_],
  isQuick_:True]:=If[isQuick,
WindingPt[1/cp, −wc+If[Re[cp]<0&&Im[cp]==0,−1,0]],
    {windingExponential[LogPt[−(windingLogarithm[wp][[1]])]]}];

---

WindingPt[cp,wc]=windingMultiply[wa_WindingPoint, wb_WindingPoint]

Recall that the product of two complex numbers is simply the complex exponential of the sum of the complex logarithms of the numbers. That method, using the windingLogarithm and windingExponential functions already described can be implemented to find the winding count for a multiplication. A much faster method can be developed which uses only adds and multiplies to find the winding count. The slow method, using logarithms, is a much simpler, and illustrates issues. For inverse operation: see windingDivide, below. This method can also be used for standard multiplication of a winding number by a constant complex multiplier; in that case, the constant is provided with a winding count of zero.

Slow Multiply

```
windingMultiply[wpA:WindingPt[cpA__,wcA__],wpB:WindingPt[cpB__,wcB__]]:=
    {windingExponential[ LogPt[
        {windingLogarithm[wpA][[1]]+ windingLogarithm[wpB] [[1]]]] ;
Print[windingMultiply[WindingPt[2, 10],WindingPt[-2.+I 3., 1] ] ]
    WindingPt[-4.+6.i,11]
```

Fast Multiply

The following section of code is used to create a routine which multiplies two points with winding counts. The parameters and result use a different record structure for defining a point. For example, the WindingPt[cp,wc] is encoded as a list: {wc, {Re[cp], Im[cp]}}. None-the-less, it shows how to implement a fast winding multiplication. There may be many code segments that can accomplish this fast multiply; it just comes down to detecting a rotation through the negative real axis.

The following code implements a simple concept. The new principle value of a multiplication can be computed by the usual means. The new winding count is the sum of the winding counts of the two input values plus a possible small adjustment of 1 or −1. The adjustment is zero if the multiplication of the principle values does not rotate across the branchcut of the negative real axis. The following fast routine computes the multiplication of winding complex numbers while performing all the adjustment code without resorting to transcendental functions. The following code shows how to multiply two complex numbers with associated winding counts.

The "isZeroQ" simply tests for zero, and the PointMultiply routine multiplies two complex numbers.

isZeroQ[v_]:=v==0;
    PointMultiply [{r1_,i1_},{r2_,i2_}]:={−i1 i2+r1 r2,i2 r1+i1 r2};

The RealMultiplyComplexWindingOp multiplies a non-zero real number with winding count times a non-zero winding complex number. The real value should not be zero, because no winding numbers will exist with a zero multiplier. This first routine requires that the real value is passed as the first parameter. The second form of the routine is automatically invoked, using function overloading, when the first routine cannot process the input. The code must detect branchcuts across the negative real axis.

```
RealMultiplyComplexWindingOp[a:{wa__,aCenter:{ra__,z_?isZeroQ}},
    b:{wb__,bCenter:{rb__,ib__}}]:= CompoundExpression[
Which[ra>0.,{wa+wb,ra bCenter},ra==0.,Abort[ ];,
    ra<0., Which[ib<0.,{wa+wb,ra bCenter},ib==0.,Switch[Sign[rb],
        −1,{wa+wb+1,{ra rb,0.}}, 0,Abort[ ];,
        1,{wa+wb,{ra rb,0.}}],ib>0.,{wa+wb+1,ra bCenter}],
    True,Abort[ ];]];
RealMultiplyComplexWindingOp[
    b:{wb__,bCenter:{rb__,ib__)},a:{wa__,aCenter:{ra__,z_?isZeroQ}} ]:=
        RealMultiplyComplexWindingOp[a,b];
```

The ImaginaryMultiplyComplexWindingOp multiplies a non-zero imaginary number, with winding count times a non-zero complex number with winding count. Note that all multiplications by a pure imaginary number cause a rotation by either Pi/2 radians clockwise or counter-clockwise. The code must detect branchcuts across the negative real axis. Two "overloaded" routines are used: one is used when the imaginary number is first, the other when it is second.

```
ImaginaryMultiplyComplexWindingOp[a:{wa__,aCenter:{__?isZeroQ ,ia__}},
    b:{wb__,bCenter:{rb__,ib__}}]:=
        Which[ia>0.,{wa+wb+If[rb<0.&&ib>0.,1,0],ia {−ib,rb}}.
        ia<0.,{wa+wb+If[rb*0.&&ib<0.,−1,0],ia {−ib,rb}},True,Abort[ ];];
ImaginaryMultiplyComplexWindingOp[
a:{wa__,aCenter:{ra__,ia__}}, b:(wb__,bCenter:{__?isZeroQ,ib__}}]:=
        ImaginaryMultiplyComplexWindingOp[b,a];
```

The MultiplyComplexWindingOp multiplies a two non-zero complex numbers with winding counts. When one of the numbers lies on a real or imaginary axis, then one of the above simplifying routines is called. With two complex numbers having a different sign of the imaginary value (i.e. one above and one below the real axis), then multiplication cannot cause a branchcut, and the new winding count is the sum of the winding counts. Otherwise a trick is used to setup the complex numbers to meet one of the already processed conditions, and the whole routine is recursively called. This is done using multiplies by Pi radians, twice, but then adding back a winding count of −1 to cancel the effect of multiplying by a total of 2 Pi radians.

```
MultiplyComplexWindingOp[       a:{wa__,aCenter:{ra__,ia__}},
        b:{wb__,bCenter:{rb__,ib__}}]:=
    Which[ia==0.||ib==0.,RealMultiplyComplexWindingOp[a,b],
    ra==0.||rb==0.,ImaginaryMultiplyComplexWindingOp[a,b],
    Sign[ia]≠Sign[ib],{wa+wb,PointMultiply[aCenter,bCenter]},
    True, RealMultiplyComplexWindingOp[{−1,{−1.,0.}},
        MultiplyComplexWindingOp[a,
            RealMultiplyComplexWindingOp[{0,{−1.,0.}},b]]]];
```

Using the above routines, forms with standard parameters are developed for a windingTimes routine which takes two winding points.

```
RestoreWinding[{wc_,{ar_,ir_}}]:=WindingPt[ar+ir I,wc];
windingTimes[a_?NumericQ,b_?NumericQ]:=
RestoreWinding[MultiplyComplexWindingOp[{0,{Re[a],Im[a]}},{0,{Re[b],I
m[b]}}]];
windingTimes[WindingPt[ap_,awc_],WindingPt[bp_,bwc_]]:=
    RestoreWinding[MultiplyComplexWindingOp[{awc,{Re[ap],Im[ap]}},
        {bwc,{Re[bp],Im[bp]}}]];
windingTimes[WindingPt[ap_,awc_],b_?NumericQ]:=
    RestoreWinding[MultiplyComplexWindingOp[{awc,{Re[ap],Im[ap]}},
        {0,{Re[b],Im[b]}}]];
windingTimes[b_?NumericQ,a:WindingPt[ap_,awc_] ]:=
    RestoreWinding[MultiplyComplexWindingOp[{0,{Re[b],Im[b]}},
        {awc,{Re[ap],Im[ap]}} ]];
```

Inverse Operation: See windingDivide, Below.

The inverse of windingPt=windingMultiply[wa_WindingPoint, wb_WindingPoint] is:
   wa=windingDivide[windingPt,wb] or
   wb=windingDivide[windingPt,wa]
WindingPt[cp,wc]
=windingDivide[dividend_WindingPoint,theDivisor_WindingPoint]

Division is trivial: simply multiply the dividend by the inverted divisor.
   windingDivide[dividend_,theDivisor_]:=
       windingTimes[dividend, windingInvert[theDivisor]];
For Inverse Operation: See windingMultiply, Above.

The inverse of windingPt=windingDivide[wa_WindingPoint, wb_WindingPoint] is:
   wa=windingeMultiply[windingPt,wb]
WindingPt[cp,wc]=windingIntPower[p_WindingPt, power_Integer]
WindingPt[cp,wc]=windingPower[p_WindingPt, realpower_]

When raising a winding point to a positive integer power, a series of winding multiplies can be used to obtain the correct answer. For an arbitrary power, the definition of a complex power function can be used with windingLogarithm and windingExponential routines.
   windingIntPower[v:WindingPt[cp_,wc_],p_]:=
       Nest[windingMultiply[#, #]&,v,p−1];
A simple alternative is to use the definition of a power function. This works for all real powers.
   windingPower[wpA:WindingPt[cpA_,wcA_],p_]:=
       windingExponential[LogPt[(windingLogarithm[wpA]
           [[1]]*p)]];
The inverse of windingPt=windingIntPower[p_WindingPt, power_Integer] is:
   wa=windingPower[windingPt,1/power]
Inverse Operation for WindingPower The inverse of windingPt=windingPower[wa_WindingPt, realPower_Integer] is:
   wa=windingPower[windingPt,1/realPower]
windingSquare: WindingPt[cp,wc]=windingSquare[p_WindingP]

The squaring of a winding complex number can be simply computed using the above means for arbitrary powers, but a slightly faster method is available. The principle value is found by squaring the complex number. The winding count is twice the winding count of the original number, plus a possible adjustment. If the input value lies in the second quadrant and the result is in the 3rd or 4th quadrant, then a positive adjustment of 1 is needed. Conversely, if the input value lies in the 3rd quadrant and the result is in the 1st or second quadrant, then −1 is used. For the special case of an input value on the negative real axis, the adjustment is always 1.

Inverse Operation for windingSquare
   The inverse of windingPt=windingSquare[wa_WindingP] is:
       wa=windingPower[windingPt,½] or
       wa=windingSqrt[windingPt] (see next).
windingSqrt: WindingPt[cp,wc]=windingSqrt[p_WindingP]

Taking a square root of a winding number is useful as an inverse to the squaring of a complex number. It can also shed light on the above windingPower. The principle square root is defined as the square root of the complex number (without winding count) which has a positive real value; the special case of the square root of a negative real number is the square root which lies on the positive imaginary axis. The new winding count is the prior winding count divided by 2. This works when the winding count is even, but when odd, dividing by 2 leaves a fraction of ½ or −½. Thus a Pi radian adjustment in the principle part is required; plus for a ½ and minus Pi for −½. When the angular adjustment is made, crossing the negative axis must also adjust the branchcut.

The following routine uses a different form for the parameter input, but this can be easily changed.

```
windingSqrt[{winding_Integer,{reCenter_,imCenter_ }}]:=Module[
    {principleSquareRoot,newCenter,integerPartSqrtWinding,
        realPrinciple,imaginaryPrinciple,windingCount},
    principleSquareRoot= Sqrt[reCenter+ I imCenter];
    newCenter= { realPrinciple=Re[principleSquareRoot],
        imaginaryPrinciple=Im[principleSquareRoot]};
    If[ EvenQ[ winding], windingCount=winding/2;,
  If[imaginaryPrinciple≦; 0.,
            newCenter=−newCenter; (* adding 1/2 winding
            count *)
            windingCount= (winding−1)/2;,
            newCenter=−newCenter; (* subtract 1/2 winding
            count *)
            windingCount=
            (winding+1)/2;]];{windingCount,newCenter }];
```

Inverse Operation for windingSqrt
   The inverse of windingPt=windingSqrt[wa_WindingP] is:
       wa=windingPower[windingPt,2] or
       wa=windingSquare[windingPt] (see next).
windingAdd: WindingPt[cp,wc]=windingAdd[thePt_WindingPt, b_Complex]

The windingAdd operation takes only one winding complex number; the second number is a basic (principle) complex number, having no winding count. Although this may seem to be a severe limitation, it is sufficient for evaluating iteration steps such as when the dominant term is added to the inferior term.

For example, in the Mandelbrot iteration, we have zNext=zLast^2+z0. Here, the z0 term is treated as a standard complex number, and the zLast^2 result is a winding number; the windingAdd routine is perfect for this summation.

Let the WPoint be a winding point acting as a donor point. And let c, a receiver point, be a complex principle value without a winding count. Now add the two principle values of donor and receiver to obtain the new principle value of the resulting point. Next, the winding count of the new point is the donor's winding count plus the adjustment made by calling the branchcut adjuster (220), which was previously described.

Inverse Operation: See windingSubtract, Below.

The inverse of windingPt=windingAdd[wa_WindingPoint, b_Complex] is:
wa=windingSubtract[windingPt,b
windingSubtract: WindingPt[cp,wc]=
    windingAdd[thePt_WindingPt, −b_Complex]

A winding subtract is done by negating the b_Complex parameter and calling the windingAdd operation with corresponding input.

Inverse Operation: See windingAdd, Above.

The inverse of windingPt=windingSubtract[wa_WindingPoint, b_Complex] is:
wa=windingAdd[windingPt,b]

Nonwinding Operators

Other mathematical operators should be considered as non-winding. That is, when used, the winding count is lost. When the underlying technology is a metacomplex dominant form, then all such non-winding operators must be part of the inferior term. For example, in the iteration of zLast^3+Sin [z0]+z0, the Sin [z0]+z0 should be treated as the inferior term, and all winding counts are ignored, so that standard arithmetic operators can be used.

In general, when an operator can be implemented based on logarithms and exponentials, and then there is a good chance that a true winding operator can be constructed.

Self Winding Dominant Stepper (225)

Refer to the middle of FIG. 8. The self winding dominant stepper (225) is key to self winding because it provides an consistent winding count when iterating from one level to another, subject to a later small angle correction of the inferior expression (see self winding iteration resolver (232), below).

Input

Dominant Expression

The dominant expression, a complex expression, is the expression returned from the complex dominant splitter (251).

Point Iterate Data

When iterating forward, the prior iterate (zLast) is sometimes all that is needed. However, many iterations such as the Mandelbrot utilize a z0 iterate, the 0'th iterate, and in such a case, it too must be provided. If other types of iterates appear, they too will be needed. For reverse iteration, the zNext iterate (the iterate before the one desired) is needed, with the z0 iterate needed as in the forward case.

Output: Winding Point

The result is a complex point with a winding count, called a winding point. The iteration level is one level from that designated by point iterate data.

Algorithms and Sample Code

Operation is nearly the same forward and reverse iteration because there are no issues of branchcut ambiguity due to winding counts.

iPat: Iterate Data

This pattern specifies the essential iterate data. The signal to forward or reverse iterate is specified by the placing data in either theZLast or theZNext parameter. z0Init is the initial value of z0, and is not needed unless it appears in the dominant expression.
iPat={theZLast_,z0Init_,theZNext_};

Forward Iteration

Forward iteration is simple: each factor of the dominant expression is operated on by a multiply or a power function (even a divide is a multiply with a power operator to the −1 power). Thus, the algorithm is a simple composition of functions.

In the forward iteration direction, an integer power function may be needed. In the following routine the value z0 can be raised to any power, but the z0 winding count is always initially zero. When a z0 value is encountered in the dominant expression, then the "z0Init" value is passed as the initial complex value. If z0 is never raised to a power, then this mode can be skipped.

When zLast (a variable of the complex iteration expression) is raised to a power, then the "theZLast" value, provided as parameter, is used with its winding count.

```
RaisePower[v_,p_,iterates: iPat]:=
    Which[v===z0,windingIntPower[WindingPt[z0Init,0],p],
        v===zLast,windingIntPower[theZLast,p],
        NumericQ[v],windingIntPower[WindingPt[v,0],p],
        True,Throw[BadPower]];
```

In the following routine, each factor of the dominant expression is processed.

```
ForwardDominantStepper[de_,iterates: iPat]:=
Module[{c,fWinding}, Which[ NumericQ[v],WindingPt[v,0],
    Head[de]===Power,RaisePower[de[[1]],de[[2]],iterates],
    Head[de]===Times,c= WindingPt[1,0]; Scan[ With[{f=#},fWinding=
        Which[NumericQ[f],WindingPt[f,0],
            f===z0,WindingPt[z0Init,0],f===zLast, theZLast,
            Head[f]===Power, RaisePower[f[[1]],f[[2]],iterates],
            True, Throw[BadfWinding] ];
                c= windingTimes[c,fWinding];]&, de]; c,
        True, Throw[BadForwardDominantStepper]]] ;
```

Reverse Dominant Stepper

Although reverse iteration of arbitrary factors is often impossible with complex arithmetic, the use of a winding arithmetic eliminates ambiguity in branchcuts. In general, the dominant expression will consist of: constants; other iterates with supplied values, such as z0; and the next iterate zNext. To reverse the iteration, the zNext value must first be divided by all known constants and supplied iterates; this may include raising these values to a power. The effect of all of these is done separate from zLast. The resulting winding number is divided, with winding division, into the zNext value. The result is zLast^p, where p is an integer power function. To reverse iterate, the unique p'th winding root must be found using a power winding function. The following sample code is provided.

```
ReversePower[v_,p_Integer,iterates: iPat]:=
    Which[v===z0,windingPower[WindingPt[z0Init,0],1/p],
        v===zLast,windingPower[theZNext,1/p],
        NumericQ[v],windingPower[WindingPt[v,0],1/p],
        True,Throw[BadPower]];
ReverseDominantStepper[de_,iterates: iPat]:=Module[
    {zPower=Exponent[de,zLast],newDE,constantPart,zLastPower},
        newDe=de/.zLast→1; (* a trick to eliminate zLast *)
```

-continued

```
constantPart=ForwardDominantStepper[newDe,{ Null,z0Init ,Null}];
zLastPower= windingDivide[theZNext,constantPart];
windingPower[zLastPower,1/zPower]];
```

Either Direction

By checking the availability of theZLast parameter, a decision is made to forward or reverse iterate.

```
SelfWindingStepper[e_,iterates: iPat]:=
    If[!(theZLast===Null),ForwardDominantStepper[e,iterates ],
        ReverseDominantStepper[e,iterates ]];
```

Self Winding Iteration Resolver (232)

A self winding iteration resolver (232), shown in FIG. 8. It is a method for iterating points, forward or reverse, with winding counts while maintaining consistent winding counts for each iteration. Please refer to FIG. 8 for this discussion.

Input: Donor Winding Data

The donor data provides sufficient information to assign a consistent winding count to an iterated receiver point when the receiver initial point is iterated to a donor specified iteration level.

Donor Self Winding Point

The donor self winding point is a complex value plus a winding count.

Donor Iteration Level

The donor iteration level specifies the level of iteration of the donor winding point.

Input: Receiver Goal

Specify the iteration level for the receiver winding point, the winding point which is returned. Alternatively, it is useful to provide a goal that the point is beyond a particular absolute value.

Input: Receiver Iterate Data

Specify the current iteration level, and the iterate data. In general, only two results are ever needed from a previously computed iteration: the complex number evaluation of the inferior expression (called a principle inferior evaluation, and the full iteration result, or principle iteration evaluation which is the sum of the inferior expression evaluation and the evaluation of the dominant expression. Saving such results is an optimization, because if not available, the entire iteration can be recomputed when the initial iterate is known.

Output: Receiver Winding Data

The receiver winding data includes the resulting winding point and its iteration level, but may include all intermediate iteration results, if needed by the caller.

Preconstructed Input: Dominant Expression, Inferior Expression

The dominant expression and inferior expression, both limited to complex values, define a complex iteration expression because the sum is the complex iteration expression. To obtain these expressions, the self winding iteration resolver calls the complex dominant splitter (251), described above.

Algorithm Step A: Obtaining a Receiver Principle Point

The donor point, with winding count, is at the donor level. The goal is to use the receiver iterate data to iterate a receiver point to the same iteration level as the donor point. All calculations are done with ordinary complex arithmetic: winding numbers are not used.

Algorithm Step A: Forward:

This algorithm iterates in the forward iteration, increasing iteration levels, until achieving the donor's iteration level.

Algorithm Step A.F.1: Iteration Process

If iteration has already occurred and is available in the receiver iterate data, and then it can be used. Iteration beginning with z0, the initial starting point of the receiver, is adequate, too. In the forward direction, with increasing iteration levels, each iteration is the sum of: a principle dominant evaluation and a principle inferior evaluation. Thus, this is a standard iteration found in the entire prior art.

Algorithm Step A.F.2: Saving Results

Save the evaluation results, particularly the principle inferior evaluation, as it may be needed later in algorithm step D: Reverse, see later.

Algorithm Step A.F.3: Repetition

Iteration is repeated until achieving the donor's iteration level. This result is the receiver principle point at the donor's iteration level.

Alternative to Forward Iteration:

In some cases where the donor iteration level is less than the receiver's, the receiver's last iteration can be used to start a reverse iteration, called algorithm step A: Reverse. This will usually require that all iterates of the receiver are available: pick the point iterate at the same level as the donor, and then Steps A.F.1, A.F.2, and A.F.3 can be skipped. If enough information is available, then reversing the iteration may be possible. The problem is that for reversing iterations such as the Mandelbrot, which raises zLast to a power of 2, the reverse iteration requires a square root with an ambiguous branchcut. And, the receiver point does not having a winding count; therefore, the winding operators, described earlier, cannot be applied.

Algorithm Step B: Obtaining a Receiver Winding Point

At that donor level, the iterated receiver principle point obtains a winding count as the sum of the donor point's winding count plus the adjustment of the branchcut resolver (220). To use the branchcut adjuster (220), the receiver principle point is used as the receiver point parameter and the donor winding point is used as the donor winding point parameter. It is the responsibility of the calling application to ensure that the receiver point has a complex argument angle less than Pi radians different from the donor winding point so that the final winding count is correct. (Refer to the WINDING JUMP RESOLVER EMBODIMENT—FIG. 9 for a method of ensuring this).

The receiver principle point, when combined with the new winding count and adjusted for branchcuts as described, is called the receiver winding point.

Algorithm Step C: Self Winding Iteration Direction

We have already completed an iteration in algorithm step A: either A: Forward to obtain receiver principle point. If the receiver goal does not match the donor's iteration level, then another iteration is required. This new iteration is called self winding iteration. Iteration may be forward or reverse. The first problem is to determine the direction of iteration as forward or reverse.

We now a have receiver winding point at the donor's iteration level. If the receiver goal indicates a higher level is required, then forward self winding is required. If the receiver goal is satisfied by the donor's iteration level, then the receiver winding point is a final receiver winding point, and it, and useful iteration results is immediately returned as the receiver winding data. The third possibility is that reverse self winding is required.

Introduction to Algorithm Step D: Self Winding Iteration, Direction

If forward or reverse iteration is required to meet the receiver goal, then iteration of each iteration level is required. When forward or reverse, each iteration level requires a call to the self winding dominant stepper (225) and the branchcut adjuster (220). The algorithm for reverse iteration is the reverse of the forward iteration. Although reverse iteration has issues related to alternative branchcuts, if above recommendations to save receiver iteration results for inferior expression evaluations were observed, then reverse iteration is always fast and simple, just like forward iteration.

Algorithm Step D: Forward: Forward Iteration to Meet Receiver Goal

Assume that the receiver goal indicates that forward iteration is required.

Algorithm D.F: Current Iteration Level

Let the current iteration level be defined beginning with an initial value of the donor's iteration level. It is incremented for each iteration of the iteration level.

Algorithm D.F: Next Iteration Level

Reference to the next iteration level is simply a reference to the iteration level defined as the current iteration level plus 1.

Algorithm D.F: Receiver Winding Point

The receiver winding point was initially obtained by algorithm step B: obtaining a receiver winding point, above. However, its value will be updated through each iteration—see algorithm D.F.4: another receiver winding point, below.

Algorithm D.F.1: Dominant Winding Point

The first step in forward iteration is to use the receiver winding point, and necessary iterate data for the next iteration level (such as z0), and to call the self winding dominant stepper (225) in the forward direction to obtain a dominant winding point. In effect, this result represents the result of applying the dominant expression, but it is performed using "weird" winding arithmetic of the self winding dominant stepper (225).

Algorithm D.F.2: Inferior Principle Point

An inferior principle point is calculated by evaluating the inferior expression, as returned by the complex dominant splitter (251), for the next iteration level. Unlike calculations for the dominant winding point, this evaluation is done using standard complex arithmetic.

Algorithm D.F.3: Receiver Principle Point

The inferior principle point is added to the principle part (i.e. complex number without winding count) of the dominant winding point. The result is called the receiver principle point.

Algorithm D.F.4: Another Receiver Winding Point

The receiver winding point for the next iteration level can now be computed by using the receiver principle point as a receiver point parameter for the branchcut adjuster (220); the donor point for the same component is the dominant winding point. The component returns an integer winding adjustment which is added to the winding count of the dominant winding point to produce an adjusted winding count. This adjusted winding count is combined with the receiver principle point to be the winding point, self-wound at that, at the next iteration level.

Algorithm D.F.5: Current Iteration Level is Set to Next Iteration Level

Algorithm D.F.6: Check for Completion and Loop as Required

If the receiver goal is meet (either by having the current iteration level meet a specific iteration level, or the absolute value of the receiver principle point achieves a specified absolute distance, or other), the receiver winding data is returned with the final receiver winding point and any desired iteration results. Otherwise, steps 1 to 6 are repeated until the receiver goal is met.

Algorithm Step D: Reverse: Reverse Iteration to Meet Receiver Goal

Assume that the receiver goal indicates that reverse iteration is required.

Algorithm D.R: Current Iteration Level

Let the current level be defined beginning with an initial value of the donor's iteration level. It is decremented for each reverse iteration of the iteration level.

Algorithm D.R: Prior Iteration Level

Reference to the prior iteration level is simple a reference to the iteration level defined as the current iteration level minus 1.

Algorithm D.R: Receiver Winding Point

The receiver winding point was initially obtained by algorithm step B: obtaining a receiver winding point, above. However, its value will be updated through each iteration—see below.

Algorithm D.R.1: Prior Inferior Principle Point

The prior inferior principle point is the evaluation of the inferior expression, with standard complex arithmetic, for the prior iteration level. Because we are now in a reverse direction to obtain the receiver's goal, all of the prior dominant and inferior values, without winding counts, should already be available because they were saved in the earlier step: algorithm step A.F.2: saving results, above. Thus the inferior principle point for the prior iteration level is taken from saved results and is called the prior inferior principle point.

Algorithm D.R.2: Prior Dominant Principle Point

The prior dominant principle point is calculated with standard complex arithmetic by subtracting the prior inferior principle point (see D.R.1) from the complex point (no winding count) of the receiver winding point.

Algorithm D.R.3: Prior Dominant Winding Point

The prior dominant winding point is the prior dominant principle point combined with a winding count set to the sum of the winding count of the receiver winding point, and a winding adjustment calculated by calling the branchcut adjuster (220) with the following parameters: the donor point parameter is the receiver winding point; the receiver point parameter is the prior dominant principle point.

Algorithm D.R.4: Prior Iteration Winding Point

The prior iteration winding point is the desired goal. It is calculated by a single call to the self winding dominant stepper (225) with the following parameters: the dominant expression parameter is the same as obtained earlier by calling the complex dominant splitter (251); the point iterate data is the necessary data from iteration, including the prior dominant winding point. The result, a winding point is called the prior iteration winding point and is used to update information of the receiver iterate data.

Algorithm D.R.5: Receiver Winding Point is Set Equal to Prior Iteration Winding Point Algorithm D.F.6: Check for Completion and Loop as Required If the receiver goal is meet, the receiver winding data is returned with the final receiver winding point and any desired iteration results. Otherwise, steps 1 to 6 are repeated until the receiver goal is met.

Operation: Self Winding Resolver Embodiment—FIG. 8

The operation of the self winding resolver embodiment of FIG. 8 appears as almost magical, given the chaotic environment of iteration. There is, of course, a caveat. The receiver point receives its donated winding count from the donor winding point at the specified level using algorithm step B: obtaining a receiver winding point.

Winding Jump Resolver Embodiment—FIG. 9

Description: Winding Jump Resolver Embodiment—FIG. 9

Creating Winding Escape Chains

This embodiment, WINDING JUMP RESOLVER EMBODIMENT, shown in FIG. 9, adds one component to the previous embodiment, SELF WINDING RESOLVER EMBODIMENT—FIG. 8. Whereas the previous embodiment allowed only points to be resolved, with a winding count, from a "nearby" winding point, this embodiment allows an entire receiver, a principle escape interval, to be resolved from any adjacent donor which is a winding escape sequence.

Interface: Input and Output

The interface for input and output of the new component are the same as described for the same level resolver (222) of the SAME LEVEL WINDING EMBODIMENT—FIG. 7. As with that same component, the initial iterates (z0) of both interval sequences should be in contact with at least one point in common.

Special Case Algorithm: Same Level

When the donor WEII and the receiver PEII are both at the same level, then the algorithms reduce to the same techniques used for the same level resolver (222), previously described in the SAME LEVEL WINDING EMBODIMENT—FIG. 7. And those previously described methods are either used directly or incorporated into the general case, described below. Therefore, the following discussion relates to when the two inputs have different iteration levels.

Algorithm A: Level Change Point Contact Algorithm:

Introduction

This section describes an algorithm for resolving a receiver, as in a principle escape sequence, using the winding count from a donor, as in a winding escape sequence. Here, the principle escape sequence is defined by a PEII, and the winding escape sequence is described by a WEII.

For this algorithm, two other components are called: the self winding iteration resolver (232) and the branchcut resolver (220), both which were previously described. The self winding iteration resolver (232) was described in SELF WINDING RESOLVER EMBODIMENT—FIG. 8. And the branchcut resolver (220) was described in SAME LEVEL WINDING INTERVAL EMBODIMENT—FIG. 7.

This algorithm, a very simple algorithm, always succeeds. The downside is that a point must be iterated.

Level Algorithm A:1, Initial Contact Point

An initial contact point, any point common to the 0'th iterates of both the donor WEII and receiver PEII, is found. For example, suppose the 0'th iterates are a shape interval of the coverage cell representing a portion of the parameter space. If these are both squares (very likely in a complex iteration before conversion to a disc interval), then a simple intersection of the two squares will result in a point, a line, or a rectangle (or square). Pick any point from the result, that point becomes the initial contact point.

Level Algorithm A:2, Winding Escape Contact Point

A winding escape contact point is a winding point at the iteration level of the receiver PEII. A single call is made to the self winding iteration resolver (232) to compute this winding escape contact point. The preparation of inputs and output of this call are now described.

Input Parameter: Receiver Iterate Data

Because the iteration is starting at the 0'th iteration, only the z0 starting value is provided. The z0 value is the point already selected: the initial contact point.

Input Parameter: Receiver Goal

The receiver goal requires is achieving the iteration level of the receiver PEII.

Input Parameter: Donor Winding Point

The donor winding point is the center point of the donor WEII escape interval. This center point has a winding count which represents the winding count for the donor WEII escape interval. Actually, any point of the donor WEII could be used, but other points may need winding count adjustments based on crossing the negative real axis. So, pick the center point because its winding count is known and defined by the escape interval.

Input Parameter: Donor Iteration Level

The donor iteration level is set to the iteration level of the escape interval of the donor WEIL Output Result: Receiver Winding Data The resulting output, the receiver winding data always includes a winding point used as the winding escape contact point.

Level Algorithm A:3, Result WEII

The winding escape contact point is used as a donor winding point to the branchcut adjuster (220). The center of the escape interval of the receiver PEII is used as a receiver point for the branchcut adjuster (220). Then, the branchcut adjuster (220) is called to return a winding count adjustment. A final winding count is computed as the sum of the winding count adjustment, just computed, and the winding count from the winding escape contact point. A result WEII is found by combining this final winding count with the receiver PEII.

Algorithm B: Upward Interval Resolving Algorithm:

This mode is a special case optimization. It rarely works and it places greater demands on the input parameters and other components. As may have been noticed, the level algorithm A usually uses only the 0'th iterate and last iterate of the receiver PEII and donor WEII. However, this algorithm relies on at least one other iterate and may require interval processing. It requires the same use of the self winding iteration resolver (232) and branchcut adjuster (220). It carries an additional burden of checking to see if branchcut ambiguity may occur, and when it does, this algorithm fails. The self winding iteration resolver (232) must also be designed to accept iterations already partially processed.

The receiver PEII must have a higher iteration level than the donor WEII. Now iterate the entire donor WEII, using inclusive interval processing, to the same iteration level as the receiver PEII; this requires calling the internal routines of the principle escape categorizer (211) to avoid escape checking. If the total angle span of the iterated WEII and the receiver PEII wraps around (e.g. spans more than 2Pi radians) at any of these iteration levels, then it is probably foolish to continue. Now suppose there is no ambiguity, and suppose we use the self winding iteration resolver (232) with the center point of the original donor WEII. This works well for Julia sets, but with z0 in the complex iteration expression, the z0 iterate must be the entire z0 interval iterate. This center point provides the input for both the donor winding point and the starting receiver point. Anyway, after this is completed, this self wound iterated point can be used as the winding escape contact point described above in the Level Algorithm A:2. Then the Level Algorithm A:3 can be applied to complete the upward resolving. It is not pretty, but may be useful in some very special cases.

Algorithm C: Downward Interval Resolving Algorithm:

Suppose the receiver PEII has a lower iteration level than the donor WEII. The lower iterate of the donor WEII, matching the iterate level of the receiver PEII, might have a non-ambiguous angle span with respect to the escape interval of the receiver PEII for each reverse iteration step. If so, then if the self winding iteration resolver (232) can iterate the center of the donor WEII in reverse, then downward resolving can be completed by using the center point of the donor WEII instead of constructing a contact point.

Note that reverse iteration of the iterated intervals is not required because they can be part of the iterates already saved in the WEII. However, to obtain the winding count for the final interval (at the same level of the PEII), requires a winding count for this center point of the reversed interval. In many cases the self winding iteration resolver (232) will not be able to do this. For simple cases such as Julia sets of the Mandelbrot, reverse self winding of a point is straightforward, and in such cases this algorithm can also work.

Level Change Resolver (229)

The level change resolver (229) has the same types of inputs and output as the same level resolver (222). The only difference in input is that the iteration level of the donor WEII and the receiver PEII can be different, rather than in the same level resolver (222), where both iteration levels must be the same. Regardless of the algorithm chosen (A, B, or C, above), the self winding iteration resolver (232) performs the job of iterating a winding point to another winding point at a different iteration level.

Best Mode:

It is hard to recommend any processing mode except "Algorithm A: Level Change Point Contact Algorithm". The other mode using algorithm B sometimes works. In the case of using downward resolving, the level algorithm C requires no additional interval processing, and may therefore be useful. Therefore, it may be useful to have a hybrid algorithm which does a quick check for applicability of algorithms B or C, and if one of them is okay, it is used. Regardless of the mode chosen, the self winding iteration resolver (232) and the branchcut adjuster (220) become involved.

Operation: Winding Jump Resolver Embodiment—FIG. 9

Coverage Cell Branchcut Issue

Now, it may happen that two adjacent coverage cells are on opposite sides of the branchcut of the negative real axis, and both of these coverage cells iterate to a principle escape interval. Suppose one of these has a winding count, and the other receives a winding count by this embodiment. Can a donor WEII with a coverage cell on one side of the branchcut donate to a winding count to a receiver PEII with a coverage cell on the other side of the branchcut? In a strict sense, no, because winding counts may become discontinuous. However, in a practical sense, discontinuities in winding counts may not be a problem when field lines are calculated; refer to the ITERATION CORRELATOR EMBODIMENT, described later.

Winding Chain Embodiment—FIG. 17

Description: Winding Chain Embodiment—FIG. 17

Purpose: Construction of Winding Escape Chains

This embodiment, WINDING CHAIN EMBODIMENT—FIG. 17, includes several additional components added to the WINDING JUMP RESOLVER EMBODIMENT of FIG. 9, as shown in FIG. 17. These additional components have already been described in the SAME LEVEL WINDING EMBODIMENT—FIG. 7. The previously described components are: the winding escape chain constructor (340), the anchor resolver (226), and the principle escape categorizer (211). Here, the winding escape chain constructor (340) is even easier to implement because the level change resolver (229) allows any previously constructed winding escape sequence to donate a winding count to a principle escape sequence; the requirement that they escape at the same interval level is removed.

Winding Escape Chain Constructor (340), Enhancements

The strategy is to create coverage cells in any area of interest and resolve these as part of winding escape chain. This almost always involves creating new coverage cells adjacent to a winding escape sequence. However, the winding escape chain constructor (340) could also create a whole contiguous sequence of principle escape sequences (called a principle escape chain) which touches a single winding escape sequence. Then, beginning with the winding escape sequence, all of the principle escape sequences, can always be resolved into winding escape sequences, one-by-one, by always using a prior winding escape sequence. The final result is a large winding escape chain.

Operation: Winding Chain Embodiment FIG. 17

Winding Escape Sequences

The goal of this embodiment, WINDING ESCAPE EMBODIMENT, see FIG. 9, is the creation of winding escape chains composed of WEII. In actual practice, it may be adequate to only keep track of the initial coverage cell, the center of the escape interval, and the winding count. These items are collective called a winding escape sequence.

Winding Escape Chains

A winding escape sequence, as part of a WEII, can be created, in special cases, using the anchor resolver (226). By picking a coverage cell which is beyond the category escape distance, a WEII with a 0 iteration level can always be created.

However, the usual manner of creation is from a previous WEII using the level change resolver (229). When these components are used, a chain of adjacent winding escape sequences are produced. These winding escape chains can cover a path or cover an area of the complex plane with new WEII's created adjacent to previous WEII.

Iteration Correlator Embodiment—FIG. 10

Overview

In discrete dynamic systems like the Mandelbrot iteration, a major goal is to establish a correlation of pointwise iteration values, terminated at different iteration levels, to a value that would be achieved with an infinite number of iterations. This non-intuitive goal, with infinite iteration, can be achieved, instead, by a correlation to the 0'th iteration parameter space. Therefore, the purpose of this embodiment is to find correlation definitions which map an iterated point to a commonality value, a value common to whatever iteration level.

Requirement

The earlier embodiment, ESCAPE DISTANCE SOLVER—EMBODIMENT—FIG. 5, utilized a dominant expression, which together with an inferior expression represents the iterating expression. The requirement for the automatic production of a correlation definition is that the dominant expression is a product of one or more constants, variables, and iterates, each which is raised to an integer power; the inferior expression can be almost anything. When extra variables, other than iterates, are used, they, of course, must at some future time have a complex value assigned, but this can be done at a later time when the correlation definition is actually applied.

Commonality Modes

Potentials

The only traditional correlation was in regards to the absolute value function, and this produced the familiar "potential function". For example, for the Mandelbrot, with a dominant expression of $z^2$, the correlation was given as $\text{Log}[\text{Abs}[z]]/2^n$, where z is the iterate of the n'th iteration. The natural logarithm is optionally, but is extremely useful for a variety of reasons, including keeping numbers within some reasonably representable form; i.e. keeping the magnitude of the exponent in range of available hardware and software. The value could correlate by the more basic formula of $\text{Abs}[z]^{(2^n)}$, which grows to very large magnitudes.

Field Lines

The calculation of field lines requires a completely new type of correlation. Although, the correlation of iteration values and field lines can be processed within this described method, the iteration of the input point and of consistent winding numbers will be described later. The new method requires the complex argument value of the iterated complex value, which, together with an exact winding count, allows the calculation of consistent and precise field lines.

Complex Logarithm: Potential and Field Lines

Now the Arg function, which is functionally equivalent to an ArcTan, when combined with the logarithm of the absolute function, defines the multi-valued complex logarithm, which in this case has a unique inverse value. Thus, both the potential and field lines are calculated. Although other adjustments are required (such as dividing by $2^n$ in the case of the Mandelbrot), the overall effect allows for the creation of analytic functions, which in many cases are conformal.

Derivatives

Optionally, using standard calculus techniques for derivatives, the correlated derivatives are calculated using traditional means. See commonality correlator (276).

Correlation Definition to Commonality Value

Although all iterations are performed based on the entire metacomplex iteration expression, only the dominant expression is used to define a correlation definition. Then, with the correlation definition, an iterated point value can be assigned a "commonality value". In the case of field lines, the metacomplex iteration expression is limited to a complex iteration expression.

Description: Iteration Correlator Embodiment—FIG. 10

Dominant Extractor (270):

The dominant extractor (270) extracts the dominant term of the metacomplex iteration expression by assuming that the dominant term is the term with the highest power of the variable "zLast", the iterate for the metacomplex iteration expression. This component is nearly identical to the dominant splitter (250) defined in an earlier embodiment, but in this case the inferior expression is not needed.

Code

Note that the use of "NumerDenom" to find numerator and denominator may not be necessary for simple polynomial iterations.

```
DominantExtractor[iterateExpr_]:=Module[{
numer,denom,coefs,theDominant,theInferior},
{numer,denom}=NumerDenom[iterateExpr];
coefs=CoefficientList[numer,zLast];
Return[Last[coefs]*zLast^(Length[coefs]-1)/denom]];
```

Coefficient Power Separator (272):

For the dominant expression extracted by the dominant extractor (270), the coefficient power separator (272) separates the coefficient from the power of "zLast"; the result is a pair called the coefficient power pair.

Sample Code

The code for the coefficient power separator (272) is very similar to the dominant extractor (270), and is only kept separate for clarity of the description.

```
CoefficientPowerSeparator[ dominantExpr_ ] :=
    With[{ coefs=CoefficientList[dominantExpr,zLast]},
        {Last[coefs], Length[coefs]-1}];
Print["{coefficient factor, iterate power factor}: ",
    CoefficientPowerSeparator[ c zLast^2/z0-(zLast-3)] ]
    {coefficient factor, iterate power factor}:
```

$$\left\{\frac{c}{z0}, 2\right\}$$

Coefficient Degree Pair

The result of the process is a pair, as shown above in the code example.

Coefficient Factor

The first item is the coefficient factor. In the above example, the coefficient factor is c/z0.

Iterate Power Factor

The second item is the iterate power factor. In the above example, the coefficient factor is 2. The iterate power factor is simply the power to which the "zLast" iterate is raised.

Level Degree Pair Correlator (274):

For the iterate power factor extracted by the coefficient power separator (272), the level power pair correlator (274) constructs expression of the correlation between the level of iteration and the integer power raising for both elements of the coefficient power pair: coefficient and iterate variable. The result is a level degree pair function to return a coefficient degree expression and iterate degree expression based on the variable specifying the iteration level. The resulting expression takes one variable, the level n, and returns two integer powers: the power which any part of the coefficient was raised for that iteration level, and the power to which the zLast iterate is raised at that level. It may be easier to implement a table lookup, as described below, especially for complicated iterations. However, a recurrence formulas can usually be applied to create a simple function which will work for all iterations.

Power Array Means

The simplest method of finding these powers is through iteration, at the time it is needed, or to perform it once. For example, consider the generic Mandelbrot iteration of $k*z^2+z0$. The coefficients and degree of zLast are shown by the following printout of iterating the dominant expression, $k\,z^2$.

Print["sample:", sample=NestList[Simplify[Expand
[k*#^2]
]&, zLast,3]]
sample: $\{zLast, k\,zLast^2, k^3\,zLast^4, k^7\,zLast^8\}$ In this case, say for the third iteration, $k^3+zLast^4$, the two power values are {3,4}. The values for all entries are easily extracted, as shown below:

```
PolyDegree[p_,v_]:= Length[CoefficientList[p,v]]-1;
Print[Map[{PolyDegree[#,k],PolyDegree[#,zLast]}&,sample]];
    {{0,1},{1,2},{3,4},{7,8}}
```

Power Recurrence Means

When the dominant expression is based only on a coefficient and raising z to a power, then there is a very simple algorithm for returning the result. The following code works for any coefficient and positive zLast power function. Note the special case when the zLast is raised to a power of 1. The value of n can be any non-negative integer.

LevelCorrelator[p_]:=If [p==1,
{n, 1}, {(p^n-1)/(p-1), p^n}];

We can test this.

Print[t1=LevelCorrelator[2]]; Print[Table[t1/.n→i, {i,0,3}] ]
$\{-1+2^n, 2^n\}$
{{0,1}, {1,2}, {3,4}, {7,8}}
Print[t3=LevelCorrelator[3]]; Print[Table[t3/.n→i,{i,0,3}]];

$$\left\{\frac{1}{2}(-1+3^n), 3^n\right\}$$

{{0,1}, {1,3}, {4,9}, {13,27}}

Commonality Correlator (276):

The commonality correlator (276) creates a commonality function. This function, when passed point iteration data, causes a correlated value to be returned. Point iteration data always includes the iterate and the iteration level, n, and possibly other iterates such as z0. Several types and modes may be required.

First, there is the mode of commonality: potential commonality, field line commonality, or complex commonality. Recall that only the potential commonality function can be used with metacomplex iterations; the field line and complex modes will utilize a complex iteration.

Secondly, the commonality function may be designed for calculating derivatives. To calculate derivatives, the partial derivatives of the point iteration will be parameters of the commonality function. Calculation of the partial derivatives for commonality is straightforward and not described here.

Input Defined by Metacomplex Function
Coefficient Degree Expression: coefDegree,
Iterate Degree Expression: iterateDegree From the level degree pair correlator (274) the coefficient degree and iterate degree are specified for a particular level of iteration.

Coefficient Factor: coefFactor

From the coefficient degree separator (272) the coefficient factor is required.

Input Defined by Iteration Process

The following symbols are variables which may be parameters to the created commonality function.

n, the iteration level: 0 or positive integer
zLast, the principle iteration result at iteration level n,
optional z0, the 0'th iterate
optional variables: additional variables supplied when resulting function is used.
winding count, or wc, (integer) used only for calculations of field lines The winding count is very difficult to compute, and is passed as an iteration value. Refer to the later embodiment for calculation of this integer winding count. The winding count is only needed for the 0'th derivative; that is the function itself. Field line derivatives, except the 0'th, do not require a winding count; 0 can be used if a value is expected.

Potential Commonality Mode: Creating a Potential Commonality Function

The potential commonality function requires a function to perform the following steps.

absCoef: Absolute Value of the Coefficient

This value involves taking the absolute value of the coefficient factor.

For example, for the original Mandelbrot the coefficient is 1, and no other calculations are required. More complex functions may involve constants, z0 (0'th iterate), and more. Absolute values are easily taken for a metacomplex number. The z0 value, if any, will be a parameter of the final function whose value is supplied by the point iteration data. The coefficient values may be raised to an integer power. If the partial derivatives are being calculated, then the z0 must be treated as a variable and its partial derivatives must be available when the commonality derivatives are processed.

absZ: Absolute Value of the Iterate

This value involves taking the absolute value of the zLast iterate (but not raised to any power).

Algorithm

The goal is to create an algorithm to compute:

Log [absZ]/iterateDegree+Log [absCoef]/coefDegree.

If the absCoef is 1, such as in the original Mandelbrot, then the second term can be ignored, because Log [1] is zero.

When the absCoef is less than 1, then raising it to a power can produce a very small number; the above sum of two logarithm terms may experience loss of relative precision; in such a case, then an alternative version, (with a tendency to overflow or underflow numeric limits), is given by:

Log [absZ^(-iterateDegree)*absCoef^(-coefDegree)]

Either form can be used, but when using IEEE floating point, even in double precision mode, the latter equation may tend to overflow. When using a software floating point implementation, allow for very large exponents and either expression may be used. The example code, below, allows either.

In the above expressions, the integer values for iterateDegree and coefDegree are dependent upon n, the escape iteration. Recall that the level degree pair correlator (274) is responsible for expressions which are used to calculate these integers for any value of n.

Sample Code for Creating a Function to Evaluate Potential Values

The following routine takes the absolute value of an expression, which may include variables. Note the multiplication of absolute values when the coefficient is a product of values.

```
AbsExpr[e_,vars_]:=Which[
    Head[e]===Times,Apply[Times,Map[AbsExpr[#,vars]&,e]],
    NumericQ[e],Abs[e], Head[e]===Pt,AbsPt[e],
    Head[e]===Power ,Power[AbsExpr[e[[1]],vars],e[[2]]],
    MemberQ[vars,e],AbsPt[e], True,Throw["Bad AbsExpr",e];];
Print[Map[AbsExpr[#,{z0}]&,{z0^2, Pt[1,2,3],1+I}]];
```

The following routine creates the internal expression which correlates a point at iteration level to a potential. Either type of potential values can be selected. The routine also returns all variables that are left unresolved so that they can be substituted later.

```
MakePotentialExpr[coefFactor_, coefDegree_, iterateDegree_,
useAlternate_:False]:=Module[ {absCoef, vars=Union[{z,n},
    Select[Variables[coefFactor],Head[#]===Symbol&]]},
    absCoef=AbsExpr[coefFactor,vars]; {vars, If[useAlternate,
        Log[AbsPt[z] (-iterateDegree)*absCoef^(-coefDegree)],
        Log[AbsPt[z]]/iterateDegree+Log[absCoef]/coefDegree]}];
```

The following routine simply creates a function which implements the above potential expression as a function. It could also generate a table, one for each iteration level.

```
PotentialCorrelator[coefFactor_, coefDegree_, iterateDegree_,
useAlternate_:False]:= Module[ { vars,e},
    {vars,e}=MakePotentialExpr[coefFactor , coefDegree,
    iterateDegree,useAlternate];
    Function[vars//Evaluate,e//Evaluate]];
```

Suppose the dominant expression is Pt[1,3]*z0*zLast^3. Show both potential forms. Note that the inferior expression of the metacomplex iteration expression does not participate in the result.

$$\text{Print}\left[\text{pair} = \left\{\text{PotentialCorrelator}\left[\text{Pt}[1,3]*z0, \frac{1}{2}(-1+3^n), 3^n\right],\right.\right.$$
$$\left.\left.\text{PotentialCorrelator}\left[\text{Pt}[1,3]*z0, \frac{1}{2}(-1+3^n), 3^n, \text{True}\right]\right\}\right]$$

$$\left\{\text{Function}\left[\{n,z,z0\}, 3^{-n}\text{Log}[\text{AbsPt}[z]] + \frac{2\text{Log}[\sqrt{10}\,\text{AbsPt}[z0]]}{-1+3^n}\right],\right.$$
$$\left.\text{Function}\left[\{n,z,z0\}, \text{Log}\left[10^{\frac{1}{4}(1-3^n)}\text{AbsPt}[z]^{-3^n}\text{AbsPt}[z0]^{\frac{1}{2}(1-3^n)}\right]\right]\right\}$$

Field Line Commonality Mode: Creating a Field Line Commonality Function

The calculation of field lines is for complex (not hypercomplex) iterations. Recall that for the potential, the absolute value function was a basic operation. Here, the comparable operation is the complex Arg function implemented with principle radian values: (−Pi, Pi]; that is, the branchcut is taken as the negative real axis. The field line commonality function requires a function to perform the following steps.

angleCoef: Winding Angle, in Radians

This value involves taking the winding angle of the coefficient factor; it must include all factors appearing within the coefficient, just as the absolute value was based on the absolute values of all the components for the potential commonality mode. To calculate the winding angle of a value, one simply applies the Arg function to return the complex argument, in radians. To raise such a value to any integer power, multiply by the power. To multiply two such Arg values, Add (not multiply) the angles. For the original Mandelbrot the coefficient is 1, and the complex Arg of 1 is 0. If the partial derivatives are being calculated, then the z0 must be treated as a variable and its partial derivatives must be available when the commonality derivatives are processed.

arcZ, wc

Standard iteration of a metacomplex iteration expression produces a zLast value, for which the complex Arg function can be applied to produce a principle angle, called the arcZ. If only derivatives (1st, 2nd, etc) are being calculated, then the next parameter wc, the winding count, can be set to zero. Otherwise, wc must be computed through a difficult process not part of this embodiment; it is merely passed as a parameter to the commonality function. The angleZ value is simply the arcZ value plus the wc*2Pi. All angles are measured in radians. The wc value is an integer, possibly a gigantic integer.

Algorithm

The goal is to create an algorithm to compute:

Mod [(wc+(arc Z−coefDegree*angleCoef)/(2*Pi)/iterateDegree,1]

If the angleCoef is 1, such as in the original Mandelbrot, then relative precision loss caused by digit cancellation of terms is eliminated. Note that the Mod function is applied to the result to ensure that the result is between 0 and 1. The value should always lie between −½ and ½, and the Mod function normalizes this to lie between 0 and 1. Note: "Mod [m, n] gives the remainder on division of m by n. Now it may happen due to peculiarities in computations of the winding count that the result may be in error by an integer amount; this problem is eliminated by this application of Mod. Also, note that −½ and ½ field lines are identical and represent a wrap-around effect.

Code: Complex Iterations Only.

The following routine takes the argument value of an expression, which may include variables. Note the multiplication of absolute values when the coefficient is a power, and the summing with a "Plus" operator of angles.

```
ArgExpr[e_,vars_] :=Which[
    Head[e]===Times,Apply[Plus,Map[ArgExpr[#,vars]&,e]],
    NumericQ[e],Arg[e], MemberQ[vars,e], Arg[e],
        Head[e]===Pt,Arg[e[[1]]+e[[2]] I],
    Head[e]===Power ,e[[2]]* ArgExpr[e[[1]],vars] ,
    True,Throw["Bad ArgExpr",e];];
Print[Map[ArgExpr[# ,{z0}]&, {I,I z0^2,z0, Pt[1, 3]}]]
```

$$\left\{\frac{\pi}{2}, \pi + \text{Arg}[z0], \text{Arg}[z0], \text{ArcTan}[3]\right\}$$

The following routine creates the internal expression which correlates a point at an iteration level to a field line. The routine also returns all variables that are left unresolved so that they can be substituted later.

```
MakeFieldlineExpr[coefFactor_, coefDegree_:Integer,
        iterateDegree_:Integer]:=
    Module[{angleCoef, vars=Union[{z,n},
            Select[Variables[coefFactor],Head[#]===Symbol&]] },
        angleCoef=ArgExpr[coefFactor,vars];
        {Union[vars,{wc}], Mod[(wc+(Arg[z]−coefDegree*angleCoef)/
            (2*Pi))/iterateDegree,1] } ];
```

The following routine simply creates a function which implements the above field line expression as a function. It could also generate a table, one for each iteration level.

```
FieldlineCorrelator[coefFactor_, coefDegree_:Integer,
    iterateDegree_:Integer]:=Module[ { vars,e},{ vars,e}=
    MakeFieldlineExpr[coefFactor,coefDegree, iterateDegree];
    Function[vars//Evaluate,e//Evaluate]];
```

The following code generates a function and prints it, and then a sample call is shown.

```
Print[ t=FieldlineCorrelator[ Pt[1,3] z0,(1/2) (−1+3^n),3^n ]];
Print[N[ t [ 2, 1 ,I,1]
```

$$\text{Function}\left[\{n, wc, z, z0\},\right.$$
$$\left.\text{Mod}\left[3^{-n}*\left(wc + \frac{\text{Arg}[z] - \frac{1}{2}(-1+3^n)(\text{ArcTan}[3] + \text{Arg}[z0])}{2\pi}\right), 1\right]\right]$$

0.050537

Complex Commonality Mode

The complex commonality mode combines the two previous modes to produce a complex commonality function for complex iterations. This routine creates a list of two values: the first item is the potential and the second is the field line.

```
ComplexCorrelator[coefFactor_, coefDegree_,
        iterateDegree_, useAlternate_:False]:=
    Module[{vars,pe,fe},{ vars,pe}=MakePotentialExpr[
            coefFactor , coefDegree, iterateDegree/useAlternate];
        { vars,fe}=MakeFieldlineExpr[coefFactor,
            coefDegree, iterateDegree];
        Function[vars//Evaluate,{pe,fe}//Evaluate]];
```

Derivatives

In the end, each of the commonality functions is defined by a basic mathematical expression, and partial derivatives are easily taken. Note that "wc", is treated as a constant for the purposes of derivatives (except the 0'th derivative, of course).

Correlation Driver (278):

The correlation driver (278) simply ensures that the various components are executed when their respective input parameters are ready. Here is a simple driver that allows choice of one of 3 commonality modes.

---

CommonalityMode= potentialMode|fieldlineMode|complexMode;
CorrelationDriver[iterationExpr_,theMode:CommonalityMode] :=
Module[{ dominantExpr,coefFactor,iteratePowerFactor,
         coefDegree,iterateDegree},
dominantExpr=DominantExtractor[iterationExpr];
{coefFactor,iteratePowerFactor}=
CoefficientPowerSeparator[ dominantExpr];
{coefDegree,iterateDegree}=LevelCorrelator[iteratePowerFactor];
Switch[theMode,
  potentialMode,PotentialCorrelator[
       coefFactor, coefDegree, iterateDegree],
  fieldlineMode,FieldlineCorrelator[
       coefFactor, coefDegree, iterateDegree],
  complexMode,ComplexCorrelator[coefFactor, coefDegree,
       iterateDegree]]];
examples of complex correlation functions Print[ Map[CorrelationDriver[ #,complexMode]&,
  { Mandelbrot,JuliaSet, Alpha}]];

$\left\{\text{Function}\left[\{n, wc, z\}, \left\{2^{-n}\text{Log}[\text{AbsPt}[z]], \text{Mod}\left[2^{-n}\left(wc + \frac{\text{Arg}[z]}{2\pi}\right), 1\right]\right\}\right],\right.$ $\left\{\text{Function}\left[\{n, wc, z\}, \left\{2^{-n}\text{Log}[\text{AbsPt}[z]], \text{Mod}\left[2^{-n}\left(wc + \frac{\text{Arg}[z]}{2\pi}\right), 1\right]\right\}\right],\right.$ $\text{Function}\left[\{n, wc, z, z0\}, \left\{2^{-n}\text{Log}[\text{AbsPt}[z]] + \frac{\text{Log}[\text{AbsPt}[z0]]}{-1 + 2^n},\right.\right.$
$\left.\left.\text{Mod}\left[2^{-n}\left(wc + \frac{\text{Arg}[z] - (-1 + 2^n)\text{Arg}[z0]}{2\pi}\right), 1\right]\right\}\right]\right\}$

---

Operation: Iteration Correlator Embodiment—FIG. 10

To operate, simply call the correlation driver (278) and the commonality function is created. As needed, this same result is then used over an over to determine a commonality value. At the bottom of FIG. 10, the process of taking the point iteration data and applying it to the commonality function to produce a commonality value is shown. Calculations of the correlation involving field lines requires that a winding count is computed along with the iterated point data.

Point Iteration Embodiment—FIG. 11, FIG. 12

Description: Point Iteration Embodiment—FIG. 11, FIG. 12

Overview

FIG. 11A shows a traditional, prior art, point iteration method; it requires a single component, the point potential iterator (300). In FIG. 11B, three additional components allow for the automatic calculation of inputs to the traditional iteration; these replace inputs which would otherwise require guesswork or mathematical analysis. FIG. 12A and FIG. 12B show non-traditional iteration methods for complex iterations where field lines are calculated. FIG. 12A shows a basic system with precalculated escape distances and correlations.

Derivatives

Whether iterating potential or field line values, derivatives can be taken of the simple mathematical operations. For field lines, winding counts are generated as an adjunct to traditional mathematics, but winding counts are treated as constants in the case of taking derivatives, and therefore traditional means for derivatives are still available.

Potential Iteration: FIG. 11A and FIG. 11B.

Point Potential Iterator (300)

Refer to FIG. 11A and FIG. 11B. A point potential Iterator (300) is a component for iterating a point value to obtain a potential value for iterated function; it is shown in FIG. 11A and FIG. 11B; this is the traditional method used to iterate a point value. A point, the parameter space point, is chosen from the parameter space, and iterated using standard arithmetic with the metacomplex iteration expression until a precision escape distance, a distance where the precision of the result is sufficient, is achieved. Then the point value, at the specified iteration level, is passed to a potential commonality function to return a result correlated to the same result as would be obtained by iteration to any additional iteration levels.

Escape Distance Solver (207)

The escape distance solver (207) is the ESCAPE DISTANCE SOLVER—EMBODIMENT—FIG. 5. Refer to the code example of the routine "EscapeDistanceDriver" within that embodiment.

Precision Escape Initializer (209)

FIG. 11B shows an improvement where the precision escape distance, used by the point potential iterator (300), is automatically constructed. For this particular case, the precision escape initializer (209) simply calls the escape distance solver using the precision escape expression. Other examples of generating both this case, a single precision escape distance, and cases with multiple calls, is described under LOCAL PRECISION ESCAPE OPTIMIZATION EMBODIMENT—FIG. 16.

Commonality Function Generator (302)

In FIG. 11B the commonality function generator (302) is simply an implementation of the method described in the ITERATION CORRELATOR EMBODIMENT—FIG. 10. In this case, the commonality function generator (302) is configured to create a potential commonality function.

Field Line Iteration

Refer to FIG. 12A and FIG. 12B. In generate consistent field line values, winding escape sequences are created. FIG. 12B is the same as FIG. 12A, except for the additional components to automatically calculate key parametric inputs.

Self Winding Iteration Resolver (232)

The self winding iteration resolver (232) and its support components were fully described in the SELF WINDING RESOLVER EMBODIMENT—FIG. 8. Refer to that embodiment for the other required components.

Winding Escape Sequencer (320),

A winding escape sequencer (320), shown to the left of FIG. 12A and FIG. 12B, is any method which produces a winding escape sequence. For example, the WINDING CHAIN EMBODIMENT—FIG. 17, described earlier, is a general method for producing winding escape sequences, Field Line Point Iterator (310)

Points selected within a coverage cell (the initial iterate) of a winding escape sequence generated by the winding escape sequencer (320), allows the use of the self winding iteration resolver (232) to compute a winding point which is iterated to an absolute value of a precision escape distance; refer to the component self winding iteration resolver (232) for setting up the call. The result winding point is then passed to a field line commonality function (either a simple field line or the complex mode with field line and potential) to compute a field line or complex point.

Escape Distance Solver (207), Precision Escape Initializer (209)

See potential iteration: FIG. 11A and FIG. 11B, earlier.

Commonality Function Generator (302)

This component is shown in FIG. 12B; its purpose and action were just described, above, in the section: potential iteration: FIG. 11A and FIG. 11B. Refer to that description. There is one minor difference; the generated commonality function is for a field line or complex correlation.

Operation: Point Iteration Embodiment—FIG. 11A, FIG. 11B, FIG. 12A, FIG. 12B

The operation of potential iterations, as shown in FIG. 11A is simple and is described in the literature of the prior art. Operation for components of FIG. 11B is the same as FIG. 11A with the addition of initialization calls to automatically setup topological functions and constants.

For FIG. 12A and FIG. 12B, calculations of field lines require that the winding escape sequencer (320) must be used to initialize a winding escape sequence, enclosing a particular parameter space point, before the field line point iterator (310) is called. In FIG. 12B, automatic initialization is performed before other calls.

Local Category Escape Optimization Embodiment—FIG. 13

Description: Local Category Escape Optimization Embodiment—FIG. 13

Overview

The earlier embodiments use escape distances for two purposes: topology categorization, as seen in the INTERVAL ESCAPE CATEGORIZATION—EMBODIMENT—FIG. 6; and, precision escape as seen in POINT ITERATION EMBODIMENT—FIG. 11A, FIG. 11B, FIG. 12A, FIG. 12B. Both of these distance systems rely on a "global" escape distance which works for all points in the parameter space.

But when speed is important, then optimizations can be made so that local areas of the parameter space can be "escaped" at a lower absolute distance from the origin. The method of optimization is based on absolute value of the initial iterate, z0. If the metacomplex iteration expression does not have a z0 variable, such as with Julia sets, then this optimization does not help. For Julia set optimization, see the next embodiment, JULIA SET CATEGORY ESCAPE OPTIMIZATION EMBODIMENT—FIG. 14, FIG. 15.

Global Versus Local

The category escape distance is the safe distance for all points at any level of iteration. To remove ambiguity, such a distance is called global category escape distance. A local category escape distance is used for some optimizations and guarantees escape only for a specific point or interval of points which are substituted for the z0 value, the initial iterate.

Global Category Escape Distance

A global escape distance applies to an iteration of any point or metacomplex interval. If the point (or all the points of the interval) iterates to the global escape distance, then one can be sure that the point will continue to iterate to greater and greater distances from the origin, regardless of the initial location or the iteration count.

Local Category Escape Distance

A local category escape distance is determined by the trick of setting z0 iterate to a desired interval representing a 0'th level interval iterate, in the metacomplex iteration expression, when using an escape distance solver (207). A local solution is the distance whereby a single point or a metacomplex interval, can guarantee that all future iterations will increase and eventually will reach the global category escape distance and hence iterate to infinity. When the local category escape distance is computed as greater than the global category escape distance, then use the global category escape distance. To find a local escape distance, take the local point or interval, and reduce it to a range of absolute values, and substitute it into the metacomplex iteration expression to replace the z0 value. Then use the new expression to call the escape distance solver (207).

Local Category Escape Array

Local data is stored in a local category escape array. We create a series of intervals of absolute values such as 0.5 to 1 and 1.5 to 2, up to the global escape distance. Next the z0 variable of the metacomplex variable is substituted with the interval for each of these intervals, and the new local distance calculated.

Escape Data Formats: Category Escape Data

Category escape data includes one or both a global category escape distance and local category escape array. Refer to the FIG. 13A. If there is no global category escape distance, then one can assume the largest local category escape distance of the local category escape array is the global category escape distance. FIG. 13B shows an abbreviated form of the same concept as FIG. 13.A, where the inclusion of one or both is captured by the single input of a category escape data.

Arbitrary Category Escape Data

The global escape distance (previously called the category escape distance) can be manually set to any predetermined positive value, but that value will usually need to be at least equal to category escape distance established in ESCAPE DISTANCE SOLVER—EMBODIMENT—FIG. 5. If the value is arbitrarily set too small, then sometimes the results will be incorrect. Similarly, the local escape array can be setup with any positive values; if set too small, these values may also cause bad results. Of course, with the techniques described here, the arbitrary setting of these values is eliminated.

Escape Distance Solver (207)

The escape distance solver (207) is the ESCAPE DISTANCE SOLVER—EMBODIMENT—FIG. 5. Refer to the code example of the routine "EscapeDistanceDriver" within that embodiment. That routine will be used for examples herein.

Category Escape Initializer (205)

Refer to FIG. 13C. The category escape initializer (205) initializes a category escape distance whenever the metacomplex iteration expression changes. In its most simple form, the category escape distance is a predetermined constant. However, a generic process can select a distance by using the ESCAPE DISTANCE SOLVER—EMBODIMENT of FIG. 5, where a category escape expression is used for the input parameter called category escape expression. It is only needed once, because it is only dependent upon the metacomplex iteration expression. The category escape initializer (205) may include calculation of the local category escape array. This component can be used to set all constants for the category escape data.

Algorithm

First a global category escape distance is computed. There is no need to build array entries for absolute values beyond the global category escape distance. Thus, the global category escape distance is used to place an upper limit on the input to the local category escape distance. The distance from 0 to the global escape distance is subdivided into ranges representing absolute values; there is no need to evaluate for metacomplex values of z0. For each range, an absolute value interval is setup. For each range, the range is substituted for the z0 variable of the metacomplex iteration expression and the category escape distance is calculated, which is really the local category escape distance.

Recall that the local escape distances may, through oddities of the process, generate values which are larger than the global escape distance; in such cases, use the global escape distance.

Another useful concept is to make sure that each entry of the local array, beginning with smaller values of z0, is larger than any previous value. This is likely to be true anyway, and it makes use of the array slightly easier.

Code Example

Code for the previous description of the category escape initializer (205) was left out because the category escape initializer (205) made a simple single call to an implementation of ESCAPE DISTANCE SOLVER—EMBODIMENT—FIG. 5. Here, with multiple calls to setup an array, it is useful to give a code example.

The following code example can work with any of the real escape expressions of ESCAPE DISTANCE SOLVER—EMBODIMENT—FIG. 5. However, for this embodiment, it defaults to using the category escape expression. None-the-less, the following routine was made general so that it can be used with other escape distances.

Note the use of the "isAscend" flag; if True, the default, then the local array distances are ascending values only. The two flags for "isGlobal" and "isLocal" specify the generation of entries for the global escape data. Generally, both are turned on by default.

category. However, regardless of this successful test, any other requirements must also succeed, such as the Angle Span Submode, which was described in the original description of this component.

Escape Iterate Values

When testing an escape iterate, two key values are computed.

Smallest Absolute Escape Value:

The smallest absolute escape value is the absolute value of the point in the last iterate with the smallest absolute value. For example, if the last iterate is a disc interval with a center and radius, then the smallest absolute value is the absolute value of the center minus the radius. A 0 or negative value indicates no escape and the escape categorizer (204) can return immediately. All calculations of this value should round down so that one can be sure it's the smallest value.

Largest True Absolute Value:

The largest true absolute value is the largest absolute value of any point in the last iterate which is guaranteed to be an actual imaged point of a point in the original 0'th iterate.

```
EscapeDataInitializer[mie_,isGlobal_:True, isLocal_:True,
        expr_:categoryEscapeExpression,divisions_:4, isAscend_:True]:=
Module[{theGlobal,theAbsRange,theLast,theLocal,
localArray,minAscend=0},
    theGlobal= Catch[EscapeDistanceDriver[mie,expr]];
    If[! NumericQ[theGlobal], Throw[BadEscapeData, theGlobal ]];
    If[isLocal===False, Return[{theGlobal,{ }}]];
    theAbsRange= SetPrecision[theGlobal/divisions,Infinity];
    theLast=0;
    localArray=Table[theRange= Interval[{theLast,theLast+=theAbsRange}];
      theMIE=mie/.z0→SetPrecision[theRange,Infinity];
    theLocal=Catch [EscapeDistanceDriver[theMIE,expr]];
    If[theLocal===BadRoot|| ! NumericQ[theLocal],theLocal=theGlobal];
    If[isAscend,minAscend=theLocal=Max[theLocal,minAscend]];
    N[Min[theLocal,theGlobal] ],{ i,1,divisions}];
    If[isLocal, {theGlobal, localArray}, {,localArray}]];
```

The following is an example of the global escape data for the familiar Mandelbrot. Note the lower category escape distances which are generated.

EscapeDataInitializer[Mandelbrot]
{2.0000000000000000, {1.36603, 1.61803, 1.82288, 2.}}

In the above result, the global category escape distance is shown first, followed by the local category escape array. The above array was setup to allow a quick indexing into the array. In the above routine, the is Ascend parameter, when True, forces all local array values to be larger and larger. This can make it easier to perform the testing for enhancements to the escape categorizer (204), below. This is an enhancement which can improve performance.

Escape Categorizer (204), Enhancements

The escape categorizer (204) was previously described in the INTERVAL ESCAPE CATEGORIZATION-EMBODIMENT—FIG. 6. In that FIG. 6, the input to the escape categorizer (204) was the category escape distance, which is now called the global category escape distance for this embodiment. When the category escape data is simply the single value of global category escape distance, then only the discussion of that embodiment needs to be referenced. But when the category escape data allows for a local category escape array, then new algorithms can be used.

All these new enhancements require that the interval from the iterate pass at least some escape distance: either global or local. The overall escape categorizer (204) will return indeterminate unless this distance test is passed to create an escape Because the escape interval will contain intrinsic dilution, many points in the last interval are not true image points. Therefore, in general, the largest true absolute value must reluctantly be set to the smallest absolute escape value, just described. However, when multiple subintervals of z0 are iterated as a single interval within the level iterator (202) of INTERVAL ESCAPE CATEGORIZATION EMBODIMENT—FIG. 6, then the largest true absolute value is the maximum of the minimum absolute value of any of the subintervals. Thus, the advantage of using many subintervals is that the largest true absolute value will be larger, and in some escape modes, this will allow an earlier determination of escape distances, as described below. Some modes do not take advantage of the largest true absolute value, and in such cases it need not be computed. When calculating this value, rounding should be downward to ensure that at least one true image point has really achieved such an absolute distance.

Largest Absolute Escape Value:

The largest absolute escape value is calculated as the absolute value of the point in the last iterate with the largest absolute value. For example, if the last iterate is a disc interval with a center and radius, then the largest absolute value is the absolute value of the center plus the radius.

Selecting a Local Array Value

When a local array is present, then the z0, or 0'th iterate, is used to determine local test values for the escape distances. The resulting escape value will be used in conjunction with smallest absolute escape value, described above.

Smallest z0 Absolute Value:

Each entry in the local category escape array was created by a range of absolute values chosen for the z0 iterate. Thus, when finding the appropriate local distance, the smallest z0 value is relevant. If z0 is a point then the absolute value of the point is taken, rounding down. For a z0 interval, use the point with the smallest absolute value.

Largest z0 Absolute Value:

When finding the appropriate local distance, the largest z0 value is relevant. If z0 is a point then the absolute value of the point is taken, rounding up. For a z0 interval, use the point with the largest absolute value.

z0 Absolute Interval:

The z0 absolute interval is the interval from the smallest z0 absolute value to the largest z0 absolute value; these values were just described.

Local Escape Test Value:

Each entry in the local category escape array was created by a range of absolute values chosen for the z0 iterate. Thus, when testing cell iterate data for an escape category, we first find all the indices in the local category escape array which were generated from absolute values which also occur in the z0 iterate, as summarized by the z0 absolute interval, described above. Consider all the escape distances in the local escape array where the z0 absolute interval intersects the range of absolute values of a corresponding index. Use the largest of all these escape distances which are found by this intersection.

That is somewhat cumbersome. If the local category escape array uses only ascending values (see "is Ascend" default parameter of EscapeDataInitializer), then a much simpler approach can be taken: the indexed value of the local category escape array is chosen by the index which represents a range of values which includes the largest absolute value of the particular z0.

Local Escape Modes

The following modes are available. These modes are applicable whether a category escape initializer (205) initializes the category escape data or constants are determined arbitrarily or by another process. Note that some modes require some additional testing or information. Some of this information is obtained from external setup. The use of [automatic] in the name of a mode is used to indicate an alternative where automatic calculations for the global escape distance or local array are made.

[Automatic] Global Escape Categorizer Mode: See FIG. 13C

The basic form of this mode was previously described. Here, the escape distance test simply compares the smallest absolute escape value against the global category escape distance. When an automatic calculation of a global category escape distance is computed using a category escape initializer (205) with an escape distance solver (207), then the burden of picking a global category escape distance is automated, and it is called the automatic global escape categorizer mode.

[Automatic] Local Categorizer Mode: See FIG. 13A, FIG. 13C

This mode is simple, and is like the original comparison against a global category escape distance, except that instead of using a global category escape distance for testing, a local category escape distance is calculated: see local escape test value, above. The smallest absolute escape value is compared against this local escape test value.

[Automatic] Global Touch Categorizer Mode: See FIG. 13A, FIG. 13C

This mode is like the previous mode, local categorizer mode, but with additional requirement for indicating an escape category: at least one true image point of the interval iterate must also achieve the global category escape distance. Therefore, an additional comparison of largest true absolute value is made against the global category escape distance. If either test fails, then an indeterminate state is returned.

[Automatic] Switched Global Touch Categorizer Mode: See FIG. 13D

This mode extends the previous mode so that even if there is no establishment of at least one true image point having an absolute value beyond the global category escape distance, a single "safe global flag" indicates that the global touching is not required. Refer to FIG. 13D. If the flag is enabled, then the additional test described under the global touch categorizer mode is dropped. This flag may be turned off for a number of reasons; see operations section of this embodiment.

[Automatic] Iterate Level Categorizer Mode: See FIG. 13E

This mode extends the previous mode so that control over switching the global requirement on and off can be synchronized with the iteration level. That is, instead of the "safe global flag" of FIG. 13D, a "safe iterate level", an integer value, is used to control switching. If the current iteration level is at or above the safe iterate level, the global touch requirement is dropped. If the current iteration level is below the safe iterate level, then the global touch requirement is enforced. Of course, if the safe iterate level is set to −1, then there is no requirement for a global touching. If the safe iterate level is set to an absurdly large number, then the global touch requirement is enforced. When the safe iterate level is set to say 5, then iteration levels 0 to 4 require the global touch point, but after the iteration level reaches 5, then only the local requirement needs to be met.

Operation: Local Category Escape Optimization Embodiment—FIG. 13

The following discussion offers tips on choosing the right type of optimizer for achieving a result of escape category. The modes which reduce the escape distance to lower values might be much faster, but the topological underpinnings of these modes, for use with computing consistent winding counts, are less understood. In all of the following cases, the term automatic refers to an enhancement to the mode where the escape distance solver (207), under the control of the category escape initializer (205), automatically creates the category escape data. Without this automatic enhancement, the setup of the category escape data can be cumbersome, and an insufficient (too low) escape value may produce invalid or inconsistent results. Refer to FIG. 13C for the diagram of the automatic modes.

[Automatic] Global Categorizer Mode:

In the original description of the escape categorizer (204), a single category escape distance is used for comparison. That mode could be called the global categorizer mode. It is the least optimized, and if anything works well, this will.

[Automatic] Local Categorizer Mode:

This mode, local categorizer mode, is particular useful when topological categorization is based on the simple goal of determining when a coverage cell fully escapes. This mode may be suitable for other topological applications such as computing consistent winding counts, but unless some mathematician can prove its reliability, it is probably best to use one of the other modes. In particular, the modes of global categorizer mode and automatic global categorizer mode are the strongest modes of all, because points of the last iterate must achieve the global category escape distance.

[Automatic] Global Touch Categorizer Mode:

The global touch categorizer mode is useful when winding counts must be consistent. This mode assumes that a connected set of points, all of which stay in local escape until they are guaranteed to fully escape, where one point is already at a global category escape distance, can be used to consistently transfer winding counts from one principle escape sequence to an adjacent sequence.

[Automatic] Switched Global Touch Categorizer Mode: See FIG. 13D

This mode, the switched global touch categorizer mode, is an optimization of the previous mode. It simply allows turning on and off, using the "safe global flag", the requirement for at least one true image point lying beyond the global category escape distance. Its a useful mode when some topological categorization sometimes only needs the requirements offered by the local categorizer mode, but when additional requirements, such as winding count consistency is needed, the extra protection of having one point actually achieve the global category escape distance. For example, using the same metacomplex iteration expression, a topology testing only for a topological categorization might switch off the additional requirements to improve performance, and then turn the requirements back on when winding counts are computed.

[Automatic] Iterate Level Categorizer Mode: See FIG. 13E

This mode provides more control. When the local categorizer mode cannot be trusted to produce consistent winding counts, this mode can achieve many of the same benefits by effectively switching to local categorizer mode as needed. Now, winding counts are constructed from adjacent winding escape sequences. My intuition says that winding counts are preserved when the safe iterate level is set to the escape iteration level of the donor winding escape sequence.

Julia Set Category Escape Optimization Embodiment—FIG. 14, FIG. 15

Description: Julia Set Category Escape Optimization Embodiment—FIG. 14, FIG. 15

Overview of Julia Set Optimization:

FIG. 14 shows a blowup of the escape categorizer (204) as it would be configured within the INTERVAL ESCAPE CATEGORIZATION-EMBODIMENT—FIG. 6. Here, there is an additional component, the topological storage manager (330), which is used to optimize Julia set processing.

When the metacomplex iteration expression contains only references to zLast (the most recent prior iteration value), and most particularly no references to other prior iterations such as z0, then each iteration level is solely dependent upon the last zLast. Such iterations are what are traditionally called Julia set iterations. As may have been noticed in the prior embodiment, Julia sets do not have local escape distances and cannot be optimized for local areas of the parameter space. However, this embodiment provides an optimization tool for Julia sets.

Checks can be made of an iterated interval for already having been processed as escaping. Now for a generic categorization for a non-Julia set iteration, this would be done at a high level, perhaps keeping track of all coverage cells which have been processed. But here, with Julia sets, the current coverage cell may have a current iterate which is enclosed (complete covering) by a previously processed iteration, no matter what the coverage cell, which escaped. If so, then the current interval iterate can be safely marked as escaping. To support this check, all previous iterations of all coverage cells, can be saved and used for checking for an escape category. And that is the purpose of a new component, described next.

Topological Storage Manager (330)

Refer to FIG. 14.

Input:

The two inputs correspond to different requests of the topological storage manager (330).

Escaped Cell Iterate Data:

The escaped cell iterate data is simply the cell iterate data which is known to escape, no matter how it has been determined to have escaped.

Cell Iterate Data:

The cell iterate data is simply cell iterate data for which escape has not yet been determined.

Output: Julia Escape Result

When the topological storage manager (330) is called upon to test for a quick determination of an escaped iterate, it returns a success or failure.

Algorithm:

The topological storage manager (330) checks an iterated interval for already having already been processed as escaping. To do this, two functions are required: the ability to save prior interval results and the ability to check that a current interval has already escaped.

Saving Prior Iterates:

Suppose the topological storage manager (330) subdivides the parameter space using a binary subdivision (i.e. subdivided into 4 equal squares for complex space, and 8 equal cubes for three dimensional space, and 16 for quaternion space, and so on). Then when the topological storage manager (330) receives cell iterate data which is already known to escape, each of the interval iterates within that iteration sequence must also escape. Each iterate is checked to see if it fully covers (encloses) all points for any subdivided area of the parameter space. If so, then that area is marked as escape. In some cases, one might only update the storage based on the z0'th iterate, or original coverage cell, as in the first iterate stored in the cell iterate data; this can be very easy if each coverage cell is generated by the same subdivision process used by the topological storage manager (330). And this can be even simpler if both storage systems, that for generated coverage cells and that for saving escape categories are the same, and this appears to be the best choice for many systems. Now other iterates which belong to the escape sequence of the cell iterate data may also be used, but their shape and size will not necessarily match those of subdivision of the topological storage manager (330). However, any binary subdivision can be marked as escaped, provided its enclosed points are a subset of one of the intervals of the cell iterate data.

Small subdivisions may accumulate to cover larger areas. For example, consider a binary subdivision of the complex plane where each of the four subdivided cells is marked as an escape category. These four cells can be eliminated, and the "parent" cell can be marked as an escape category.

Checking Prior Iterates for Escaping:

Any iterate can be checked to determine if it has achieved an escape category. All that is required is to look in the previously stored prior iterates, as just described. If all the points of interval or intervals of the current iterate, which is being tested, are completely covered by previously escaped areas of the parameter spaced already saved by the process just described, then the iterate is an escape category. Otherwise it is an indeterminate state.

Escape Categorizer (204), Modifications

The escape categorizer (204) has already been described in INTERVAL ESCAPE CATEGORIZATION-EMBODIMENT—FIG. 6. Some other improvements were described in LOCAL CATEGORY ESCAPE OPTIMIZATION EMBODIMENT—FIG. 13, but those improvements do not apply to Julia sets. This new enhancement requires two additions:

Checking Prior Iterates for Escaping:

As explained in prior embodiments, each new iterate added to the cell iterate data is checked for an escape condition by the escape categorizer (204). Here, in addition to checking the escape distance, the component can also call upon the topological storage manager (330) to see if the most recent interval has escaped. Both checks can be tried, but if either returns an escape category, then the other result can be ignored. Refer above to the "checking prior iterates for escaping" under the description of topological storage manager (330).

Saving Prior Iterates:

The escape categorizer (204) is modified so that whenever an cell iterate has escaped, then the entire cell iterate data, including all iterations, is passed as the escaped cell iterate data to the topological storage manager (330) so that the data base of known escaped areas of the parameter space is updated.

Julia Set Versus Non-Julia Set

The previous embodiment, LOCAL CATEGORY ESCAPE OPTIMIZATION EMBODIMENT of FIG. 13, showed optimizations when z0 was part of the metacomplex iteration expression. This embodiment shows the other choice: when the z0 iterate is not present. It is easy to determine which optimization should be used. If zLast is the only iterate variable in the metacomplex iteration expression, then use the Julia set optimization of this embodiment. If not, then use the optimization of the LOCAL CATEGORY ESCAPE OPTIMIZATION EMBODIMENT—FIG. 13. In Mathematica, one only needs to use the "Variables" function. Here it is applied to the three samples.

```
Print[ Map[Variables[#]==={zLast}&,
    {Mandelbrot, JuliaSet, Alpha}]];
    {False,True,False}
```

Note that FIG. 15 shows a blowup of an optimized escape categorization configuration incorporating many optimizations.

Operation: Julia Set Category Escape Optimization Embodiment—FIG. 14, FIG. 15

Note that FIG. 15 shows a blowup of an optimized escape categorization configuration incorporating many optimizations. Operationally, this embodiment requires the ongoing allocation of new information into the topological storage manager (330); therefore, adequate memory should be available.

Local Precision Escape Optimization Embodiment—FIG. 16

Description: Local Precision Escape Optimization Embodiment—FIG. 16A, FIG. 16B, FIG. 11 and FIG. 12

Overview

Recall in the ESCAPE DISTANCE SOLVER—EMBODIMENT—FIG. 5 that distances can be found for point iterations where the escape distance indicates that the current iteration of a point achieves the same precision as that required by some precision goal. The result was a precision escape distance that is valid for any point starting in the parameter space. However, just as the LOCAL CATEGORY ESCAPE OPTIMIZATION EMBODIMENT—FIG. 13 illustrated optimization based on local areas of the parameter space, this embodiment uses a similar mechanism for precision escape distances.

Precision Escape Data:

FIG. 16A shows a precision escape data, a structure which can store the global precision escape distance (i.e. the precision escape distance) and a local precision escape array which contains precision escape distances valid for a range of absolute values for the initial point of the parameter space. This represents an enhancement to precision escape distance (equivalent to the global precision escape distance) as shown in FIG. 11A, FIG. 11B, FIG. 12A and FIG. 12B.

The local precision escape array includes constants, representing escape distances, just as in the local category escape array described in LOCAL CATEGORY ESCAPE OPTIMIZATION EMBODIMENT—FIG. 13. In that earlier embodiment, just as it is here, each of the escape distances in this array, are values associated with a range of absolute values for the z0 iterate. Refer to that embodiment for details.

Potential Point Iterator (300), Enhancements

The potential point iterator (300) was previously described in the POINT ITERATION EMBODIMENT—FIG. 11B. FIG. 12B. When the local precision escape array is present within precision escape data, then optimizations are possible. When the local precision escape array is present, then the global precision escape distance is not needed. To find the escape distance for a z0 point value, its absolute value is taken. Then this absolute value is matched to the corresponding index in the local precision escape array through that array's correspondence to absolute values. For example, if index 2 represents z0 absolute values from 0.5 to 1, and the absolute value of z0 is 0.7, then choose index number 2. That index is used to find the escape distance which is used to terminate the iteration within the potential point iterator (300).

Field Line Point Iterator (310), Enhancements

Changes to the field line point iterator (310) are similar to the potential point iterator (300). That is, first an optimal distance is found from within precision escape data. This distance is passed to the receiver iteration goal, which is a parameter to the self winding iteration resolver (232): see FIG. 12B.

Escape Distance Solver (207)

The escape distance solver (207) is the ESCAPE DISTANCE SOLVER—EMBODIMENT—FIG. 5. Refer to the code example of the routine "EscapeDistanceDriver" within that embodiment. That routine will be used for examples herein.

Precision Escape Initializer (209)

FIG. 16B shows enhancements in use of the precision escape initializer (209), which was first described in POINT ITERATION EMBODIMENT of FIG. 11B, FIG. 12B. This new embodiment, LOCAL PRECISION ESCAPE OPTIMIZATION EMBODIMENT—FIG. 16, provides two new aspects. First, the error reduce expression, described in the ESCAPE DISTANCE SOLVER-EMBODIMENT—FIG. 5, is shown with created value called the growth rate escape distance; this provides a guarantee on the escape distance. Second, this version of the precision escape initializer (209) can optionally assemble data into a precision escape data, which allows for more data than one escape distance.

If just the precision escape expression is used (without the error reduce expression), then the entire construction of precision escape data corresponds to the embodiment of LOCAL CATEGORY ESCAPE OPTIMIZATION EMBODIMENT—FIG. 13. Here is an example, using the Mandelbrot sample, which generates the precision escape data using the exact same sample code with only a replacement to the default parameter.

```
precisionEscapeData=EscapeDataInitializer[
    Mandelbrot, True,True, precisionEscapeExpression]
    {6.7108864000000000×10^7,
        {3.35544×10^7, 4.74531×10^7, 5.8118×10^7, 6.71089×10^7}}
```

When the error reduce expression is used to create a growth rate escape distance, then the distances chosen must be the maximum of corresponding distances created for the precision escape expression. This requires calls to generate the growth rate escape distances. Then the maximums can be taken of corresponding distances, as s shown in this code sample.

```
growthEscapeData=EscapeDataInitializer[
    Mandelbrot, True,True, errorReduceExpression]
        {3.0000000000000000,{2.32288,2.58114,2.80278,3.}}
```

Note how much smaller these values are than the values just created for the precisionEscapeExpression. When the maximum values are taken from corresponding positions in each data structure, these lower values just don't have any effect. But in some applications they might be larger.

Note that when the maximum distances are taken, the precision escape data is left unchanged. This is a typical result. Maybe the extra work to find the guaranteed distances using the errorReduceExpression is not really required. Here is a way to find the maximums of the two values:

```
finalData={Max[precisionEscapeData[[1]],growthEscapeData[[1]]],
    MapThread[Max,{precisionEscapeData[[2]],growthEscapeData[[2]]}]}
        {6.7108864000000000×10^7,
            {3.35544×10^7, 4.74531×10^7, 5.8118×10^7, 6.71089×10^7}}
```

Operation: Local Precision Escape Optimization Embodiment—FIG. 16

The implementation of choosing an optimal precision escape distance is straightforward and does not affect other components.

Conclusion, Ramifications, and Scope

Embodiments are described for producing interval results from a metacomplex interval expression in order to provide quick topological categorization and iteration of potential. For complex iterations, field lines can be generated.

Optimal Interval Operators

The interval operators used for iteration should be fast and with optimal inclusion properties so that unnecessary points are not added to the interval; that explains the inclusion of the optimal interval operators in this description. Quality interval operators are important because the large number of iterations can cause the interval size to increase rapidly.

Cell Iterate Data

The creation of interval escape sequences and winding escape sequences results in structures named as cell iterate data, WEII, and PEII. These structures typically carry all the iterates accrued during processing by INTERVAL ESCAPE CATEGORIZATION EMBODIMENT—FIG. 6. There is rarely a need to keep all these iterates; summaries are all that are usually required. Even when using the WINDING JUMP RESOLVER EMBODIMENT—FIG. 9, the use of these iterates is usually limited to z0 and the last principle interval of the escape sequence. The elimination of these extraneous states can greatly reduce the amount of memory to store all results. In fact, when simply categorizing, the entire cell iterate data can be replaced by a simple indicator of the final cell state.

Alternate Evaluation Sequence

All of the embodiments relate to the processing of iterated expressions as adding a dominant expression to an inferior expression, as in the Mandelbrot's $zNext=zLast^2+z0$. However, there is a nearly identical sequence of $zNext=(zLast+z0)^2$. Although, one can easily argue that the sequence is identical to that described herein, and the algorithms herein are easily modified. However, this alternative lacks elegance and can be much slower unless precautions are taken.

Lack of Elegance: Correlating to the ½ Iteration.

Recall the ITERATION CORRELATOR EMBODIMENT—FIG. 10; this correlation relates the current escaped interval to the 0'th iteration in order to produce common values regardless of the number of iterations required to reach the escape distance. In the original schema, the 0'th iteration is given as z0. In the alternative form, the 0'th iteration is zero, and, as such, there is no correlation. Therefore correlation must occur to the middle of the 0'th iteration: after (zLast+z0), where zLast is 0. This is an awkward way of specifying a correlation.

Escape Distances

In the original method, the escape distances are checked after the end of each iteration. In the alternative form, the escape distances of the original method can be used by checking the escape distance after adding z0 (this being equivalent).

Winding Algorithms

For the alternate form, in the forward iteration mode, the self winding algorithms WINDING JUMP RESOLVER—FIG. 9 work in the same manner as the original form, providing enough information of the iterates is saved.

Increased Angle Span of Intervals

The really big problem is that intervals have a much larger angle span in the alternate mode, because as noted above, the escape distance is determined halfway through the iteration, but then additional interval operators increase the angle span of the final interval. Consider the alternate Mandelbrot iteration, where the final operation is to square an interval which has already escaped. This squaring operation always doubles the angle span!

I claim:

1. A machine executed escape distance method to return an escape distance for a metacomplex escape topology based on a predetermined metacomplex iteration expression, having an iteration variable, throughout a metacomplex parameter space to determine an escape distance, comprising:

(A) separating, by a dominant splitter on a machine, that separates said predetermined metacomplex iteration expression into a dominant expression as the term having the highest degree of said iteration variable, and setting an inferior expression to the remainder of said predetermined expression, (B) transforming, by a dominant reducer on the machine, said dominant expression into a real valued expression, called a real dominant expression, with absolute values taken of all factors so as to minimize the numerator and maximize the denominator, (C) transforming, by an inferior reducer on the machine, said inferior expression into a real valued expression, called a real inferior expression, with absolute values taken of all factors so as to maximize the numerator and minimize the denominator, (D) determining, by the machine, a predetermined real escape expression with substitution tokens called rde and rie, and with iteration token, called x, referencing the iteration variable, (E) determining, by an escape formula replacer on the machine, a substituted real escape expression constructed by replacing the rde token and the rie tokens with said real dominant expression and said real inferior expression, respectively, (F) determining, by a positive real root solver on the machine, the largest positive root by solving said substituted real escape expression equated to zero, for said x, wherein each of the steps from (A) to (F) are executed as parameters become available.

2. The escape distance method of claim 1 wherein said predetermined real escape expression is a category escape expression of rde−rie−x, so that a category escape distance is returned as a result.

3. The escape distance method of claim 1 wherein said predetermined real escape expression is a precision escape expression of rie/rde−(1−errorFraction)*relativeErrorGoal, where said errorFraction is a fraction between greater than 0 and less than 1, and said relativeErrorGoal is a value representing a relative error goal, so that a precision escape distance is returned as a result, further including: iterating a point of said parameter space until the absolute value of said point achieves an distance equal to a result returned by calling the escape distance method.

4. The method of claim 3 further including determining, on the machine, a guaranteed precision distance as the maximum of two distances returned by calling said method of claim 3 and by calling said method using a error reduce expression errorFraction(rde−rie)−x, so that a precision escape distance is returned.

* * * * *